(12) United States Patent
Sugiyama et al.

(10) Patent No.: US 7,242,720 B2
(45) Date of Patent: Jul. 10, 2007

(54) OFDM SIGNAL COMMUNICATION SYSTEM, OFDM SIGNAL TRANSMITTING DEVICE AND OFDM SIGNAL RECEIVING DEVICE

(75) Inventors: Takatoshi Sugiyama, Yokohama (JP); Yusuke Asai, Yokohama (JP); Satoshi Kurosaki, Yokosuka (JP); Masahiro Umehira, Yokohama (JP); Daisei Uchida, Yokohama (JP); Yasuo Suzuki, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1271 days.

(21) Appl. No.: 10/117,390

(22) Filed: Apr. 5, 2002

(65) Prior Publication Data

US 2002/0191535 A1    Dec. 19, 2002

(30) Foreign Application Priority Data

| Apr. 9, 2001 | (JP) | ............................ P2001-109679 |
| Jul. 4, 2001 | (JP) | ............................ P2001-203360 |
| Aug. 15, 2001 | (JP) | ............................ P2001-246408 |
| Oct. 17, 2001 | (JP) | ............................ P2001-319610 |

(51) Int. Cl.
*H04K 1/10* (2006.01)
*H04B 7/02* (2006.01)

(52) U.S. Cl. ...................................... 375/260; 375/267
(58) Field of Classification Search ................ 375/260, 375/267
See application file for complete search history.

(56) References Cited

U.S. PATENT DOCUMENTS 6,144,711 A   11/2000   Raleigh et al.

| 6,826,240 | B1* | 11/2004 | Thomas et al. ............. 375/340 |
| 7,023,265 | B1* | 4/2006 | Helard et al. ............... 329/320 |
| 2005/0002326 | A1* | 1/2005 | Ling et al. ................... 370/208 |
| 2005/0002468 | A1* | 1/2005 | Walton et al. .............. 375/267 |

FOREIGN PATENT DOCUMENTS

| EP | 1 054 541 A2 | 11/2000 |
| JP | 8-510609 | 11/1996 |
| JP | 2000-228657 | 8/2000 |
| JP | 2000-244454 | 9/2000 |

(Continued)

OTHER PUBLICATIONS

Masahiro Takahashi et al., "Cross Polarization Interference Canceler for Microcellular Mobile Communication", Technical Report of IEICE, SST95-26, CS95033, RCS95-35, pp. 55-60, May 1995.

(Continued)

*Primary Examiner*—Don N. Vo
(74) *Attorney, Agent, or Firm*—Darby & Darby

(57) ABSTRACT

An OFDM signal communication system used in broadband mobile communication, achieves stable operation under severe frequency selective fading environments, giving high quality. The OFDM signal communication system which transmits OFDM signals over the same radio frequency from N transmitting antennas, has an inverse matrix computer for computing an N×N inverse matrix constituted by propagation coefficients for respective propagation paths between each of N transmitting antennas and each of N receiving antennas, and a subcarrier demodulator which separates the signals of the respective propagation paths, based on the obtained inverse matrix.

33 Claims, 38 Drawing Sheets

FOREIGN PATENT DOCUMENTS

| JP | 332723 | 11/2000 |
|----|--------|---------|
| JP | 2001-044965 | 2/2001 |
| JP | 2001-136144 | 5/2001 |
| WO | WO-95/19078 A1 | 7/1995 |

OTHER PUBLICATIONS

Dennis Lee et al., "Antenna Diversity for an OFDM System in a Fading Channel", Proceeding of IEEE MILCOM, pp. 1104-1109, Nov. 1999.

Nobuaki Mochizuki et al., "A High Performance Frequency and Timing Synchronization Technique for OFDM", Technical Report of IEICE, SSE98-21, RCS98-21, pp. 75-82, Apr. 1998.

A. van Zelst, et al., "Space Division Multiplexing (SDM) for OFDM systems", Proceedings of IEEE 51st Vehicular Technology Conference, pp. 1070-1074, May 2000.

Patrick Vandenameele et al., "A Combined OFDM/SDMA Approach", IEEE Journal on selected areas in communications, vol. 18, No. 11, pp. 2312-2321, Nov. 2000.

Sirikiat Lek Ariyavisitakul, "Turbo Space-Time Processing to Improve Wireless Channel Capacity", IEEE Transactions on communications, vol. 48, No. 8, pp. 1347-1359, Aug. 2000.

Muenster, M., et al., "Co-channel Interference Cancellation Techniques for Antenna Array Assisted Multiuser OFDM Systems", IEE Colloquium on Mobile Communications In the Year 2000, IEE, London GB, No. 471, Mar. 27, 2000, pp. 256-260, XP000933623.

Li, Y., et al., "Channel Estimation for OFDM Systems with Transmitter Diversity in Mobile Wireless Channels", IEEE Journal on Selected Areas in Communications, IEEE Inc., New York, U.S.A., vol. 17, No. 3, Mar. 1999, pp. 461-470 XP000804975.

Jones, V.K., et al., "Channel Estimation for Wireless OFDM Systems", Globecom '98, The Bridge to Global Integration, Sydney, Nov. 8-12, 1998, IEEE Global Telecommunications Conference, New York, IEEE, U.S.A., vol. 2, 1998 pp. 980-985, XP000825895.

Munster, M., et al., "Co-Channel Interference Suppression Assisted Adaptive OFDM in Interference Limited Environments", VTC 1999-Fall, IEEE VTS 50th. Vehicular Technology Conference, Gateway to the 21st Century Communications Village, Amsterdam, Sep. 19-22, 1999, IEEE Vehicular Technology Conference, New York, IEEE, U.S.A., vol. 1 conf. 50, Sep. 19, 1999, pp. 284-288, XP002143788.

Kai-Kit Wong et al., "Adaptive Spatial-Subcarrier Trellis Coded MQAM and Power Optimization of OFDM Transmission", 2000 IEEE 51st Vehicular Technology Conference Proceedings, pp. 2049-2053.

Raleigh, Gregory G., et al., "Multivariate Modulation and Coding for Wireless Communication", IEEE Journal on Selected Areas in Communications, vol. 17, No. 5, May 1999, pp. 851-866.

Kurosaki, S., et al., "100 M bit/s SDM-COFDM over MIMO Channel for Broadband Mobile Communications", Technical Report of IEICE, Japan, The Institute of Electronics, Information and Communication Engineers, Oct. 12, 2001, vol. 101, No. 370, pp. 37-42.

Nobuaki Mochizuki, et al., A High Performance Frequency and Timing Synchronization Technique for OFDM, IEEE Global Telecommunications Conference, GLOBECOM 98, The Bridge to Global Integration, Nov. 8, 1998-Nov. 12, 1998, Sydney, Australia, vol. 6, pp. 3443-3448.

Takashi Maehata, et al., DSRC using OFDM for roadside-vehicle communication system, Proceedings of the IEEE 51st Vehicular Technology Conference, 2000, VTC 2000-Spring Tokyo, May 15-18, 2000, vol. 1, pp. 148-152.

\* cited by examiner

FIG.30

SIMULATION PARAMETERS

| NUMBER OF FFT POINTS | 64 |
|---|---|
| NUMBER OF SUBCARRIERS | 52 (OF THESE FOUR CARRIERS ARE PILOT) |
| FREQUENCY BAND | 20MHz |
| MODULATION METHOD | QPSK |
| CODING RATE | R=1/2 (CONSTRAINT LENGTH 7) |
| SYMBOL DURATION | 4 $\mu$ sec (INCLUDING GUARD INTERVAL 800 ns) |
| PACKET LENGTH | 54byte (9 OFDM SYMBOLS) |
| COMMUNICATION PATH ENVIRONMENT | 18-RAY MULTIPATH FADING MAXIMUM DOPPLER FREQUENCY : 50Hz DELAY SPREAD : 50ns |

OFDM SIGNAL COMMUNICATION SYSTEM, OFDM SIGNAL TRANSMITTING DEVICE AND OFDM SIGNAL RECEIVING DEVICE

BACKGROUND OF THE INVENTION

1. Field of the Invention

The present invention relates to an orthogonal frequency division multiplexing (OFDM) signal communication system used in broadband mobile communication and the like, which divides transmission signals into subcarrier groups orthogonal to each other to perform multi-carrier transmission. More specifically, the invention relates to an OFDM signal communication system which achieves substantial frequency utilization efficiency under a multipath fading environment, using a plurality of transmitting antennas and a plurality of receiving antennas, and which uses a space division multiplexing (SDM) method or polarization division multiplexing (PDM) that can achieve signal transmission with high quality, high capacity, and high speed.

2. Description of the Related Art

For example in broadband mobile communication, since the frequency band which can be used is limited, then in order to deal with full-scale multi-media, it is necessary to achieve high frequency utilization efficiency on a par with fixed microwave communication, and overcome severe frequency selective fading, to realize high quality transmission.

In order to realize high capacity/high speed mobile communication, using a limited frequency band, the following method is proposed. That is to say, a multiple input multiple output (MIMO) channel is set up using a plurality of transmitting antennas and a plurality of receiving antennas, and on the transmitter, a plurality of channels are transmitted using the same frequency, while on the receiver, each of the channels is separated by an equalizer and an interference canceller to achieve a large capacity.

In an MIMO Rayleigh fading channel which is formed in the case of using N transmitting antennas on the transmitter and M (M≧N) receiving antennas on the receiver, the Shannon's capacity limit is expressed by the following equation.

$$C = \log_2\left[\det\left(I + \frac{\rho}{N} H \cdot H^*\right)\right] \quad (1)$$

Here H is an M×N matrix and the elements (i,j) thereof are the propagation coefficients between the i th transmitting antenna and the j th receiving antenna. Furthermore, I is the M×N eigen-value matrix and ρ is the mean SNR. Furthermore, det is the determinant, and * denotes the complex conjugate. When M=N, the lower limit of the capacity is expressed by the following equation.

$$C = \sum_{k=1}^{N} \log_2\left(1 + \frac{\rho}{N}\chi_{2k}^2\right) \quad (2)$$

Here $\chi^2_{2k}$ shows the effect of the diversity with an order of k. That is to say, for an MIMO channel, the capacity is N times that of a single channel. In this manner, in an MIMO channel, if an ideal interference cancellation is achieved, then in the broadband mobile communication, large capacity and high speed transmission can be realized.

A configuration example of a conventional transmitter-receiver for this MIMO channel is shown in FIG. 37. This is a configuration example of a transmitter-receiver which performs time-space equalization using N transmitting antennas 1110-1 to 1110-N, and N receiving antennas 1111-1 to 1111-N. On the transmitter, the transmission information is coded in encoders 1101-1 to 1101-N, interleaved by interleavers 1102-1 to 1102-N, and distributed to N modulators 1103-1 to 1103-N, and then transmitted.

On the other hand, on the receiver, N−1 interference cancellers 1114-1 to 1114-(N−1), and N equalizers 1115-1 to 1115-N are arranged. The received signal of the receiving antenna 1111-1, is at first equalized by the equalizer 1115-1, and then deinterleaved by a deinterleaver 1116-1, and input to a decoder 1118-1. In the decoder 1118-1 decoding is performed corresponding to encoding by the encoder 1101-1.

The interference component is extracted by calculating the difference of the output from the decoder 1118-1 and the output from the deinterleaver 1116-1. This interference component is input to the interleaver 1117-1, and the output therefrom is fed back as a control signal to the equalizer 1115-1. On the other hand, the interference component, being the output from the interleaver 1117-1 is subtracted from the output from the equalizer 1115-1, and again input to the deinterleaver 1116-1.

By means of this repetitive processing, the reliability of the output from the decoder 1118-1 is increased. At the receiving antenna 1111-1, the N transmission signals from the transmitting antennas 1110-1 to 1110-N are all superposed and received. In the interference canceller 1114-1, the output from the decoder 1118-1 is subtracted from the received signal of the receiving antenna 1111-1 for which all the N transmission signals have been superposed.

As a result, the signal transmitted by the transmitting antenna 1110-1 is removed from the signal received by the receiving antenna 1111-1, to give a signal in which the (N−1) transmission signals of the transmitting antennas 1110-2 to 1110-N are superposed. This signal is input to the next equalizer 1115-2. In the equalizer 1115-2, as with the processing by the system of the equalizer 1115-1, after being equalized by the equalizer 1115-2, the signals are deinterleaved by the deinterleaver 1116-2, and input to the decoder 1118-2.

In the decoder 1118-2, decoding corresponding to the encoding by the encoder 1101-2 is performed. The interference component is extracted by calculating the difference of the output from the decoder 1118-2 and the output from the deinterleaver 1116-2. This interference component is input to the interleaver 1117-2, and the output therefrom is fed back as a control signal to the equalizer 1115-2. On the other hand, the interference component, being the output from the interleaver 1117-2 is subtracted from the output from the equalizer 1115-2, and again input to the deinterleaver 1116-2.

By means of this repetitive processing, the reliability of the output from the decoder 1118-2 is increased. In the interference canceller 1114-2, the output from the decoder 1118-2 is subtracted from the input from the decoder 1118-1. As a result, the signal transmitted by the transmitting antenna 1110-2 is further removed to give a signal in which the (N−2) transmission signals of the transmitting antennas 1110-3 to 1110-N are superposed.

This signal is input to the next equalizer 1115-3 (not shown in the figure). In this manner, the interfering signals decoded by the decoder 1118 are removed sequentially by the interference canceller 1114, and the output from the interference canceller 1114-(N−1) finally becomes the transmission signal of the transmitting antenna 1110-N and is equalized by the equalizer 1115-N, deinterleaved by the deinterleaver 1116-N and decoded by the decoder 1118-N. This operation is performed for the receiving antennas 1111-2, 1111-3 (not shown in the figure), and 1111-N.

The decoding result from the respective decoders 1118-1 to 1118-N, is repetitively processed in series, and finally the outputs from the N decoders are sent to a converter 1119, and converted to serial received data. This is equivalent to estimating a propagation coefficient matrix for the respective paths between the transmitting antenna 1110-i and the receiving antenna 1111-j by the equalizer, and performing interference cancellation based on this.

Consequently, for the operation of the equalizer, it is necessary to equalize the N×N paths, and perform (N−1)×N interference cancellations based on the result.

For the transmitter-receiver in the conventional MIMO channel of FIG. 37, N equalizers are necessary for each of the respective receiving systems corresponding to the receiving antennas of the receiver. Furthermore, in the case where broadband transmission is performed in a severe multipath fading environment, frequency selective fading occurs, so that it is necessary to accurately identify the frequency characteristics for the amplitude and phase which are generated by the fading, in an extremely short time for each of the systems.

However, in the current fading environment, the number and strength of the incoming delayed waves, and the so called delay profiles are diverse, and for all of these environments, realization of an effective equalizer is extremely difficult. Therefore, although the transmitter-receiver in the MIMO channel can be realized under an environment close to the Additive White Gaussian Noise channel such as for point-to-point communication, in a MIMO channel in severe multipath fading environments, an extremely large signal processing capability is necessary. Therefore realization of a conventional transmitter-receiver in the MIMO channel is difficult.

Furthermore, in the conventional transmitter-receiver in the MIMO channel as in FIG. 37, interference cancellation is performed by estimating the frequency characteristics of the amplitude and phase which are distorted by the multipath fading, regenerating the interference replica, and subtracting the replica from the output from the decoder 1118-1. In this case, in the respective equalizers, high estimation accuracy is necessary for the frequency characteristics of the amplitude and phase. This is because, in the case where equalizing accuracy cannot be achieved, the interference cancellation is not sufficient, resulting in residual interference noise.

However, with the equalizer, since high accuracy equalization for the frequency characteristics of the amplitude and phase is difficult, there is a problem in that the signal-to-interference noise ratio easily deteriorates.

Furthermore, in the case where a wireless communication system is assumed between a fixed based station and a mobile terminal, if complicated processing functions are provided in the mobile terminal side, a problem arises from the point of miniaturization and low cost for the mobile terminal due to increase in hardware size and increase in power consumption.

SUMMARY OF THE INVENTION

The present invention addresses the abovementioned problems, with the object of achieving stable operation under a severe frequency selective fading environment, and achieving high quality, in an OFDM signal communication system which uses broadband mobile communication or the like.

The present invention is an OFDM signal communication system comprising: an OFDM signal transmitting device which includes a plurality of N transmitting antennas, for transmitting OFDM signals over the same radio frequency from the transmitting antennas, an OFDM signal receiving device which includes N receiving antennas for receiving signals transmitted from the N transmitting antennas, an inverse matrix computer for computing each of inverse matrices of N-dimensional square matrices for each subcarrier constituted by the propagation coefficients for the respective propagation paths between the respective transmitting antennas and the respective receiving antennas, and an interference canceller for canceling interference components which occur between the OFDM signal transmitting device and the OFDM signal receiving device, based on the inverse matrix computed by the inverse matrix computer.

Furthermore, the present invention is an OFDM signal transmitting device used in an OFDM signal communication system for transmitting OFDM signals over the same radio frequency from an OFDM signal transmitting device comprising a plurality of N transmitting antennas to an OFDM signal receiving device comprising N receiving antennas, wherein the OFDM signal communication system comprises: an inverse matrix computer for computing each of inverse matrices of N-dimensional square matrices for each subcarrier constituted by the propagation coefficients for the respective propagation paths between the respective transmitting antennas and the respective receiving antennas; an interference canceller for canceling interference components which occur between the OFDM signal transmitting device and the OFDM signal receiving device, based on the inverse matrix computed by the inverse matrix computer; and a pilot signal generator for generating N kinds of pilot signals for use by the inverse matrix computer to compute the inverse matrix, and the OFDM signal transmitting device is furnished with at least one of the inverse matrix computer, the interference canceller and the pilot signal generator.

Moreover, the present invention is an OFDM signal receiving device used in an OFDM signal communication system for transmitting OFDM signals over the same radio frequency from an OFDM signal transmitting device comprising a plurality of N transmitting antennas to an OFDM signal receiving device comprising N receiving antennas, wherein the OFDM signal communication system comprises: an inverse matrix computer for computing each of inverse matrices of N-dimensional square matrices for each subcarrier constituted by the propagation coefficients for the respective propagation paths between the respective transmitting antennas and the respective receiving antennas; an interference canceller for canceling interference components which occur between the OFDM signal transmitting device and the OFDM signal receiving device, based on the inverse matrix computed by the inverse matrix computer; and a pilot signal generator for generating a pilot signal of N kinds for use by the inverse matrix computer to compute the inverse matrix, and the OFDM signal receiving device is furnished with at least one of the inverse matrix computer, the interference canceller and the pilot signal generator.

In the present invention, an OFDM method is used to realize a signal communication system for MIMO channels without using an equalizer. Then, the propagation coefficients (amplitude and phase) for each of the subcarriers is directly measured using the pilot signal for example, without estimation of the propagation coefficient matrix on a time domain by an equalizer, to thereby acquire the propagation coefficients for interference cancellation between OFDM signals for each of the subcarriers.

Consequently, since interference cancellation is performed for each of the subcarriers, simple and highly accurate interference cancellation is possible. Furthermore, according to this OFDM signal communication system, since feed forward processing is possible without the need to perform feedback control as with the case where the equalizer is used, stable operation can be achieved even under a severe frequency selective fading environment.

The interference canceller for separating the signals of the respective propagation paths and the inverse matrix computer may be arranged in either one of the OFDM signal transmitting device and the OFDM signal receiving device. Consequently, a mode where the inverse matrix computer and the interference canceller are arranged on the OFDM signal receiving device side may be assumed.

However, for the inverse matrix computer and the interference canceller, since the processing is complicated, if both these functions are provided, the hardware size of the device is increased, and the power consumption is also increased. Consequently, it is not desirable to mount the inverse matrix computer and the interference canceller on a mobile terminal.

In view of the above, in the case where it is assumed that at least one of the inverse matrix computer and the interference canceller is mounted on the OFDM signal transmitting device side, then for example, for the OFDM signal transmitting device, it may be considered to associate this with the base station for controlling a plurality of mobile terminals, and for OFDM signal receiving device it may be considered to associate this with respective mobile terminals. By so doing, problems associated with miniaturization of the mobile terminal, or reduction in the power consumption can be overcome.

BRIEF DESCRIPTION OF THE DRAWINGS

FIG. 30 is a diagram showing parameters of simulation explained with reference to FIG. 29.

DETAILED DESCRIPTION OF THE PREFERRED EMBODIMENTS

First Embodiment

Figure 1:
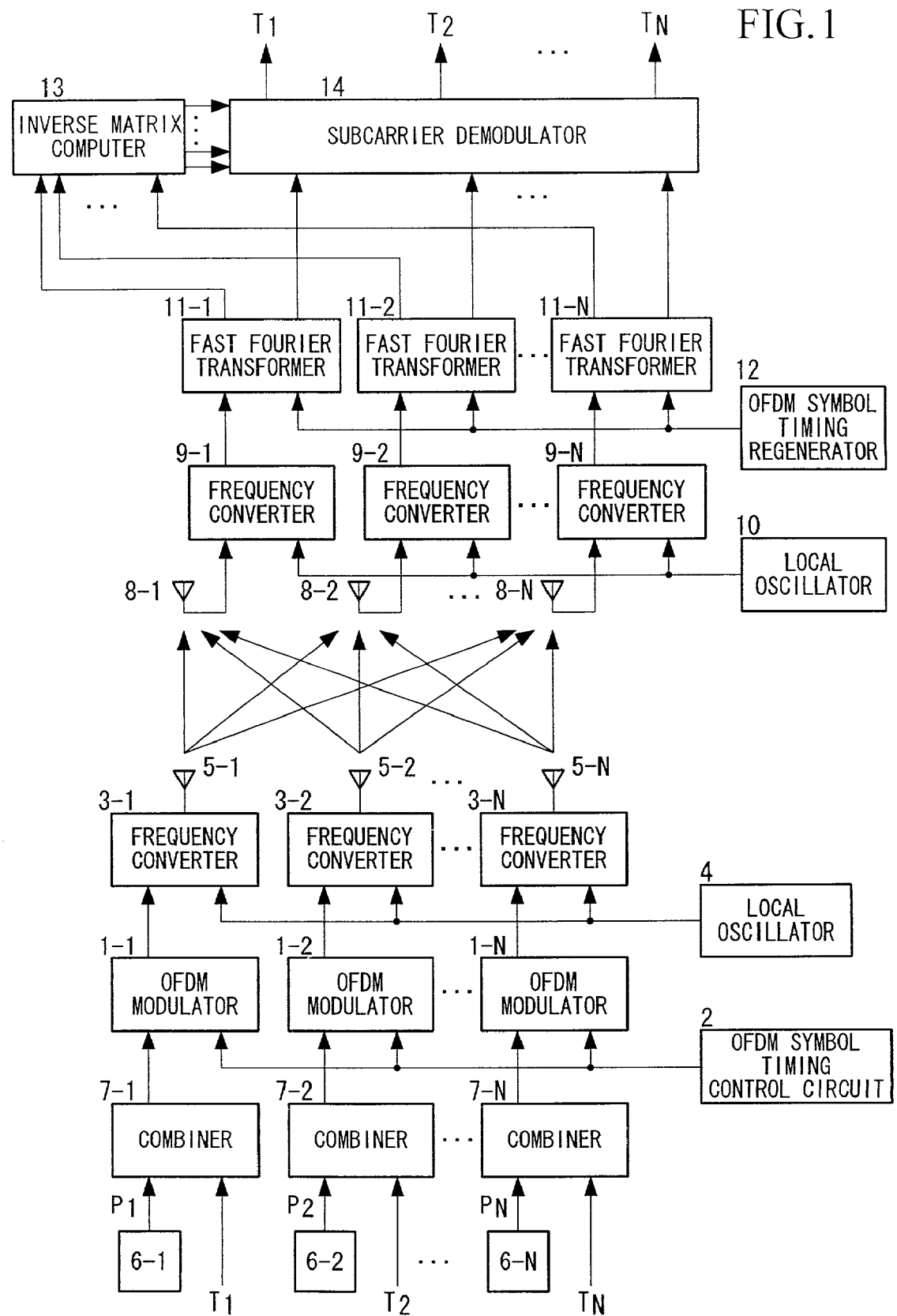
FIG. 1 is a block diagram showing the construction of an OFDM signal communication system of a first embodiment.

A block diagram of an OFDM signal communication system according to a first embodiment is shown in FIG. 1. In this embodiment, the OFDM signal communication system comprises N OFDM signal transmitting device which use the same radio frequency, equipped with two or more N transmitting antennas and connected to each of the antennas, and N OFDM signal receiving device which use the same radio frequency, furnished with N receiving antennas and connected to each of the antennas.

The construction and operation of the preferred embodiment of FIG. 1 will be described in detail. In this embodiment, N OFDM modulators 1-1 to 1-N are arranged corresponding to N transmitting antennas 5-1 to 5-N. In the OFDM modulators 1-1 to 1-N modulation of the subcarrier and inverse Fourier transformation is performed. To these OFDM modulators 1-1 to 1-N, common OFDM symbol timing is supplied from an OFDM symbol timing control circuit 2.

Transmission information signals $T_1$ to $T_N$ are combined on respective time domains by combiners 7-1 to 7-N, with pilot signals $P_1$ to $P_N$ input from pilot signal generators 6-1 to 6-N which generate known pilot signals $P_1$, $P_2$, $P_N$ corresponding to the respective OFDM modulators 1-1 to 1-N. These combined signals are respectively input to each of the OFDM modulators 1-1 to 1-N.

The pilot signal $P_i$ (i=1 to N), is used in order to measure the propagation coefficient between the transmitting antenna 5-i, and the receiving antennas 8-1 to 8-N. These pilot signals and transmission information signals are combined, and respectively input to the N OFDM modulators 1-1 to 1-N. For these OFDM modulators 1-1 to 1-N, since it is necessary for all to operate at a common OFDM symbol timing, a common OFDM symbol timing is supplied to all of the OFDM modulators 1-1 to 1-N from the OFDM symbol timing control circuit 2.

The modulation outputs from the OFDM modulators 1-1 to 1-N is input to the N frequency converters 3-1 to 3-N for conversion to radio frequency. To these frequency converters 3-1 to 3-N is supplied the common local oscillator frequency from the local oscillator 4. As a result, OFDM signals over the same frequency are transmitted by the transmitting antennas 5-1 to 5-N, and hence the phase noise and the frequency variation of the transmitted OFDM signal are all the same. Consequently, the respective receiving antennas 8-1 to 8-N receive the OFDM signals from the respective transmitting antennas 5-1 to 5-N at the same frequency.

On the other hand, in the OFDM signal receiving device also, to the frequency converters 9-1 to 9-N is supplied the common local oscillator frequency from the local oscillator 10. Therefore the phase noise and the frequency variation of the received OFDM signals are all the same. As a result, the respective transmission OFDM signals come to have a common frequency variation, and hence interference cancellation and coherent detection between the respective subcarriers can be simplified.

The OFDM signals which have been frequency converted by the frequency converters 3-1 to 3-N are respectively input to the transmitting antennas 5-1 to 5-N, and are transmitted towards to the OFDM signal receiving device. In the OFDM signal receiving device, the N OFDM signals transmitted from the transmitting antennas 5-1 to 5-N are respectively received by each of the receiving antennas 8-1 to 8-N as signals which have been superposed in space.

The received signals are frequency converted by the frequency converters 9-1 to 9-N to a frequency suitable for demodulation, and are Fourier transformed in the fast Fourier transformers 11-1 to 11-N. Here the OFDM symbol timing of the OFDM signals for Fourier transformation is supplied from an OFDM symbol timing regenerator 12 so that all become common.

Figure 2:
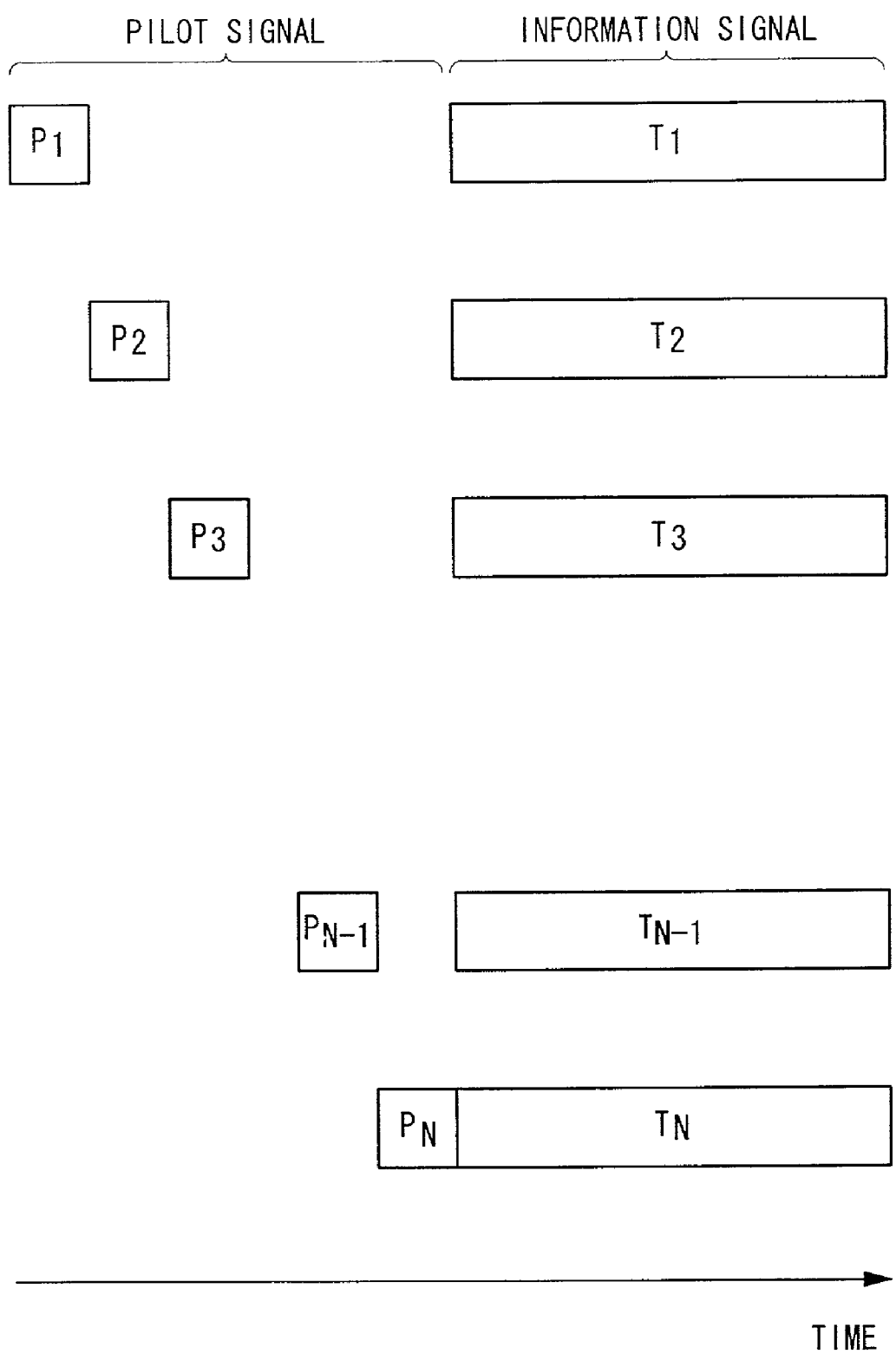
FIG. 2 is a timing chart showing an example of a transmission OFDM signal containing a pilot signal in the first embodiment.

For a method of realizing the OFDM symbol timing regenerator 12, various methods are put forward where an extra preamble for symbol timing regeneration is transmitted separately to regenerate the OFDM symbol timing. An example of an OFDM modulation signal transmitted from the transmitting antennas 5-1 to 5-N is shown in FIG. 2. In the example of FIG. 2, for simplicity, pilot signals $P_1$, $P_2$, ..., $P_N$ are transmitted so as not to overlap each other on the time domain.

On the other hand, the OFDM signals which have been modulated by the transmission information signals $T_1$ to $T_N$ are transmitted so as to overlap on the time domain. The pilot signals $P_1$, $P_2$, ..., $P_N$ are used in order to find the propagation coefficient matrix from the transmitting antenna 5-i to the receiving antenna 8-j. For the pilot signals $P_1$ to $P_N$, if in general the amplitudes of each of the subcarriers are all made the same, then for the subcarriers, and for each of the systems of the receiving antennas the processing can be same. Hence signal processing can be facilitated.

When these pilot signals are used, each of the subcarriers of the OFDM signal is a signal of a constant phase with a constant amplitude within the OFDM symbol. Therefore the propagation coefficient matrix from the transmitting antenna 5-i to the receiving antenna 8-j is obtained as hereunder.

The pilot signal $P_1$ transmitted from the transmitting antenna 5-i is received from the receiving antennas 8-1 to 8-N. These received pilot signals are frequency converted in the frequency converters 9-1 to 9-N, and then transmitted to the N fast Fourier transformers 11-1 to 11-N.

In the fast Fourier transformers 11-1 to 11-N, the received pilot signal is separated for each of the respective subcarriers. By detecting the amplitude and phase of these respective received subcarrier signals, the propagation coefficients for each of the subcarriers can be measured as complex numbers.

The propagation coefficients of the subcarriers transmitted from the transmitting antenna 5-i and received by the receiving antenna 8-j is obtained as a complex number $s_{i,j}$. Here the complex number $s_{i,j}$ being the propagation coefficients for each of these subcarriers.

If the subcarrier number of the OFDM signal is M, the propagation coefficients from the transmitting antenna 5-i to the receiving antenna 8-j is expressed by the set of complex numbers $s_{i,j}$ for each subcarrier, that is the M complex numbers $s_{i,j}$. (N×N) propagation coefficient matrix are obtained corresponding to the product of the number N of transmitting antennas and the number N of receiving antennas.

That is, from (M×N×N) complex numbers, the propagation coefficient matrix for the combination of all of the transmitting antennas 5-1 to 5-N and the receiving antennas 8-1 to 8-N can be obtained.

Here focusing on one particular subcarrier, the transmitted signals from the transmitting antennas 5-1 to 5-N are expressed by $(t_1, t_2, \ldots, t_N)$ and the received signals received by the receiving antennas 8-1 to 8-N are expressed by $(r_1, r_2, \ldots, r_N)$.

If the propagation coefficient of the i th subcarrier is expressed by a matrix $S^i$ corresponding to a combination of the transmitting antennas 5-1 to 5-N and the receiving antennas 8-1 to 8-N, then this can be expressed by a matrix of (N×N) elements. This matrix $S^i$ is given by the following equation.

$$S^i = \begin{pmatrix} S_{1,1} & S_{1,2} & \cdots & S_{1,N-1} & S_{1,N} \\ S_{2,1} & S_{2,2} & \cdots & \vdots & \vdots \\ \vdots & \vdots & \cdots & \vdots & \vdots \\ S_{N-1,1} & \vdots & \cdots & \vdots & S_{N-1,N} \\ S_{N,1} & \vdots & \cdots & S_{N,N-1} & S_{N,N} \end{pmatrix} \quad (3)$$

Focusing on the i th subcarrier, the received signals $(r_1, r_2, \ldots, r_N)$ received by the receiving antennas 8-1 to 8-N are expressed by the following equation using the transmitted signals $(t_1, t_2, \ldots, t_N)$ transmitted by the transmitting antennas 5-1 to 5-N and the matrix $S^i$.

$$\begin{pmatrix} r_1 \\ r_2 \\ \vdots \\ r_N \end{pmatrix} = S^i \cdot \begin{pmatrix} t_1 \\ t_2 \\ \vdots \\ t_N \end{pmatrix} \quad (4)$$

The OFDM signals transmitted from the transmitting antennas 5-1 to 5-N are superposed each other and received at the receiving antennas 8-1 to 8-N. Therefore in order to demodulate these, it is necessary to reconstruct the original transmitted signals $(t_1, t_2, \ldots, t_N)$ from the received signals $(r_1, r_2, \ldots, r_N)$. To reconstruct the transmitted signals $(t_1, t_2, \ldots, t_N)$ from the received signals $(r_1, r_2, \ldots, r_N)$, the inverse matrix $(S^i)^{-1}$ of $S^i$ may be calculated for each subcarrier, and the following equation calculation performed for each subcarrier.

$$\begin{pmatrix} t_1 \\ t_2 \\ \vdots \\ t_N \end{pmatrix} = (S^i)^{-1} \cdot \begin{pmatrix} r_1 \\ r_2 \\ \vdots \\ r_N \end{pmatrix} \quad (5)$$

In an inverse matrix computer 13, in all the combinations of the N transmitting antennas 5-1 to 5-N and the N receiving antennas 8-1 to 8-N, the amplitude and phase of each received pilot signal are normalized by the amplitude and phase of each known pilot signal in all subcarriers. In this way, the (N×N) matrix $S^i$ with elements of complex numbers being the propagation coefficients for each of the i th subcarriers is calculated, finally, the inverse matrix $(S^i)^{-1}$ is calculated and stored.

Using the inverse matrix $(S^i)^{-1}$ obtained for each of these i th subcarriers, then in a subcarrier demodulator 14, computation of $((r_{i1}, r_{i2}, \ldots, r_{iN}) \times (S^i)^{-1})$ is performed with respect to the $(r_{i1}, r_{i2}, \ldots, r_{iN})$ being the i th subcarrier of the respective received OFDM signals being the output of the N fast Fourier transformers 11-1 to 11-N. As a result, the amplitude-phase output based on the pilot signal which becomes the reference for the amplitude-phase is obtained, and this becomes the demodulation output which is coherent detected for each subcarrier.

In this way, by performing computation of $((r_{i1}, r_{i2}, \ldots, r_{iN}) \times (S^i)^{-1})$, the demodulation outputs of the $(t_{i1}, t_{i2}, \ldots, t_{iN})$ that are the i th subcarrier of each transmission OFDM signal can be obtained. By performing this computation for all of the subcarriers, the transmission information signals $T_1$ to $T_N$ can be demodulated.

In this way, by measuring the amplitude and phase for each of the subcarriers using the pilot signal, the propagation coefficient matrix $S^i$ for restoring the transmitted signals $(t_{i1}, t_{i2}, \ldots, t_{iN})$ from the received signals $(r_{i1}, r_{i2}, \ldots, r_{iN})$ is obtained, and the inverse matrix $(S^1)^{-1}$ thereof is calculated, and by performing computation of $((r_{i1}, r_{i2}, \ldots, r_{iN}) \times (S^i)^{-1})$, the transmitted signals $(t_{i1}, t_{i2}, \ldots, t_{iN})$ can be restored, and the demodulation output obtained.

Measurement of the propagation coefficient matrix by the inverse matrix computer 13 will be described in more detail as hereunder.

When the propagation response is estimated, it is necessary to be able to respectively separate the pilot signals $P_1$, $P_2 \ldots, P_N$ in the OFDM signal receiving device. However, as described above, this is realized in the OFDM signal transmitting device, by transmitting the pilot signals $P_1$, $P_2 \ldots, P_N$ which are shifted the transmission timing to be not overlapped on the same time. As the propagation coefficient matrix between transmitting antenna 1 (l=1, 2 ..., N) and the receiving antenna m (m=1, 2 ..., N) is expressed in $S^1$, the propagation coefficient matrix between the transmitting antennas and the receiving antennas is expressed in equation (6), as the above mention.

$$S^i = \begin{pmatrix} s^i_{11} & s^i_{12} & \cdots & s^i_{1N} \\ s^i_{21} & s^i_{22} & \cdots & s^i_{2N} \\ \vdots & \vdots & \ddots & \vdots \\ s^i_{N1} & s^i_{N2} & \cdots & s^i_{NN} \end{pmatrix} \quad (6)$$

For example, considering the case that the pilot signal is transmitted from only antenna n ($1 \leq n \leq N$), while the pilot signals are not transmitted from the other antennas, the propagation coefficients are obtained only for all the components of the n rows by operating equations (7) and (8).

$$(0 \; \cdots \; 0 \; P^i_n \; 0 \; \cdots \; 0) \cdot \begin{pmatrix} s^i_{11} & s^i_{12} & \cdots & s^i_{1N} \\ s^i_{21} & s^i_{22} & \cdots & s^i_{2N} \\ \vdots & \vdots & \ddots & \vdots \\ s^i_{N1} & s^i_{N2} & \cdots & s^i_{NN} \end{pmatrix} = \begin{pmatrix} P^i_n s^i_{n1} \\ P^i_n s^i_{n2} \\ \vdots \\ P^i_n s^i_{nN} \end{pmatrix} = \begin{pmatrix} r^i_1 \\ r^i_2 \\ \vdots \\ r^i_N \end{pmatrix} \quad (7)$$

$$\begin{pmatrix} s_{n1}^i \\ s_{n2}^i \\ \vdots \\ s_{nN}^i \end{pmatrix} = \begin{pmatrix} r_1^i / P_n^i \\ r_2^i / P_n^i \\ \vdots \\ r_N^i / P_n^i \end{pmatrix} \quad (8)$$

When the above operation is performed once, estimation of the N propagation coefficients between the transmitting antenna n and all of the receiving antennas is performed. In the case that the numbers of transmitting antennas and the receiving antennas are both N, N×N kinds of propagation paths between the transmitting and receiving antennas exist. Estimation of the propagation coefficients for all of the propagation paths can be performed by repeating N times a pattern that the pilot signal is transmitted from only one antenna, while the pilot signals are not transmitted from the other antennas.

In this way, according to the present embodiment, the cancellation of interference between channels and the restoration of the transmitted signals $(t_{i1}, t_{i2}, \ldots, t_{iN})$ in the receiver can be achieved only by the computation of $((r_{i1}, r_{i2}, \ldots, r_{iN}) \times (S^i)^{-1})$.

Furthermore, as described here, in the present embodiment, since there is no need to perform complicated signal processing of an equalizer, and the control is not feedback but feed forward. Therefore, stable operation can be maintained even under a severe multipath fading environment.

Moreover, when the inverse matrix of the propagation coefficient matrix is estimated by using the known pilot signal, the estimation speed can be faster than by tracking for estimation. Therefore the present embodiment is ideal for use to regenerate signals instantaneously, in such as a wireless LAN or a PDC (Personal Digital Cellular).

It was described that OFDM signals are transmitted from the equipment with the OFDM transmitting device (the lower side in FIG. 1) to the equipment with the OFDM receiving device (the upper side in FIG. 1). However the case for transmitting from the latter equipment to the former equipment involves exactly the same operation. That is, the configuration related to the transmitting and receiving of the OFDM signal is symmetrical for all of the equipment, and both of the former equipment and the later equipment comprise the OFDM transmitting device and the OFDM receiving device. This is also the same in describing the later embodiments, unless particularly mentioned.

Second Embodiment

Figure 3:
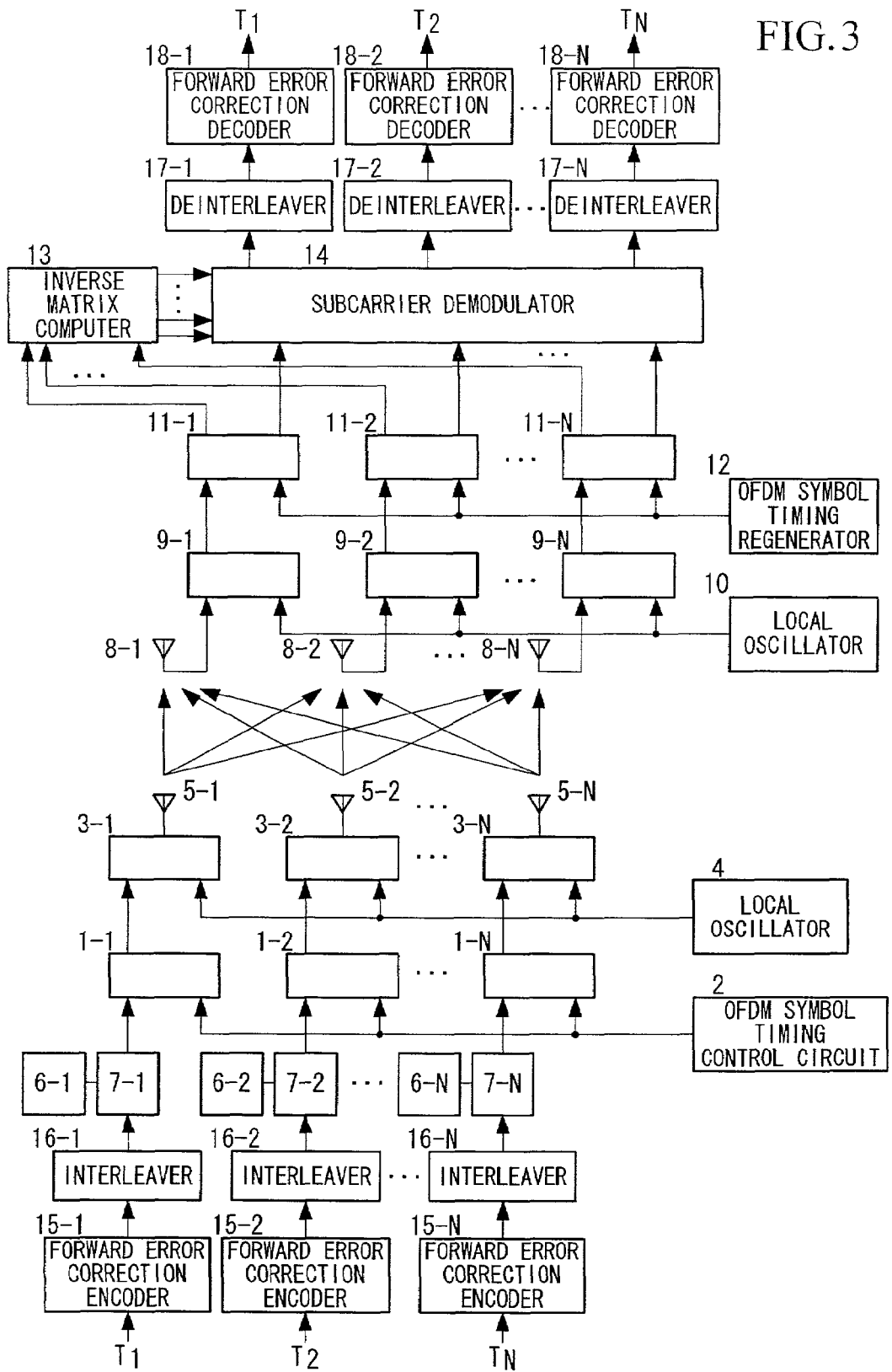
FIG. 3 is a block diagram showing the construction of an OFDM signal communication system of a second embodiment.

Next is a description of a second embodiment of the present invention using FIG. 3. In order to improve the performance under fading, in general, OFDM is used combining forward error correction and interleaving. An embodiment with forward error correction and interleaving combined is shown in FIG. 3.

In FIG. 3, the transmission information signals $T_1$ to $T_N$ are subjected to be encoded for forward error correction in forward error correction encoders 15-1 to 15-N, and are then subjected to be interleaved in interleavers 16-1 to 16-N in the subcarrier domain, that is in the frequency domain. This is performed in order to avoid successive errors due to depression of the level (notching) in a certain frequency neighborhood, and obtain large performance improvement by forward error correction.

In the receiver, the demodulation output is subjected to be deinterleaved, as a reverse operation to the interleaving of the transmitter, in deinterleavers 17-1 to 17-N, and is then decoded by forward error correction decoders 18-1 to 18-N.

This embodiment is a modified example of the first embodiment, and includes the same elements as in the first embodiment. Elements other than those mentioned above are the same as for the first embodiment and description is omitted.

Third Embodiment

Figure 4A:
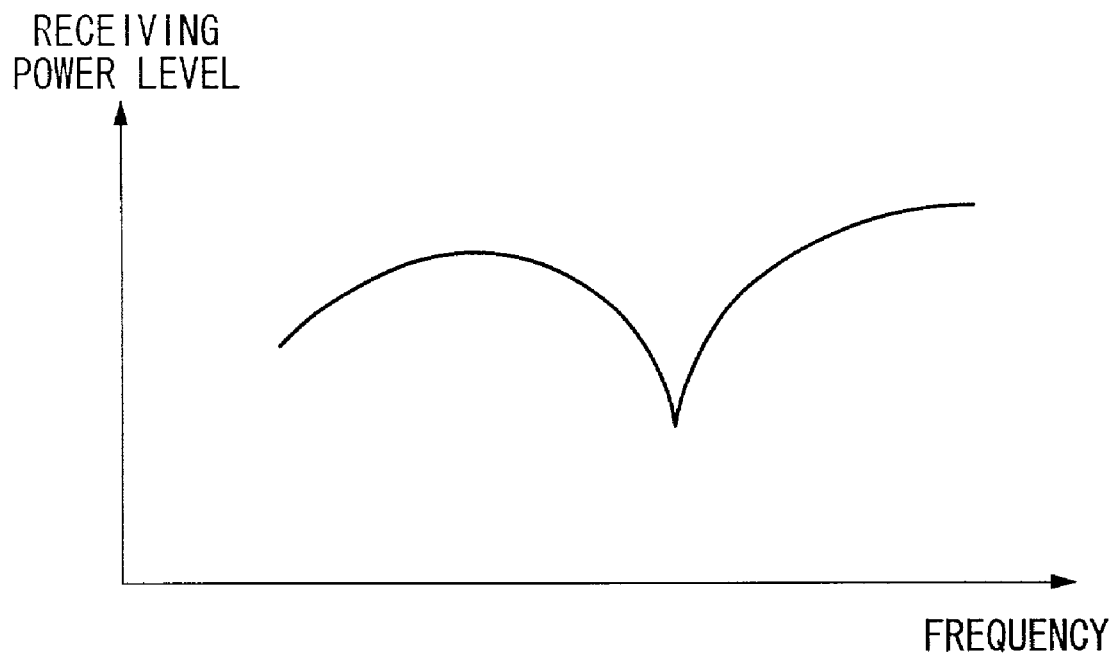
FIG. 4A is a graph showing a characteristic example of short delay fading.
Figure 4B:
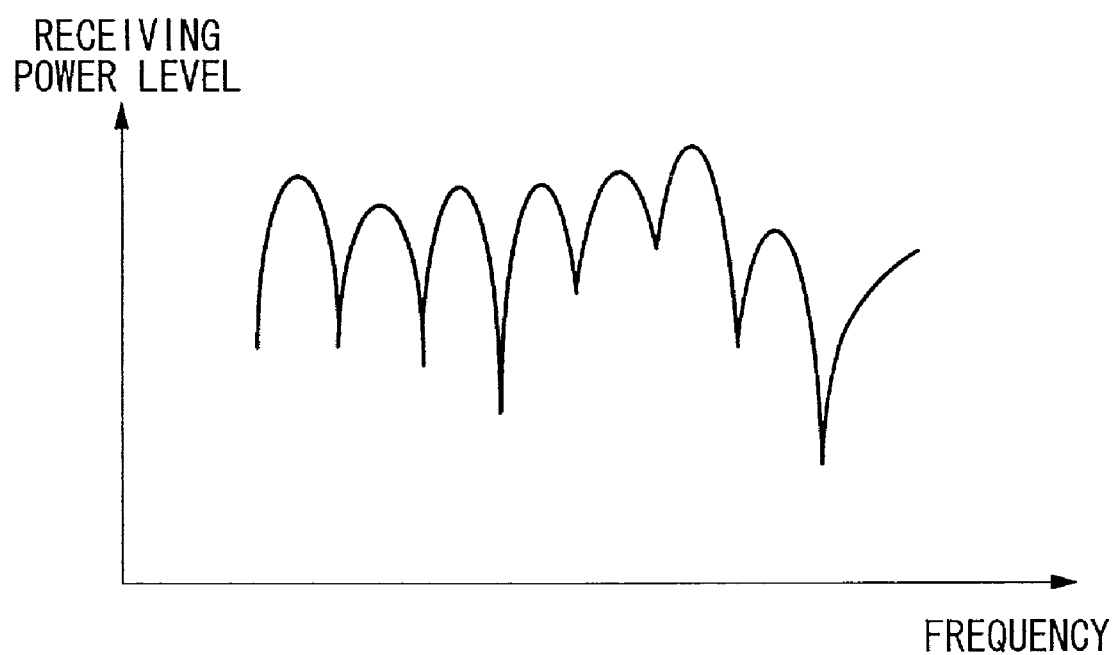
FIG. 4B is a graph showing a characteristic example of long delay fading.

In the construction of FIG. 3, in the case of comparatively long delay fading (refer to FIG. 4B), successive errors do not occur and hence satisfactory characteristics are obtained. However in the case of short delay fading, the fading period on the frequency domain is long as shown in FIG. 4A, and hence the notch becomes wide, and in this part, successive errors are likely to occur, and forward error correction gain is small.

The third embodiment of the present invention will be explained with reference to FIG. 5. This embodiment is an embodiment for improving the lowering of the forward error correction gain as described above.

Figure 5:
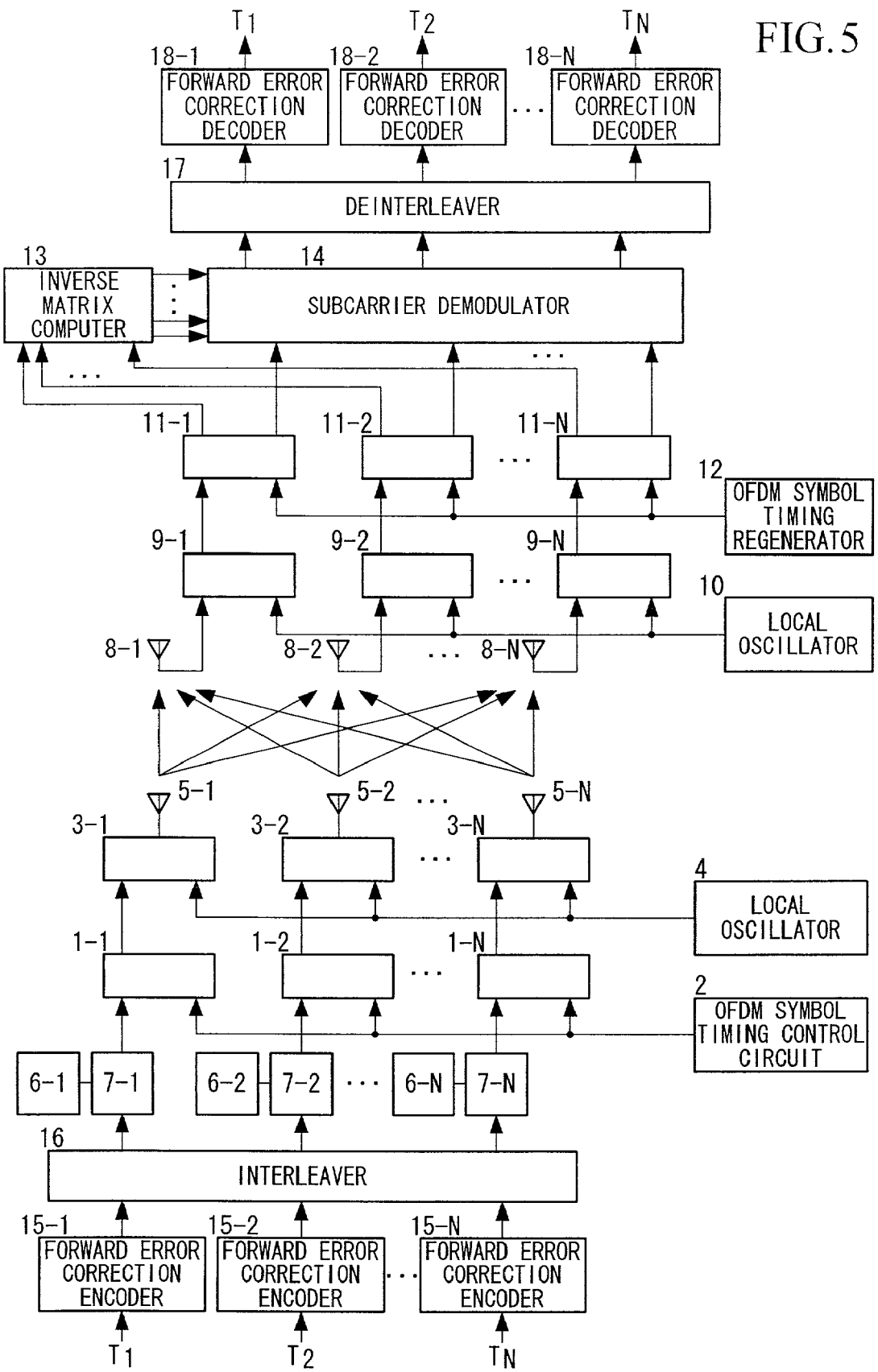
FIG. 5 is a block diagram showing a construction of an OFDM signal communication system of a third embodiment.

The transmission information signals $T_1$ to $T_N$ are subjected to be encoded for error correction encoding in the forward error correction encoders 15-1 to 15-N as shown in FIG. 5, and are then interleaved both in the subcarrier domain (frequency domain) and in the transmitting antenna domain (space domain) in the interleaver 16, to thereby affect interleaving.

On the receiver, the demodulation output is subjected to be deinterleaved, as a reverse operation to the interleaving of the transmitter, in the deinterleaver 17, and is then decoded by the forward error correction decoders 18-1 to 18-N.

By doing this, interleaving is performed by combining the antenna domain and the frequency domain. Hence in addition to a frequency diversity effect, an antenna (space) diversity effect is also obtained. Therefore the occurrence of successive errors in the short delay fading is also reduced, and the drop in forward error correction encoding gain can be reduced, so that high quality can be achieved.

The output from one forward error correction coder is interleaved both in the subcarrier domain and the transmitting antenna domain in the interleaver 16, and on the receiver, deinterleaving is performed in the deinterleaver 17, and the same effect is obtained in the case of decoding with one forward error correction decoder.

Fourth Embodiment

Figure 6:
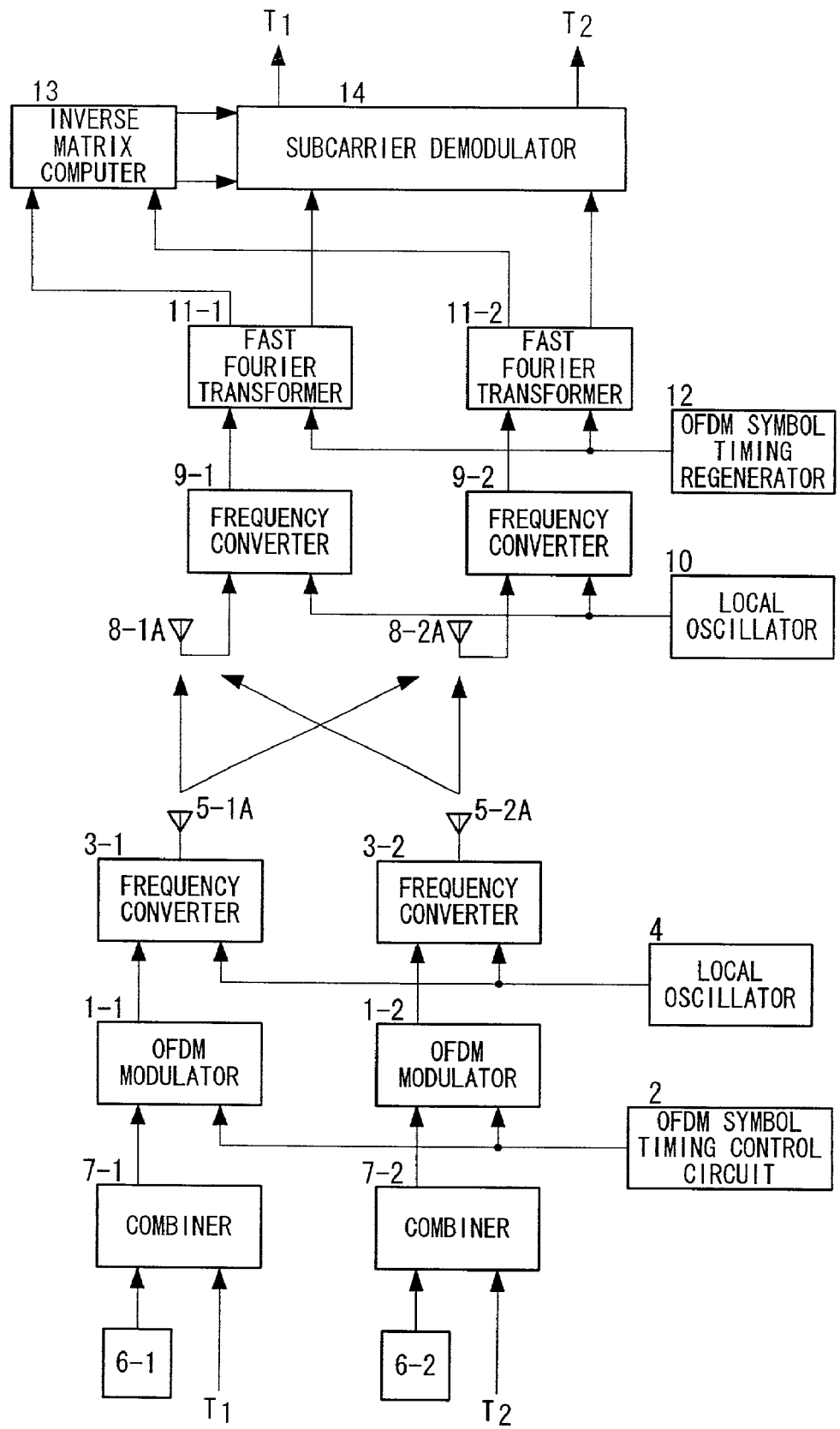
FIG. 6 is a block diagram showing a construction of an OFDM signal communication system of a fourth embodiment.

Next is a description of a fourth embodiment of the present invention with reference to FIG. 6. As shown in FIG. 6, in this embodiment, the number of transmitting antennas is two, and the number of receiving antennas is also two.

On the transmitter, the transmitting antennas 5-1A and 5-2A are made different polarization, for example, a vertical polarization wave and a horizontal polarization wave. Furthermore, on the receiver, the receiving antennas 8-1A and 8-2A are similarly made different polarization, for example a vertical polarization wave and a horizontal polarization wave respectively.

In this case, the propagation path between the transmitting antenna 5-1A and the receiving antenna 8-1A and the propagation path between the transmitting antenna 5-2A and the receiving antenna 8-2A can be separated by the orthogonal polarization discrimination of the transmitting/receiving antennas. Here the propagation coefficient matrix $S^i$ of the i th subcarrier is made a matrix of (2×2) elements, as given by the following equation.

$$S^i = \begin{pmatrix} s_{11} & s_{12} \\ s_{21} & s_{22} \end{pmatrix} \qquad (9)$$

In this matrix, the propagation paths can be separated by the orthogonal polarization discrimination of the transmitting/receiving antennas. In other words, the absolute values of $S_{11}$, $S_{22}$ is much larger than the absolute values of $S_{12}$, $S_{21}$. Consequently, in the case of calculating the inverse matrix $(S^i)^{-1}$ with respect to $S^i$, since the determinant in the inverse matrix hardly equals zero, the computation of $(r_1, r_2) \times (S^i)^{-1}$ hardly diverges with respect to $(r_1, r_2)$ that are the set of the i th subcarrier of the OFDM signals $R_1$, $R_2$ received for each of the respective antennas.

Consequently, polarization discrimination of transmitted signals $(t_1, t_2)$ in the receiver can be made large, so that stable communication becomes possible. Furthermore, considering that radio communication service areas are expanded by cellular configuration using these devices, interference between the cells, whose polarizations are different each other, can be reduced by the orthogonal polarization discrimination.

Consequently, even if the transmission power is increased twice and the transmission capacity is increased, the interference power can be reduced by the polarization discrimination with respect to the different polarizations. Hence the interference power to each polarization does not increase. Therefore, when radio communication services areas are expanded by cellular configuration, the interference power does not increase, and hence the twice planar capacity of the system can be obtained by using the present embodiment compared to that by using the same polarization.

The technological concepts, which use orthogonal polarization wave as with this embodiment, can be applied to all of the embodiments including the above described first through third embodiments.

Fifth Embodiment

Figure 7:
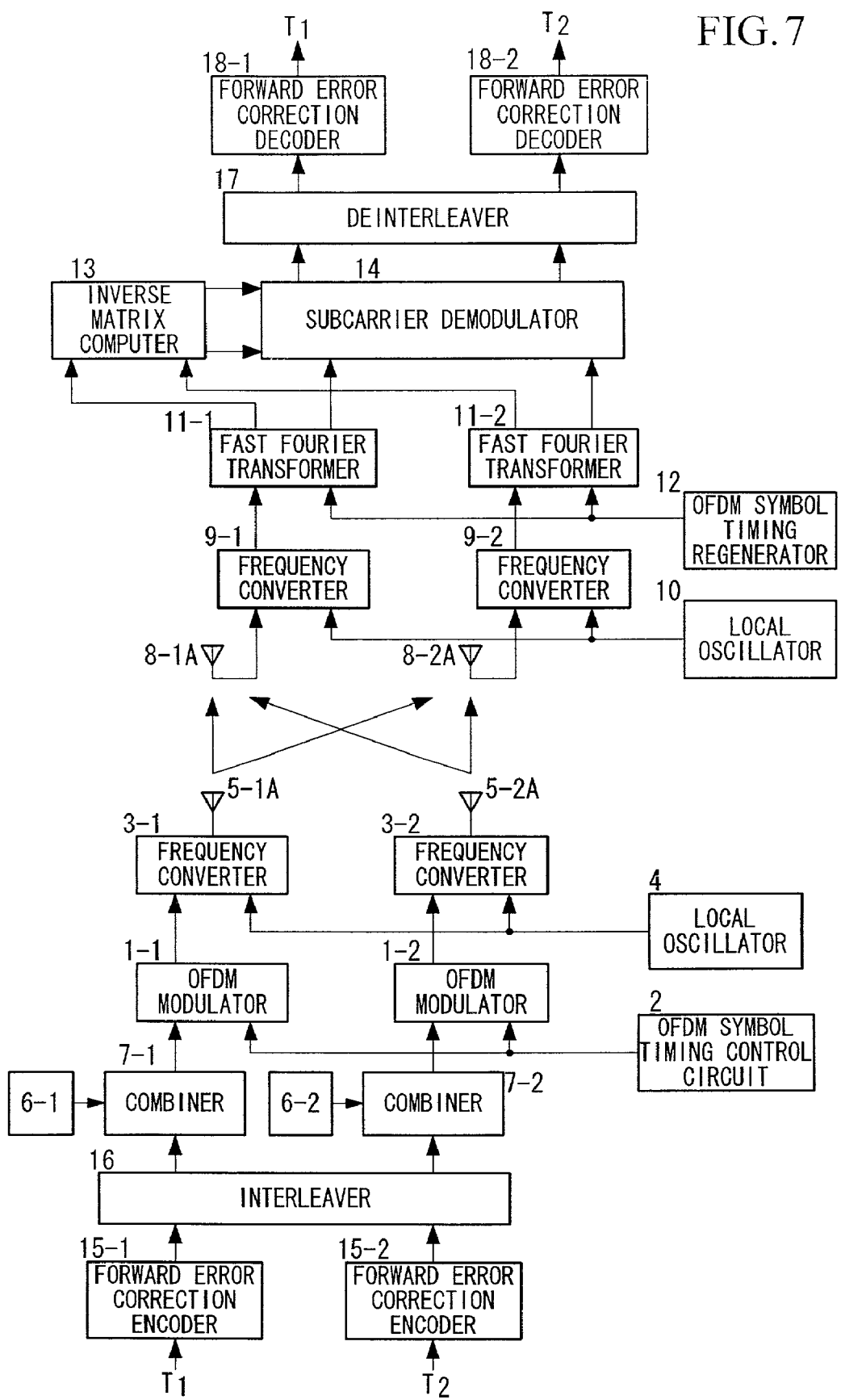
FIG. 7 is a block diagram showing a construction of an OFDM signal communication system of a fifth embodiment.

The next is a description of a fifth embodiment of the present invention with reference to FIG. 7. As shown in FIG. 7, in this embodiment, the number of transmitting antennas is two, and the number of receiving antennas is also two.

On the transmitter, the transmitting antennas 5-1A and 5-2A have different polarization each other, for example, a vertical polarization wave and a horizontal polarization wave. Furthermore, in the receiver, the receiving antennas 8-1A and 8-2A similarly have different polarization each other, for example a vertical polarization wave and a horizontal polarization wave respectively.

In this case, the propagation path between the transmitting antenna 5-1A and the receiving antenna 8-1A, and the propagation path between the transmitting antenna 5-2A and the receiving antenna 8-2A can be separated due to the orthogonal polarization discrimination of the transmitting/receiving antennas.

According to this embodiment, polarization discrimination of the transmitted signals $(t_1, t_2)$ in the receiver can be larger. In addition, since the polarization of the transmitting and receiving antennas are different each other, as with the case of the embodiment of FIG. 5, even in the case of comparatively short delay fading, in addition to the proper frequency diversity effect in the OFDM, the correlation coefficient of the diversity due to the antenna (space) and the polarization can be smaller. Consequently, a large diversity effect can be obtained, the occurrence of successive errors reduced, and the reduction in forward error correction encoding gain can be smaller. Hence a high quality can be achieved.

Sixth Embodiment

Figure 8:
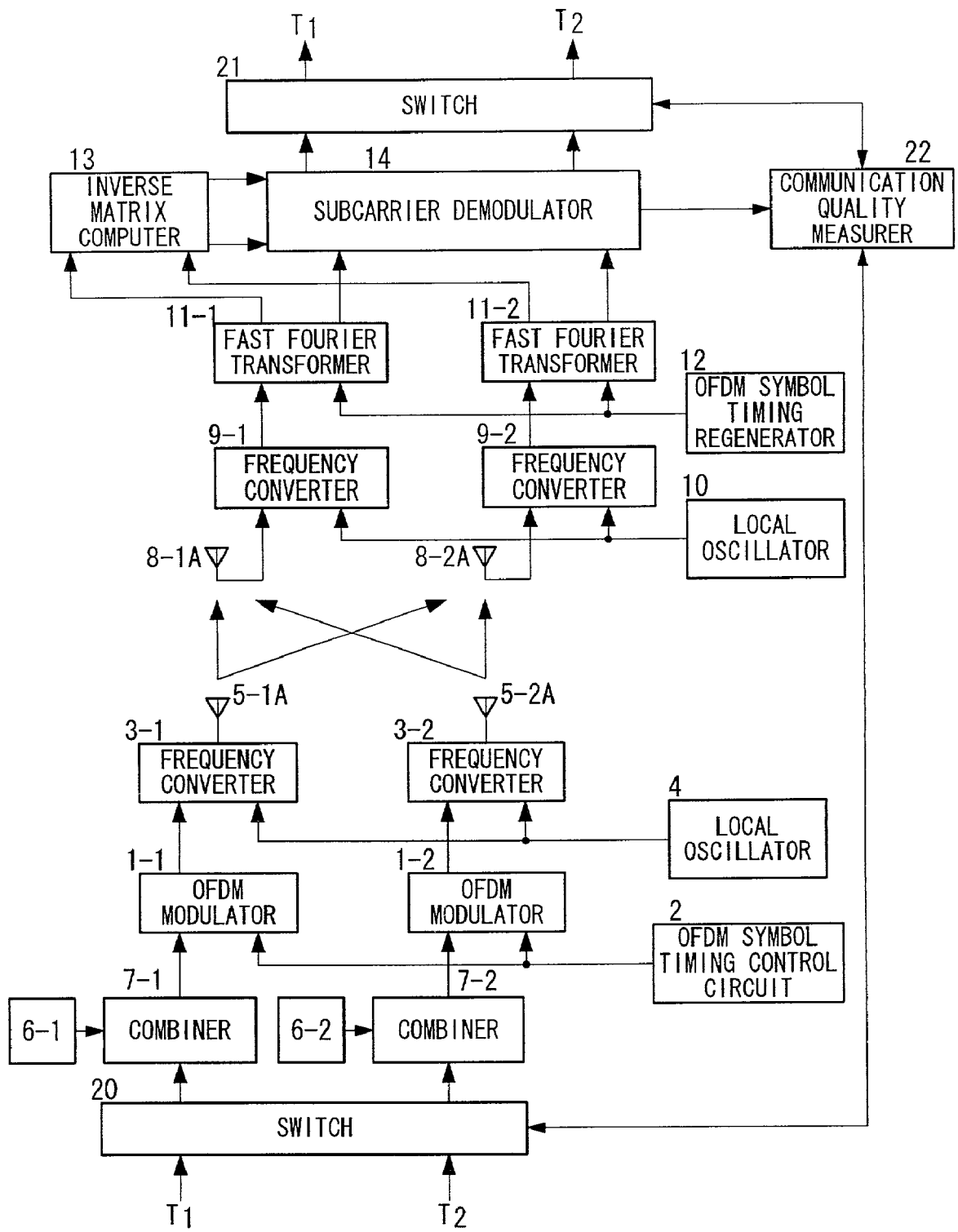
FIG. 8 is a block diagram showing a construction of an OFDM signal communication system of a sixth embodiment.

Next is a description of a sixth embodiment of the present invention using FIG. 8. In this embodiment, as with the embodiment of FIG. 6, the number of transmitting antennas is two and the number of receiving antennas is two. Moreover, on the transmitter, the polarization of the transmitting antenna 5-1A and the transmitting antenna 5-2A are made different polarizations, for example, a vertical polarization wave and a horizontal polarization wave. Furthermore, on the receiver, the receiving antenna 8-1A and the receiving antenna 8-2A are similarly made different polarizations, for example a vertical polarization wave and a horizontal polarization wave respectively.

According to this, since different polarization is used, the effect of polarization diversity can be expected, and an improvement in communication quality can be achieved. In this embodiment, switching is performed for the case where the transmission information signals are distributed and the same transmission information signals are input to the OFDM modulators 1-1 and 1-2, and the case where the transmission information signals $T_1$, $T_2$ which have been serial to parallel transformed are input. Here, in the case of sending the transmission information signals which have been serial to parallel transformed, the information transmission speed is doubled compared to the case of sending the same transmission information signals.

On the other hand, in the case of sending the same transmission information signals, then on the receiver the two subcarrier demodulation outputs are added or the one with the larger reception power of the two subcarrier modulation outputs is selected. Therefore, the diversity effect can be obtained, and an increase in quality can be achieved.

In the present embodiment, the reception quality is measured in the communication quality measurer 22 for measuring reception quality. In a first switch 20, if the reception quality is lower than a threshold for quality judgement, the same transmission information signal is sent to the OFDM modulators 1-1 and 1-2, while if higher, the serial to parallel transformed transmission information signals $T_1$, $T_2$ are sent to the OPDM modulators 1-1 and 1-2.

As criteria for measuring the reception quality, various parameters are considered, and as one example reception power and error rate are given. In order to measure error rate, a certain amount of observation time is necessary. Therefore in the case where it is necessary to measure the instantaneous reception quality, reception power is used. On the other hand, in the case of measuring reception quality more accurately, the error rate is used. In this case, reception quality is judged based on the number of error bits within a predetermined observation time, or on the number of error packets.

On the other hand, on the receiver, in a second switch 21, if the reception quality is lower than a threshold for quality judgment, the two subcarrier demodulation outputs are added or the one with the larger reception power of the two subcarrier modulation outputs is selected. On the other hand, if the reception quality is higher than the threshold, the second switch 21 outputs the demodulation output directly.

The switching control of the first switch 20 and the second switch 21 is performed based on the measurement results of the communication quality measurer 22.

As a result, although the transmission speed becomes 1/2, if the same transmission information signal is transmitted by two OFDM modulators, the polarization diversity effect is obtained and hence a high quality is achieved. On the other hand, in the case where the propagation environment is good, then as with the embodiment of FIG. 6, OFDM signals with different polarization can be separated. Therefore, different transmission information can be transmitted and twice the transmission capacity can be transmitted without increasing the frequency band. In this manner, the quality and the transmission capacity can be adaptively controlled corresponding to the transmission environment or the reception quality.

Normally, due to diversity, it is necessary to newly provide an antenna. However with this embodiment, in order to form the MIMO channel, from the beginning, a plurality of antennas are respectively provided for the transmission and the reception. Therefore, it is not necessary to newly provide an antenna as is normal.

In the abovementioned first through sixth embodiments, in the OFDM transmitting device, the transmission OFDM symbol timing of the respective OFDM modulators and the local oscillator for the frequency converters are common, and a pilot signal is sent in order to estimate the propagation coefficient between the transmitting/receiving antennas. Furthermore, in the OFDM receiving device, the local oscillator for the frequency converters is made common, and based on the outputs from the fast Fourier transformers, for the N×N combinations of the transmitting/receiving antennas, the reception amplitude and phase of the pilot signal for each of the respective subcarriers are detected to measure the propagation coefficient.

Based on this, the inverse matrix $(S^i)^{-1}$ for the N×N matrix $S^i$ is calculated for each subcarrier, and based on the outputs from the fast Fourier transformers, by performing computation of the $((r_1, r_2, \ldots, r_N) \times (S^i)^{-1})$ with respect to the received signals $(r_1, r_2, \ldots, r_N)$ for each of the subcarriers, the amplitude and phase of $(t_1, t_2, \ldots, t_N)$ being the i th subcarrier of the transmission OFDM signal can be estimated. Consequently, the signal transmitting device for the MIMO channel is realized by means of the OFDM method without using equalizers.

Seventh Embodiment

Figure 9:
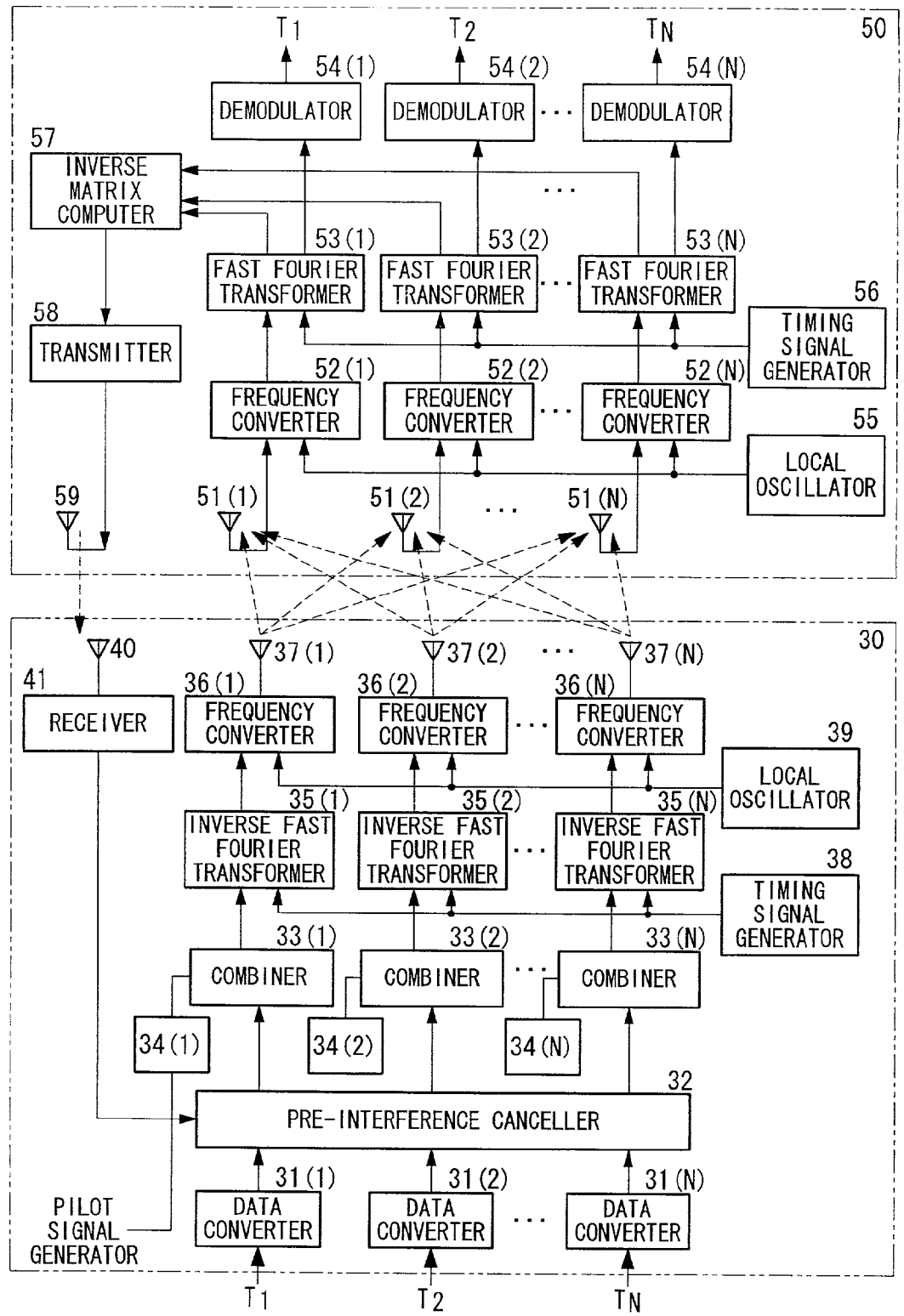
FIG. 9 is a block diagram showing a construction of an OFDM signal communication system of a seventh embodiment.

Next is a description of a seventh embodiment of the present invention with reference to FIG. 9. FIG. 9 is a block diagram showing the construction of an OFDM signal communication system of this embodiment.

In this embodiment, the transmitting antenna, the OFDM signal transmitting device, the receiving antenna, the OFDM signal receiving device, the inverse matrix computer, and the interference canceller of the claims correspond respectively to an antenna 37, an OFDM signal transmitting device 30, an antenna 51, an OFDM signal receiving device 50, an inverse matrix computer 57 and a pre-interference canceller 32.

Furthermore, the pilot signal generator, the data converter, the inverse matrix information receiver, the interference canceller, the combiner, the fast Fourier transformer, the symbol timing generator, the transmission frequency converter and the transmission local oscillator of the OFDM signal transmitting device in the claims respectively correspond to a pilot signal generator 34, a data converter 31, a receiver 41, the pre-interference canceller 32, a combiner 33, a fast Fourier transformer 35, a timing signal generator 38, a frequency converter 36 and a local oscillator 39. Moreover, the receiving frequency converter, the local oscillator for receiver, the fast Fourier transformer, the demodulator, the timing signal generator, the inverse matrix computer and the inverse matrix information transmitter of the OFDM signal receiving device in the claims, respectively correspond to a frequency converter 52, a local oscillator 55, a fast Fourier transformer 53, a demodulator 54, a timing signal generator 56, the inverse matrix computer 57 and a transmitter 58.

The OFDM signal communication system shown in FIG. 9 is constructed from the OFDM signal transmitting device 30 and the OFDM signal receiving device 50. In the case where this OFDM signal communication system is used in mobile communication or the like, then it is preferable the OFDM signal transmitting device 30 is mounted on the base station side, and the OFDM signal receiving device 50 is mounted on the mobile terminal on the user side.

As shown in FIG. 9, the OFDM signal transmitting device 30 is furnished with a data converter 31, the pre-interference canceller 32, the combiner 33, the pilot signal generator 34, the inverse fast Fourier transformer 35, the frequency converter 36, the antenna 37, the timing signal generator 38, the local oscillator 39, a receiving antenna 40 and the receiver 41.

Furthermore, the data converter 31, the combiner 33, the pilot signal generator 34, the inverse fast Fourier transformer 35, the frequency converter 36 and the antenna 37 are respectively furnished as N (a plurality).

On the other hand, the OFDM signal receiving device 50 is furnished with an antenna 51, a frequency converter 52, a fast Fourier transformer 53, a demodulator 54, a local oscillator 55, a timing signal generator 56, an inverse matrix computer 57, a transmitter 58 and a transmitting antenna 59.

Moreover, the antenna 51, the frequency converter 52, the fast Fourier transformer 53 and the demodulator 54 are respectively furnished as N (a plurality).

The number of elements N in the OFDM signal transmitting device 30 and the number of elements N in the OFDM signal receiving device 50 are the same. That is to say, m order to obtain a later described inverse matrix, it is necessary that the antenna number N on the transmitter and the antenna number N on the receiver are the same.

The data converters 31 (1) to 31 (N) convert the respective input transmission data $T_1$ to $T_N$ into OFDM symbols. The respective data converters 31 incorporate therein a modulator for modulating the data sequence input as serial signals into respective symbols (for example a modulator such as a BPSK (Binary Phase-Shift Keying), an QPSK (Quadrature Phase-Shift Keying) or an ASK (Amplitude-Shift Keying)), and a serial to parallel transformer for converting the symbols into parallel signals. That is to say, the symbols corresponding to the input transmission data are output in parallel signal form from the data converter 31.

The receiver 41 receives the information of the inverse matrix transmitted from the OFDM signal receiving device 50 via the receiving antenna 40 to acquire the inverse matrix.

The pre-interference canceller 32 uses the inverse matrix acquired by the receiver 41 to perform pre-processing for interference cancellation. More specifically, the inverse matrix is multiplied by all of the respective subcarrier components $(m_1, m_2, \ldots, m_n)$ of the OFDM symbols $(M_1, M_2, \ldots, M_n)$ which the data converters 31 (1) to 31 (N) output for the transmission data $T_1$ to $T_N$.

The N pilot signal generators 34 (1) to 34 (N) output known pilot signals which are different to each other.

Each of the combiners 33 (1) to 33 (N) outputs a signal for which the OFDM symbol output from the pre-interference canceller 32 and the pilot signal output from the pilot signal generators 34 (1) to 34 (N) are combined on a time domain.

Each of the inverse fast Fourier transformers 35 (1) to 35 (N) executes inverse fast Fourier transformation (IFFT) processing on the signals output from the combiners 33 (1) to 33 (N). A common symbol timing signal from the timing signal generator 38 is supplied to the N inverse fast Fourier transformers 35 (1) to 35 (N).

The OFDM signals which each of the fast Fourier transformers 35 (1) to 35 (N) output are frequency converted to radio frequency by the frequency converters 36 (1) to 36 (N). A common local oscillator frequency from the local oscillator 39 is supplied to the N frequency converters 36 (1) to 36 (N).

Consequently, from the N antennas 37 (1) to 37 (N) connected to the output of the frequency converters 36 (1) to 36 (N), the same radio frequency OFDM signals are simultaneously supplied as radio waves.

The N OFDM signals transmitted from the antennas 37 (1) to 37 (N) are superposed in space and are respectively received by the N antennas 51 (1) to 51 (N) arranged at different positions to each other on the OFDM signal receiving device 50 side.

The OFDM signals received by the antennas 51 (1) to 51 (N) pass through the respective frequency converters 52 (1) to 52 (N) and are frequency converted to OFDM signals in a relatively low frequency band suitable for signal processing. A common local oscillator frequency from the local oscillator 55 is supplied to the frequency converters 52 (1) to 52 (N).

The OFDM signals output from the frequency converters 52 (1) to 52 (N) are respectively input to the fast Fourier transformers 53 (1) to 53 (N), and subjected to fast Fourier transformation (FFT). The signals of the OFDM symbols which are output from the fast Fourier transformers 53 (1) to 53 (N) are respectively input to the demodulators 54 (1) to 54 (N) and demodulated into bit streams.

In the OFDM signal receiving device 50 shown in FIG. 9, elements corresponding to the interference canceller are not included. In this OFDM signal communication system, interference is cancelled due to the operation of the pre-interference canceller 32 on the OFDM signal transmitting device 30 side. Since it is not necessary to provide an interference canceller in the OFDM signal receiving device 50, the construction of the OFDM signal receiving device 50 is simplified and power consumption is also suppressed.

The inverse matrix computer 57 extracts the pilot signal received from the respective outputs of the fast Fourier transformers 53 (1) to 53 (N). Then, for each of the components of the subcarriers, the reception amplitude and phase of the (N×N) pilot signals corresponding to each of the combinations of the N transmitting antennas 37 (1) to 37 (N), and the N receiver side antennas 51 (1) to 51 (N) are detected. That is to say, since the pilot signals are known, then by normalizing the received pilot signals using the known pilot signals, the propagation coefficients between the transmitting antenna and the receiving antenna can be detected.

Furthermore, the inverse matrix computer 57 computes and obtains the inverse matrix $A^{i-1}$ of the matrix $A^i$ constructed by (N×N) elements with components of the detected propagation coefficients.

A transmitter 58 transmits the information for the inverse matrix $(A^i)^{-1}$ which the inverse matrix computer 57 has obtained, to the OFDM signal transmitting device 30 via the transmitting antenna 59.

In this embodiment, in order to transmit the information of the inverse matrix $(A^i)^{-1}$ which the inverse matrix computer 57 on the OFDM signal receiving device 50 side has obtained to the OFDM signal transmitting device 30, there is especially provided the transmitter 58, the transmitting antenna 59, the receiving antenna 40 and the receiver 41, however these may be substituted for by already provided elements.

For example, the antenna 51 may be used instead of the transmitting antenna 59 and the antenna 37 may be used instead of the receiving antenna 40.

Next is a more detailed description of the operation of the respective parts of the OFDM signal transmitting device 30 and the OFDM signal receiving device 50.

In the OFDM signal transmitting device 30, the known pilot signals output from the respective pilot signal generators 34 (1) to 34 (N) are combined with the transmitting signals by the respective combiners 33 (1) to 33 (N), and finally are respectively transmitted from the antennas 37 (1) to 37 (N).

Here the pilot signals respectively transmitted from the respective antennas 37 ($j$) ($j=1$ to N) are denoted by $P_j$. Each pilot signal $P_j$, similar to the transmitting data, passes through the combiner 33, the inverse fast Fourier transformer 35 and the frequency converter 36, and hence as with the transmitting data are OFDM modulated.

Furthermore, a common symbol timing signal from the timing signal generator 38 is respectively supplied to the inverse fast Fourier transformers 35 (1) to 35 (N), and a common local oscillator frequency from the local oscillator 39 is supplied to the frequency converters 36 (1) to 36 (N).

Therefore, the OFDM symbol timings of the respective subcarriers of the respective OFDM signals transmitted from the antennas 37 (1) to 37 (N) are common to all of the systems. Furthermore, the carrier signals of the OFDM signal become coherent.

Consequently, in the OFDM signal receiving device 50, it is not necessary to individually perform automatic frequency control or OFDM symbol timing regeneration for each of the respective OFDM signals. Therefore, the signal processing amount in the OFDM signal receiving device 50 is comparatively small.

The OFDM signals containing the pilot signals $P_j$ respectively transmitted from the antennas 37 ($j$) are respectively received by the antennas 51 (1) to 51 (N) inside the OFDM signal receiving device 50.

Here if the received pilot signal transmitted from the $j$ th antenna 37 ($j$) on the transmitter and received by the $k$ th ($k=1$ to N) antenna 51 ($k$) on the receiver is denoted by $P_{j,k}$, and the propagation coefficient between the transmit side antenna 37 ($j$) and the receive side antenna 51 ($k$) is denoted by $H_{j,k}$, then the following relationship holds.

$$P_{j,k} = P_j \times H_{j,k} (j=1{\sim}N,\ k=1{\sim}N) \qquad (10)$$

In the OFDM signal receiving device 50, the received pilot signal $P_{j,k}$ is frequency converted by the frequency converter 52, and then Fourier transformed by the fast Fourier transformer 53. As a result, the received pilot signal $P_{j,k}$ is separated for each of the components of the respective subcarriers.

The inverse matrix computer 57 receives the received pilot signal $P_{j,k}$ separated for each of the components of the subcarrier, from the fast Fourier transformer 53 and computes the inverse matrix.

In order for the OFDM signal receiving device 50 to extract the received pilot signal from among the received signals, it is necessary to identify the pilot signal. However if a preamble for identifying this is added to the front of the pilot signal for example in the signals which the OFDM signal transmitting device 30 side transmits, then this can be easily identified.

Furthermore, for example in the OFDM signal transmitting device 30, if the respective pilot signals $P_1, P_2, \ldots P_N$ are transmitted with the mutually shifted timing so as not to be overlapped on the same time, then the respective pilot signals $P_1, P_2, \ldots P_N$ can be mutually separated in the OFDM signal receiving device 50.

The inverse matrix computer 57, for the respective (N×N) sets corresponding to the respective combinations of the transmit side antennas 37 (1) to 37 (N) and the receive side antenna 51 (1) to 51 (N), detects for each of the subcarriers, the reception amplitude and phase (the amplitude and phase of the pilot carrier used in coherent detection) of the received pilot signals.

Consequently, a matrix $A^i$ (subscript i denotes the components of each subcarrier) of propagation coefficients, having (N×N) elements corresponding to the respective combinations of the transmitting antennas 37 (1) to 37 (N) and the receiving antennas 51 (1) to 51 (N), is obtained for each component of the subcarriers.

Furthermore, the inverse matrix computer 57 computes the inverse matrix $(A^i)^{-1}$ of the matrix $A^i$ of the propagation coefficients for each component of the subcarrier, and outputs the information of this inverse matrix $(A^i)^{-1}$ to the transmitter 58.

Here if the components of the i th subcarrier of the received pilot signals $P_{j,k}$, the pilot signal $P_j$ and the propagation coefficients $H_{j,k}$ are respectively denoted by $p_{i;j,k}$, pilot signal $p_{i;j}$, and propagation coefficients $h_{i;j,k}$ then as with the previous equation (10) the following equation holds.

$$p_{i;j,k} = p_{i;j} \times h_{i;j,k} \quad (j=1\sim N, k=1\sim N) \tag{11}$$

Consequently, the respective components of the matrix $A^i$ are the propagation coefficient $h_{i;j,k}$, and the matrix $A^i$ is expressed by the following equation.

$$A^i = \begin{pmatrix} h_{i;1,1} & h_{i;1,2} & \cdots & h_{i;1,N} \\ h_{i;2,1} & & & \\ \vdots & & \ddots & \\ h_{i;N,1} & \cdots & & h_{i;N,N} \end{pmatrix} \tag{12}$$

The information for the inverse matrix $(A^i)^{-1}$ obtained by the inverse matrix computer 57 is modulated inside the transmitter 58 and transmitted as radio waves via the transmitting antenna 59. The information of this inverse matrix $(A^i)^{-1}$ is received by the receiving antenna 40 on the OFDM signal transmitting device 30 side, and demodulated inside the receiver 41. The information of the inverse matrix $(A^i)^{-1}$ acquired by the receiver 41 is then input to the pre-interference canceller 32.

The pre-interference canceller 32 uses the information of the inverse matrix $(A^i)^{-1}$ to perform computation of $((m_{i1}, m_{i2}, \ldots, m_{iN}) \times (A^i)^{-1})$ with respect to the i th subcarrier components $(m_{i1}, m_{i2}, \ldots, m_{iN})$ of the output signals $(M_1, M_2, \ldots, M_N)$ of the data converters 31 (1) to 31 (N) corresponding to the transmission data signals $(T_1, T_2, \ldots, T_N)$, for all of the subcarrier components.

Then, the j (j=1 to N) th respective components of the computation results of the pre-interference canceller 32 are respectively input to the combiner 33 (j) corresponding to the j th antenna 37 (j).

The data signals combined by the respective combiners 33 (1) to 33 (N) are inverse Fourier transformed by the respective inverse fast Fourier transformers 35 (1) to 35 (N), frequency converted by the frequency converters 36 (1) to 36 (N) into radio frequencies, and transmitted from the respective antennas 37 (1) to 37 (N) towards the OFDM signal receiving device 50.

The i th subcarrier component $(t_{i;1}, t_{i;2}, \ldots, t_{i;N})$ of the data signal for transmission from the respective antennas 37 (1) to 37 (N) is expressed by the following equation.

$$(t_{i;1}, t_{i;2}, \ldots, t_{i;N}) = (m_{i;1}, m_{i;2}, \ldots, m_{i;N}) \times (A^i)^{-1} \tag{13}$$

The transmitted data signals are received by the respective antennas 51 (1) to 51 (N) of the OFDM signal receiving device 50, however the received signals are subjected to an influence from the aforementioned propagation coefficients $h_{i;j,k}$. That is to say, if the i th subcarrier component of the received data signal is expressed by $(r_{i;1}, r_{i;2}, \ldots, r_{i;N})$, the following equation holds.

$$(r_{i;1}, r_{i;2}, \ldots, r_{i;N}) = (t_{i;1}, t_{i;2}, \ldots, t_{i;N}) \times A^i \tag{14}$$

Based on the aforementioned equations (13) and (14) the following equation is obtained.

$$\begin{aligned}(r_{i;1}, r_{i;2}, \cdots, r_{i;N}) &= (t_{i;1}, t_{i;2}, \cdots, t_{i;N}) \times A^i \\ &= (m_{i;1}, m_{i;2}, \cdots, m_{i;N}) \times (A^i)^{-1} \times A^i \\ &= (m_{i;1}, m_{i;2}, \cdots, m_{i;N})\end{aligned} \tag{15}$$

That is, the symbols $(m_{i1}, m_{i2}, \ldots, m_{iN})$ of the data signals for transmission by the OFDM signal transmitting device 30, can be acquired as is, by the OFDM signal receiving device 50 from the received signals $(r_{i;1}, r_{i;2}, r_{i;N})$.

Furthermore, the received signal obtained in the output from the fast Fourier transformers 53 (1) to 53 (N), that is the symbols $(m_{i1}, m_{i2}, \ldots, m_{iN})$ are demodulated by the demodulators 54 (1) to 54 (N) and converted to bit streams. By so doing, the original data signal $(T_1, T_2, \ldots T_N)$ which the OFDM signal transmitting device 30 transmits can be obtained.

Due to the above operation, respective data signals can be separated and received as with the embodiment of FIG. 1, without providing elements for interference canceling on the OFDM signal receiving device 50 side, although the N OFDM signals are transmitted at the same time using the same frequency band.

In this embodiment, there is the advantage that since the pre-interference canceller 32 having a large circuit size (i.e. a large amount of computation) for interference cancellation is provided on the OFDM signal transmitting device 30 side, the signal processing on the OFDM signal receiving device 50 side can be simplified and the circuit size reduced. That is to say, simplification of the construction of the OFDM signal receiving device 50 and a reduction in power consumption is realized. Therefore, assuming the case for example where the OFDM signal receiving device 50 is mounted on a mobile terminal, miniaturization and economical efficiency of the mobile terminal is possible.

The construction of the respective devices constituting the OFDM signal communication system may be symmetrical as described above. However from the viewpoint of achieving miniaturization and economical efficiency of the mobile terminal as mentioned here, this embodiment may be combined for example with the first embodiment. That is to say, the OFDM signal transmitting device provided on the base station side and the OFDM signal receiving device provided on the mobile terminal side may adopt the construction of this embodiment, and the OFDM signal transmitting device provided on the mobile terminal side and the OFDM signal receiving device provided on the base station side may adopt the construction of the first embodiment, and as shown in FIG. 1, a construction may be adopted where the interference cancellation is performed by the subcarrier demodulator 14 of the base station. As a result, the construction related to the interference cancellation is arranged only on the base station side, so that this does not need to be arranged on the mobile terminal side.

Eighth Embodiment

Figure 10:
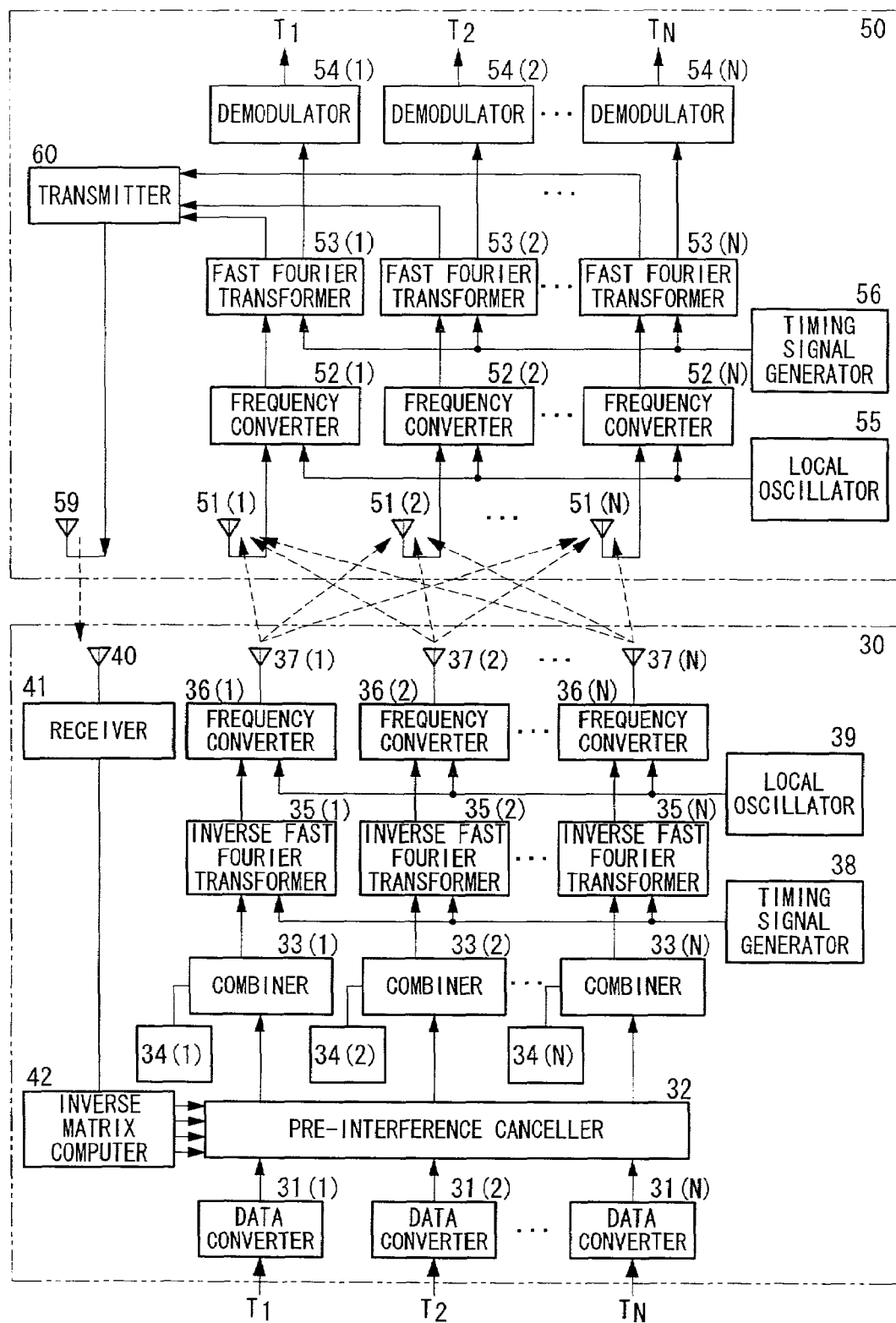
FIG. 10 is a block diagram showing a construction of an OFDM signal communication system of an eighth embodiment.

Next is a description of an eighth embodiment of the present invention with reference to FIG. 10. FIG. 10 is a block diagram showing the construction of an OFDM signal communication system of this embodiment. This embodiment is a modified example of the seventh embodiment. In FIG. 10, elements corresponding to those in FIG. 9 are denoted by the same marks.

In this embodiment, the transmitting antenna, the OFDM signal transmitting device, the receiving antenna, the OFDM signal receiving device, the inverse matrix computer, and the interference canceller of the claims correspond respectively to an antenna 37, an OFDM signal transmitting device 30, an antenna 51, an OFDM signal receiving device 50, an inverse matrix computer 42 and a pre-interference canceller 32.

Furthermore, the pilot signal generator, the data converter, the information receiver, the inverse matrix computer, the combiner, the inverse fast Fourier transformer, the symbol timing generator, the transmission frequency converter and the transmission local oscillator of the OFDM signal transmitting device in the claims respectively correspond to a pilot signal generator 34, a data converter 31, a receiver 41, the inverse matrix computer 42, a combiner 33, an inverse fast Fourier transformer 35, a timing signal generator 38, a frequency converter 36 and a local oscillator 39. Moreover, the receiving frequency converter, the local oscillator for receiver, the fast Fourier transformer, the demodulator, the timing signal generator and the information transmitter of the OFDM signal receiving device in the claims, respectively correspond to the frequency converter 52, the local oscillator 55, the fast Fourier transformer 53, the demodulator 54, the timing signal generator 56 and the transmitter 60.

The OFDM signal communication system shown in FIG. 10, as same as the system of FIG. 9, is constructed from the OFDM signal transmitting device 30 and the OFDM signal receiving device 50. In the case where this OFDM signal communication system is used in mobile communication or the like, then it is preferable the OFDM signal transmitting device 30 is mounted on the base station side, and the OFDM signal receiving device 50 is mounted on the mobile terminal on the user side.

As shown in FIG. 10, the OFDM signal transmitting device 30 is furnished with a data converter 31, the pre-interference canceller 32, the combiner 33, the pilot signal generator 34, the inverse fast Fourier transformer 35, the frequency converter 36, the antenna 37, the timing signal generator 38, the local oscillator 39, a receiving antenna 40, the receiver 41 and the inverse matrix computer 42.

Furthermore, the data converter 31, the combiner 33, the pilot signal generator 34, the inverse fast Fourier transformer 35, the frequency converter 36 and the antenna 37 are respectively furnished as N (a plurality).

On the other hand, the OFDM signal receiving device 50 is furnished with an antenna 51, a frequency converter 52, a fast Fourier transformer 53, a demodulator 54, a local oscillator 55, a timing signal generator 56, a transmitter 60 and a transmitting antenna 59.

Moreover, the antenna 51, the frequency converter 52, the fast Fourier transformer 53 and the demodulator 54 are respectively furnished as N (a plurality).

The number of elements N in the OFDM signal transmitting device 30 and the number of elements N in the OFDM signal receiving device 50 are the same. That is to say, in order to obtain a later described inverse matrix, it is necessary that the antenna number N on the transmitter and the antenna number N on the receiver are the same.

The data converters 31 (1) to 31 (N) convert the respective input transmission data $T_1$ to $T_N$ into OFDM symbols. The respective data converters 31 incorporate therein a modulator for modulating the data sequence input as serial signals into respective symbols (for example a modulator such as a BPSK, an QPSK or an ASK), and a serial to parallel transformer for converting the symbols into parallel signals. That is to say, the symbols corresponding to the input transmission data are output in parallel signal form from the data converter 31.

The receiver 41 receives the information of the received pilot signal transmitted from the OFDM signal receiving device 50 via the receiving antenna 40, and demodulates the received signal.

The inverse matrix computer 42 computes and obtains the inverse matrix $(A^i)^{-1}$ of the matrix $A^i$ constructed by (N×N) elements with components of the detected propagation coefficient, based on the information of the received pilot signal received by the receiver 41.

The pre-interference canceller 32 uses the inverse matrix obtained by the inverse matrix computer 42 to perform pre-processing for interference cancellation. More specifically, the inverse matrix is multiplied by all of the respective subcarrier components $(m_1, m_2, \ldots, m_n)$ of the OFDM symbols $(M_1, M_2, \ldots, M_n)$ which the data converters 31 (1) to (31-N) output for the transmission data $T_1$ to $T_N$.

The N pilot signal generators 34 (1) to 34 (N) output known pilot signals which are different to each other.

Each of the combiners 33 (1) to 33 (N) outputs a signal for which the OFDM symbol output from the pre-interference canceller 32 and the pilot signals output from the pilot signal generators 34 (1) to 34 (N) are combined on a time domain.

Each of the inverse fast Fourier transformers 35 (1) to 35 (N) executes inverse fast Fourier transformation (IFFT) processing on the output from the combiners 33 (1) to 33 (N). A common symbol timing signal from the timing signal generator 38 is supplied to the N inverse fast Fourier transformers 35 (1) to 35 (N).

The OFDM signals which each of the inverse fast Fourier transformers 35 (1) to 35 (N) output are frequency converted to radio frequency band by the frequency converters 36 (1) to 36 (N). A common local oscillator frequency from the local oscillator 39 is supplied to the N frequency converters 36 (1) to 36 (N).

Consequently, from the N antennas 37 (1) to 37 (N) connected to the output of the frequency converters 36 (1) to 36 (N), the same radio frequency OFDM signals are simultaneously transmitted as radio waves.

The N OFDM signals transmitted from the antennas 37 (1) to 37 (N) are superposed in space and are respectively received by the N antennas 51 (1) to 51 (N) arranged at different positions to each other on the OFDM signal receiving device 50 side.

The OFDM signals received by the antennas 51 (1) to 51 (N) pass through the respective frequency converters 52 (1) to 52 (N) and are frequency converted to OFDM signals of a relatively low frequency band suitable for signal processing. A common local oscillator frequency from the local oscillator 55 is supplied to the frequency converters 52 (1) to 52 (N).

The OFDM signals output from the frequency converters 52 (1) to 52 (N) are respectively input to the fast Fourier transformers 53 (1) to 53 (N), and subjected to fast Fourier transformation (FFT). The signals of the OFDM symbols which are output from the fast Fourier transformers 53 (1) to 53 (N) are respectively input to the demodulators 54 (1) to 53 (N) and demodulated into bit streams.

In the OFDM signal communication system of FIG. 10, interference is cancelled by the operation of the pre-interference canceller 32 on the OFDM signal transmitting device 30 side. Since it is not necessary to provide the interference canceller in the OFDM signal receiving device 50, the construction of the OFDM signal receiving device 50 can be simplified and power consumption also suppressed.

The transmitter 60 extracts the pilot signals received from the respective outputs of the fast Fourier transformers 53 (1) to 53 (N). Then, for each of the components of the subcarriers, the reception amplitude and phase of the (N×N) pilot signals corresponding to each of the combinations of the N transmitting antennas 37 (1) to 37 (N), and the N receiver side antennas 51 (1) to 51 (N) are detected. That is to say, since the pilot signals are known, then by normalizing the received pilot signals using the known pilot signals, the propagation coefficient between the transmitting antenna and the receiving antenna can be detected.

The information of the received pilot signal detected from the output of the fast Fourier transformer 53 (the (N×N) amplitude and phase information for each of the subcarriers) is modulated inside the transmitter 60 and transmitted to the OFDM signal transmitting device 30 as radio waves, via the transmitting antenna 59.

In this embodiment, in order to transmit the information of the received pilot signal detected on the OFDM signal receiving device 50 side to the OFDM signal transmitting device 30, there is especially provided a transmitter 58, a transmitting antenna 59, a receiving antenna 40 and a receiver 41, however these may be substituted for by already provided elements.

For example, the antenna 51 may be used instead of the transmitting antenna 59 and the antenna 37 may be used instead of the receiving antenna 40.

In this embodiment, the point that the function of the inverse matrix computer 57 shown in FIG. 9 is transferred to the OFDM signal transmitting device 30 side as an inverse matrix computer 42, makes the construction significantly different to that of FIG. 9. Hereunder the operation of the main elements of the OFDM signal transmitting device 30 and the OFDM signal receiving device 50 of FIG. 10 is described in more detail.

As with the OFDM signal communication system of FIG. 9, the OFDM signal transmitting device 30 of FIG. 10 transmits the OFDM modulated data signal and the known pilot signal from the respective antennas 37 (1) to 37 (N), while the OFDM signal receiving device 50 receives the data signal and the pilot signal as OFDM signals by the antennas 51 (1) to 51 (N).

Furthermore, in the OFDM signal transmitting device 30, in the pre-interference canceller 32, the respective subcarrier elements ($m_1$, $m_2$, . . . , $m_N$) of the OFDM symbols of the data signals are multiplied by the inverse matrix $(A^i)^{-1}$, and data signals which have been multiplied by the inverse matrix $(A^i)^{-1}$ are transmitted from the respective antennas 37 (1) to 37 (N).

The signals received by the antennas 51 (1) to 51 (N) have already been multiplied by the inverse matrix $(A^i)^{-1}$ on the transmit side, and hence in the OFDM signal receiving device 50, the data signals ($m_1$, $m_2$, . . . , $m_N$) can be directly separated from the signals which have been received by the antennas 51 (1) to 51 (N), and extracted.

In the OFDM signal receiving device 50, it is necessary to separate the received respective pilot signals from each other and extract these. However for example on the OFDM signal transmitting device 30 side, by transmitting the respective pilot signals ($P_1$, $P_2$, . . . , $P_N$) with the shifted timing so as to not overlap each other on the same time, then these can be easily separated.

In the above manner, in the OFDM signal communication system of FIG. 10, the point that the information of the received pilot signal is transmitted from the OFDM signal receiving device 50 side to the OFDM signal transmitting device 30, and the inverse matrix is obtained on the OFDM signal transmitting device 30 side, based on the information (reception amplitude and phase) of the received reception pilot signal, is the key technology.

In this manner, in the OFDM signal communication system of FIG. 10, since not only the function of the interference canceller but also the function of the inverse matrix computer can be disposed on the OFDM signal transmitting device 30 side, it is not necessary to mount the inverse matrix computation function and the function of the interference cancellation on the OFDM signal receiving device 50 side. Consequently, the signal processing for the OFDM signal receiving device 50 side is simplified, and the circuit size of the OFDM signal receiving device can be further reduced. That is to say, since simplification of the construction of the OFDM signal receiving device 50 and a reduction in power consumption is realized, then for example assuming a case where the OFDM signal receiving device 50 is mounted on a mobile terminal, miniaturization and economical efficiency of the mobile terminal becomes possible.

As mentioned for the seventh embodiment, in the present embodiment also, for the OFDM signal transmitting device arranged on the mobile terminal side and the OFDM signal receiving device arranged on the base station side, a construction may be adopted for example as shown in FIG. 1 where inverse matrix computation and interference cancellation are performed on the receiver. By so doing, the construction related to the inverse matrix computer and the interference cancellation is arranged on the base station side only, and does not need to be arranged on the mobile terminal side.

Ninth Embodiment

Figure 11:
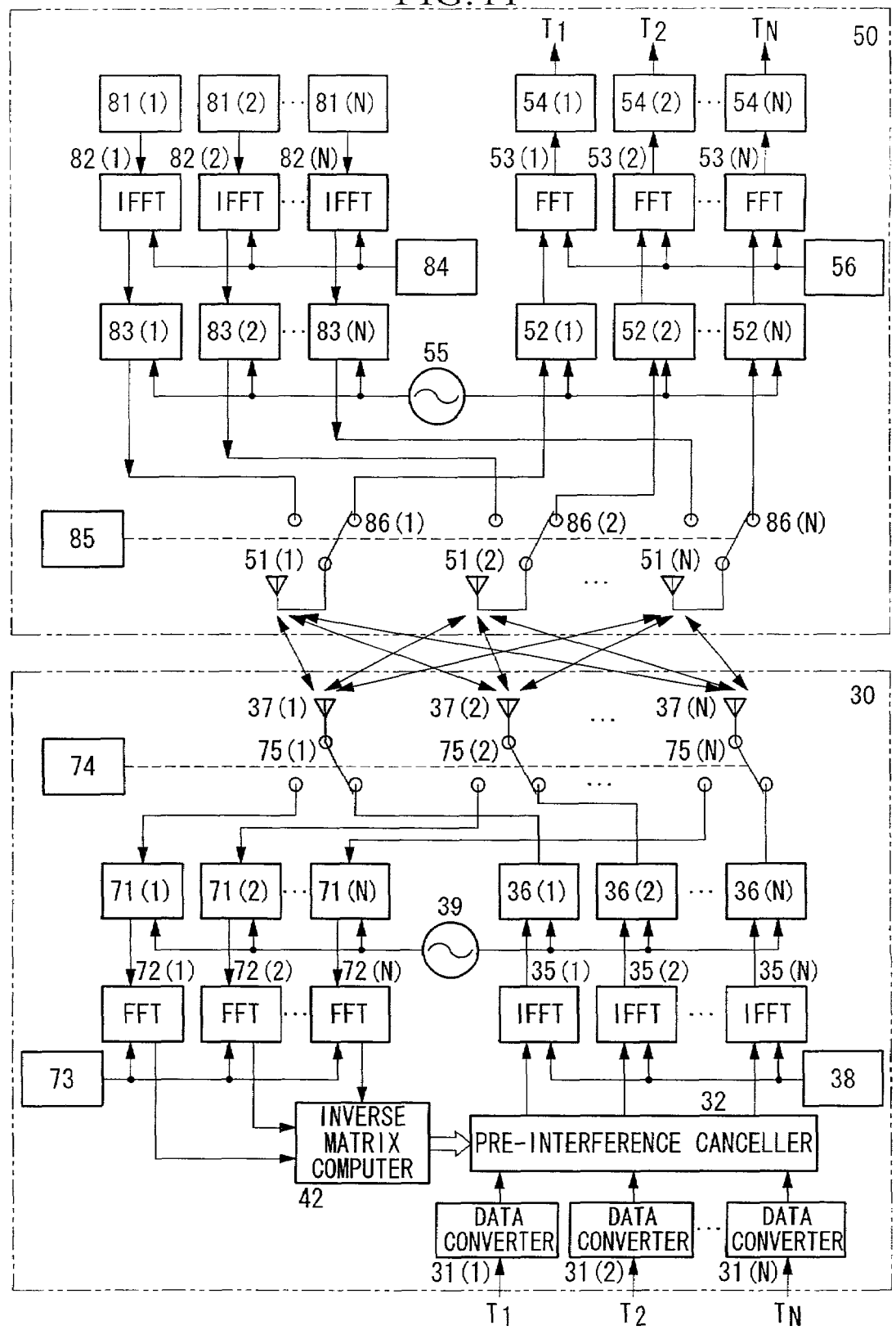
FIG. 11 is a block diagram showing a construction of an OFDM signal communication system of a ninth embodiment.

Next is a description of a ninth embodiment of the present invention with reference to FIG. 11. FIG. 11 is a block diagram showing the construction of an OFDM signal communication system of this embodiment. This embodiment is a modified example of the eighth embodiment. In FIG. 11, elements corresponding to those of FIG. 10 are denoted by the same marks.

In this embodiment, the transmitting antenna, the OFDM signal transmitting device, the receiving antenna, the OFDM signal receiving device, the inverse matrix computer, and the interference canceller of the claims correspond respectively to an antenna 37, an OFDM signal transmitting device 30, an antenna 51, an OFDM signal receiving device 50, an inverse matrix computer 42 and a pre-interference canceller 32.

Furthermore, the pilot signal generator, the inverse fast Fourier transformer, the transmission frequency converter, the receiving frequency converter, the fast Fourier transformer, the demodulator, the local oscillator and the transmission/reception switch of the OFDM signal receiving device in the claims respectively correspond to a pilot signal generator 81, an inverse fast Fourier transformer 82, frequency converters 83, 52, a fast Fourier transformer 53, the demodulator 54, the local oscillator 55 and a switch 86. Moreover, the data converter, the receiving frequency converter, the fast Fourier transformer, the timing signal generator, the inverse matrix computer, the inverse fast Fourier transformer, the transmission frequency converter, the local oscillator and the transmission/reception signal switch of the OFDM signal transmitting device in the claims respectively correspond to a data converter 31, a frequency converter 71, a fast Fourier transformer 72, a timing signal generator 73, the inverse matrix computer 42, the inverse fast Fourier transformer 35, the frequency converter 36 and a switch 75.

The OFDM signal communication system shown in FIG. 11, as with the system of FIG. 10, is constructed from the OFDM signal transmitting device 30 and the OFDM signal receiving device 50. In the case where this OFDM signal communication system is used in mobile communication or the like, then it is preferable the OFDM signal transmitting device 30 is mounted on the base station side, and the OFDM signal receiving device 50 is mounted on the mobile terminal on the user side.

Furthermore, for the OFDM signal communication system of FIG. 11, a TDD (time division duplex) system in which each of the OFDM signal transmitting device 30 and the OFDM signal receiving device 50 use the same antennas for transmission and reception, and the transmission mode and the reception mode are switched by time divisions is assumed. Furthermore, in the OFDM signal communication system of FIG. 11, the function for generating the pilot signal is provided on the OFDM signal receiving device 50 side.

As shown in FIG. 11, the OFDM signal receiving device 50 is furnished with antennas 51, frequency converters 52, fast Fourier transformers 53, demodulators 54, a local oscillator 55, a timing signal generator 56, pilot signal generators 81, inverse fast Fourier transformers 82, frequency converters 83, a symbol timing generator 84, a switch control section 85 and switches 86.

Furthermore, the antennas 51, the frequency converters 52, the fast Fourier transformers 53, the demodulators 54, the pilot signal generators 81, the inverse fast Fourier transformers 82, the frequency converters 83 and the switches 86 are respectively furnished as N (a plurality).

On the other hand, the OFDM signal transmitting device 30 of FIG. 11 is furnished with data converters 31, a pre-interference canceller 32, inverse fast Fourier transformers 35, frequency converters 36, antennas 37, a timing signal generator 38, a local oscillator 39, frequency converters 71, fast Fourier transformers 72, a timing signal generator 73, a switch control section 74 and switches 75.

Moreover, the data converters 31, the inverse fast Fourier transformers 35, the frequency converters 36, the antennas 37, the frequency converters 71, the fast Fourier transformers 72 and the switches 75 are respectively furnished as N (a plurality).

The number of elements N in the OFDM signal transmitting device 30 and the number of elements N in the OFDM signal receiving device 50 are the same. That is to say, in order to obtain a later described inverse matrix, it is necessary that the antenna number N on the transmitter and the antenna number N on the receiver are the same.

For the frequency converters 52, the fast Fourier transformers 53, the demodulators 54, the local oscillator 55 and the timing signal generator 56 in the OFDM signal receiving device 50, since these serve the same function as the corresponding elements of FIG. 10, description is omitted.

The N pilot signal generators 81 (1) to 81 (N) output known pilot signals which are different to each other. The inverse fast Fourier transformers 82 (1) to 82 (N) execute inverse Fourier transformation processing on the pilot signals output from the respective Wepilot signal generators 81 (1) to 81 (N). A common symbol timing signal from the symbol timing generator 84 is applied to the inverse fast Fourier transformers 82 (1) to 82 (N).

The frequency converters 83 (1) to 83 (N) frequency convert the pilot signals output from the inverse fast Fourier transformers 82 (1) to 82 (N) as OFDM signals, to radio frequency band. A common local oscillator frequency from the local oscillator 55 is applied to the frequency converters 83 (1) to 83 (N).

Consequently, the pilot signals of the N systems, which appear in the output from the frequency converters 83 (1) to 83 (N) have the same carrier frequency. The pilot signals of the N systems output from the frequency converters 83 (1) to 83 (N), when the OFDM signal receiving device 50 is in the transmission mode, pass through the respective switches 86 (1) to 86 (N) and are transmitted from the antennas 51 (1) to 51(N).

The switch control section 85 identifies the communication condition between the OFDM signal transmitting device 30 and the OFDM signal receiving device 50, and switches the status of the N switches 86 (1) to 86 (N) corresponding to whether the OFDM signal receiving device 50 is a transmit mode or a receive mode.

For the data converter 31, the pre-interference canceller 32, the inverse fast Fourier transformer 35, the frequency converter 36, the timing signal generator 38 and the local oscillator 39 in the OFDM signal transmitting device 30, since these serve the same function as the corresponding elements of FIG. 10, description thereof is omitted.

The signal received by the antennas 37 (1) to 37 (N), when the OFDM signal transmitting device 30 is the receive mode, is input to the frequency converters 71 (1) to 71 (N) via the switches 75 (1) to 75 (N).

The switch control section 74 identifies the communication condition between the OFDM signal transmitting device 30 and the OFDM signal receiving device 50, and switches the status of the N switches 75 (1) to 75 (N) corresponding to whether the OFDM signal transmitting device 30 is a transmit mode or a receive mode.

The frequency converters 71 (1) to 71 (N) convert the signals (pilot signals) received by the respective antennas 37 (1) to 37 (N) into a comparatively low frequency band appropriate for signal processing. The common local oscillator frequency from the local oscillator 39 is applied to the frequency converters 71 (1) to 71 (N).

The fast Fourier transformers 72 (1) to 72 (N) execute fast Fourier transformation on the pilot signals received as OFDM signals output from the frequency converters 71 (1) to 71 (N). Consequently, the pilot signals received by the respective antennas 37 (1) to 37 (N) appear on the output of the fast Fourier transformers 72 (1) to 72 (N), separated for each of the components of the subcarrier.

A common symbol timing signal from the timing signal generator 73 is applied to the fast Fourier transformers 72 (1) to 72 (N), for extracting the received respective pilot signals.

The inverse matrix computer 42, based on the signals output from the fast Fourier transformers 72 (1) to 72 (N) detects the reception amplitude and phase of the received respective pilot signals for each of the subcarrier components, and obtains the inverse matrix based on the detection result.

Next is a description of the main parts of the OFDM signal transmitting device 30 and the OFDM signal receiving device 50 of FIG. 11.

In the OFDM signal transmitting device 30, the inverse matrix computer 42, based on the received pilot signal computes the inverse matrix $(A^i)^{-1}$ of the matrix $A^i$ of the propagation coefficient of each subcarrier. Then, the pre-interference canceller 32 multiplies the respective subcarrier components $(m_1, m_2, \ldots, m_N)$ of the data signals output from data converters 31(1) to 31 (N), by the inverse matrix $(A^i)^{-1}$ input from the inverse matrix computer 42.

The signals output from the pre-interference canceller 32 are subjected to inverse Fourier transformation processing by the inverse fast Fourier transformers 35 (1) to 35 (N), and output as OFDM signals. These OFDM signals are converted to radio frequency band by the frequency converters 36 (1) to 36 (N), and transmitted from the antennas 37 (1) to 37 (N) via the switches 75 (1) to 75 (N).

The signals respectively transmitted from the antennas 37 (1) to 37 (N) are superposed in space and received by each of the antennas 51 (1) to 51 (N). However, since the data signals $(m_1, m_2, \ldots, m_N)$ are previously multiplied by the inverse matrix $(A^i)^{-1}$ in the pre-interference canceller 32 and then transmitted, then as with the case of the system of FIG. 9 and FIG. 10, at the antennas 51 (1) to 51 (N), the data signals $(m_1, m_2, \ldots, m_N)$ are separated and received.

Consequently, it is not necessary to provide the function for interference cancellation on the OFDM signal receiving device 50 side. That is to say, the method of acquiring the information of the pilot signal in the OFDM signal transmitting device 30 is different to that of the system of FIG. 10.

In the OFDM signal receiving device 50, at the time of the transmission mode, the pilot signals $(P_1, P_2, \ldots, P_N)$ are transmitted from the respective antennas 51 (1) to 51 (N). These pilot signals $(P_1, P_2, \ldots, P_N)$ are received by the antennas 37 (1) to 37 (N) in the OFDM signal transmitting device 30, OFDM demodulated, separated into components of the respective subcarriers and then input to the inverse matrix computer 42.

The inverse matrix computer 42, from the received pilot signals, for each of the components of the subcarriers, computes and stores the inverse matrix $(A^i)^{-1}$ of the matrix $A^i$ with the propagation coefficients of the respective combinations of the antennas 51(1) to 51 (N) and the antennas 37 (1) to 37 (N) as the matrix components.

The pre-interference canceller 32 multiplies the data signal output from the data converters 31 (1) to 31 (N) by the inverse matrix $(A^i)^{-1}$. This result is transmitted from the antennas 37 (1) to 37 (N) via the inverse fast Fourier transformers 35 (1) to 35 (N) and the frequency converters 36 (1) to 36 (N).

In the OFDM signal receiving device 50, for the respective antennas 51 (1) to 51 (N), the propagation coefficient matrix for the case where the signal is transmitted from the antennas 37 (1) to 37 (N) to the antennas 51 (1) to 51 (N) is added to the data signals and they are received. However since common local oscillators are used for the transmission and reception, the propagation coefficient matrix becomes the same as the aforementioned matrix $A^i$.

Consequently, in the respective antennas 51 (1) to 51 (N) of the OFDM signal receiving device 50, the respective data signals $(m_{i1}, m_{i2}, \ldots, m_{iN})$ are separated and received. Therefore, by demodulating the data signals $(M_{i1}, M_{i2}, \ldots, M_{iN})$ appearing on the output of the fast Fourier transformers 53 (1) to 53 (N) with the demodulators 54 (1) to 54 (N), the transmitted data signals $(T_1, T_2, \ldots, T_N)$ of the OFDM signal transmitting device 30 are obtained.

In this embodiment, since the pilot signal generator 81 is provided on the OFDM signal receiving device 50 side, it is not necessary to provide the pilot signal generating function on the OFDM signal transmitting device 30 side, and it is not necessary to provide the combiner 33 of FIG. 10 on the OFDM signal transmitting device 30 side. Furthermore, since the antennas 37 (1) to 37 (N) and the antennas 51 (1) to 51 (N) are common for both transmission and reception, then the receiving antenna 40 and the transmitting antenna 59 of FIG. 10 are unnecessary.

Furthermore, in the OFDM signal communication system of FIG. 11, it is not necessary to mount the inverse matrix computation function and the function of the interference cancellation on the OFDM signal receiving device 50 side. Consequently, the signal processing for the OFDM signal receiving device 50 side is simplified. That is to say, since simplification of the construction of the OFDM signal receiving device 50 and a reduction in power consumption is realized, then for example assuming a case where the OFDM signal receiving device 50 is mounted on a mobile terminal, miniaturization and economical efficiency of the mobile terminal becomes possible.

Furthermore, in this embodiment, since the same antennas are used in common for both transmission and reception, it is not necessary to add special antennas for transmitting the information of the pilot signal or the information of the inverse matrix. Moreover, as with the seventh embodiment or the eighth embodiment, the circuit size of the OFDM signal receiving device can be further reduced.

As described for the eighth embodiment, in this embodiment also, for the OFDM signal transmitting device arranged on the mobile terminal side and the OFDM signal receiving device arranged on the base station side, a construction for performing inverse matrix computation and interference cancellation on the receiver as shown for example in FIG. 1, may be adopted.

The present embodiment can be widely applied not only to wide band mobile communication systems, but also to wireless systems where many user wireless stations are connected to a base station using the OFDM method, as with the point-to-multipoint fixed wireless access system.

Tenth Embodiment

In the OFDM MIMO transmitting/receiving devices, which performs transmitting and receiving in MIMO channels by means of the OFDM method, the signal transmitted by a certain transmitting antenna is received in all of the antennas on the receiver side. The signals received in the respective receiving antennas include all of the transmitted signal components, and the signal components of the transmitting antennas other than the certain transmitting antenna all influence as interference components on the signal components from the certain transmitting antenna. Consequently, in the abovementioned respective embodiments, in order to separate the received signals for each of the transmitted signal components, propagation coefficient matrices are obtained for optional groups of transmitting/receiving antennas.

Furthermore, in the OFDM MIMO transmitting/receiving devices of the abovementioned respective embodiments, estimation of the propagation coefficient matrix is performed for each of the transmitting antennas. That is to say, the pilot signal is transmitted for only a certain antenna, and the remaining N−1 antennas do not transmit pilot signals. As a result, the propagation coefficient matrices for between the certain antenna which transmits the pilot signal and all of the receiving antennas is obtained for all of the subcarriers, and by repeating this operation N times, the propagation coefficient matrices with respect to the optional groups of transmitting/receiving antennas is obtained for all of the subcarriers.

Here, in the abovementioned respective embodiments, with the goal of improving the estimation accuracy for the propagation coefficient matrices, it is considered to increase the power included in the pilot signal. In the abovementioned respective embodiments, while only a certain antenna transmits the pilot signal, the remaining N−1 antennas are not transmitting pilot signals, and hence for example in order to make the transmission power of the pilot signal K times, the following two types of method are considered.

1. The number of symbols for the pilot signal for transmission is made K times

By repeatedly transmitting the pilot signals independently transmitted for each of the respective antennas, at the respective antennas, the transmission power is improved. If this method is used, then in order to make the transmission power of the pilot signal K times, the pilot signal is transmitted by the N antennas for each of the K symbols. In this case, the symbol duration of the pilot signal becomes K times, and the data symbols within the transmitted signal have to be reduced, and transmission efficiency is lowered.

2. Only the pilot signal is transmitted at a transmission power K times the normal symbol.

In this case, the dynamic range of the high power amplifier connected to the transmitting antenna and the low noise amplifier connected to the receiving antenna must be K times that for the case described for the abovementioned respective embodiments.

In either of the abovementioned methods, frequency utilization is lowered, or an analog circuit with high performance is necessary. On the other hand, in the present embodiments, as described hereunder, an increase in the transmission power of the pilot signal can be realized, without increasing the symbol number of the transmitted pilot signal, that is, the time while the transmitted pilot signal is being sent.

Figure 12:
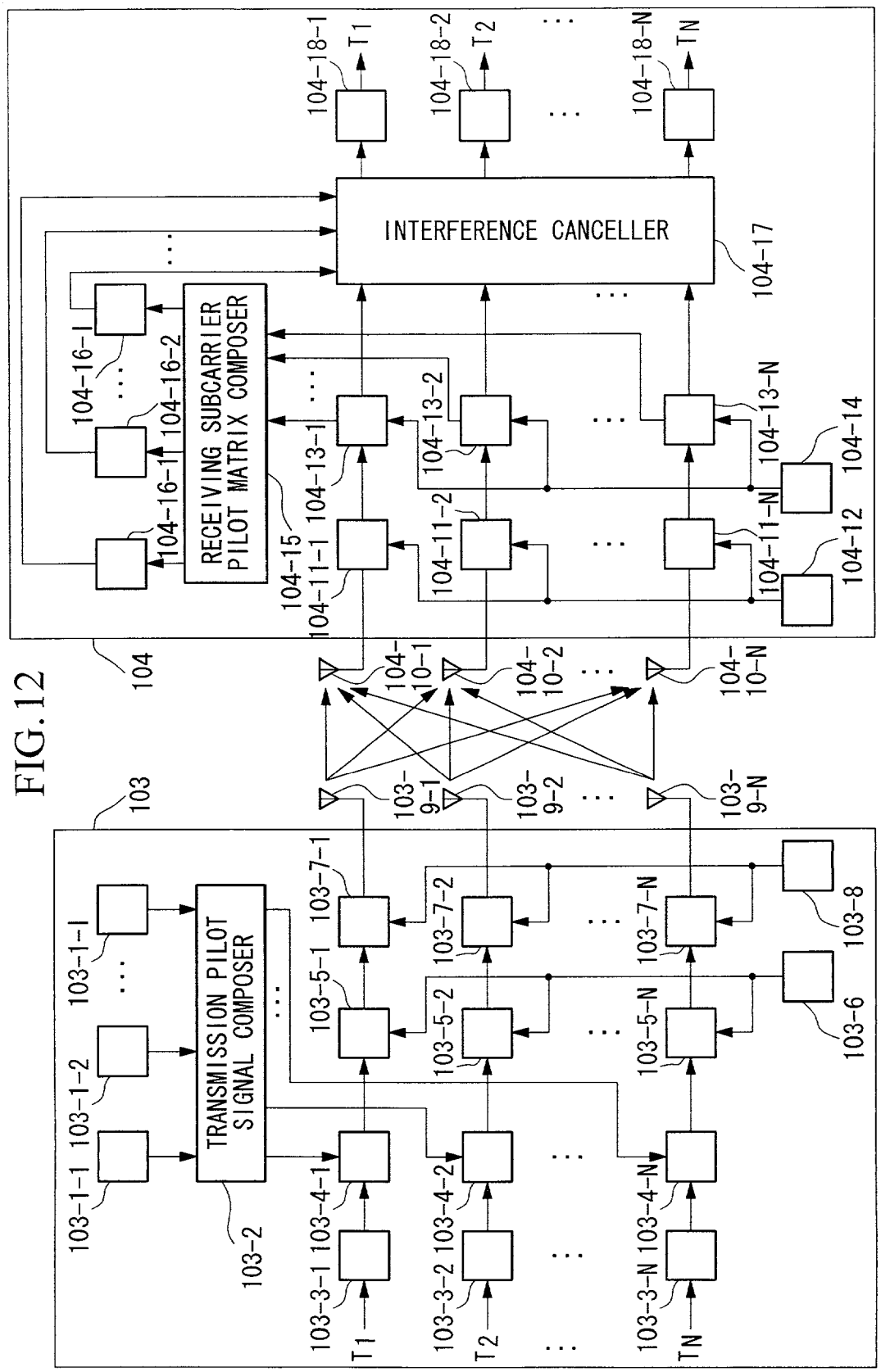
FIG. 12 is a block diagram showing a construction of an OFDM signal communication system according to a tenth embodiment.

A tenth embodiment of the present invention is shown in FIG. 12. The OFDM signal communication system according to this embodiment comprises: an OFDM signal transmitting device 103 and an OFDM signal receiving device 104. The OFDM signal transmitting device 103 comprises: I transmission subcarrier pilot matrix generators 103-1-1 to 103-1-I, a transmission pilot signal composer 103-2, N data converters 103-3-1 to 103-3-N for converting the transmission data $T_1, T_2, \ldots, T_N$ into respective OFDM symbols $M_1, M_2, \ldots, M_n$, N combiners 103-4-1 to 103-4-N for combining the pilot signals output from the transmission pilot signal composer 103-2 and the output of the data converters, N inverse fast Fourier transformers 103-5-1 to 103-5-N connected to the output of the respective combiners, a symbol timing generator 103-6 for supplying a common OFDM symbol timing to all of the inverse fast Fourier transformers, N transmission frequency converters 103-7-1 to 103-7-N for converting the output from the inverse fast Fourier transformers into radio frequency, a transmission local oscillator 103-8 for supplying a common local oscillator frequency to all of the transmission frequency converters, and two or more transmitting antennas 103-9-1 to 103-9-N.

It is assumed that the preamble for the synchronization at the receiver is added to the data signals $T_1, T_2, \ldots, T_N$ to be transmitted by the respective antennas in advance. On the other hand, the OFDM signal receiving device 104 comprises: N receiving antennas 104-10-1 to 104-10-N; N receiving frequency converters 104-11-1 to 104-11-N connected to each of the receiving antennas for frequency converting radio frequency of the received signal into a frequency suitable for demodulation; a local oscillator for receiver 104-12 for supplying a common local oscillator frequency to all of the receiving frequency converters; N fast Fourier transformers 104-13-1 to 104-13-N for fast Fourier transforming the output from the receiving frequency converters; a timing signal generator 104-14 for generating a timing signal for detecting the received signals of the pilot signals (hereunder called the received pilot signals) included in the outputs from the fast Fourier transformers for each of the N symbols output by the transmitting antennas 103-9-1, 103-9-2, ..., 103-9-N of the OFDM signal transmitting device; a receiving subcarrier pilot matrix composer 104-15 for constructing the received pilot signals output from the fast Fourier transformers 104-13-1 to 104-13-N which the N antennas output for each of the N symbols, into a receiving subcarrier pilot matrix with N rows and N columns corresponding to the respective combinations of the N transmitting antennas of the OFDM signal transmitting device and the N receiving antennas of the OFDM signal receiving device for each of the i th (i=1 to N) subcarriers; I subcarrier propagation coefficient inverse matrix computers 104-16-1 to 104-16-I which read in the N×N subcarrier components constructed in the receiving subcarrier pilot matrix composer as a matrix with N rows and N columns and multiply this matrix by an inverse matrix of the transmission pilot signal matrix for the subcarrier to thereby calculate a subcarrier propagation coefficient matrix, and which calculate and store an inverse matrix (an interference cancellation matrix for each subcarrier) of the calculated subcarrier propagation coefficient matrix; an interference canceller 104-17 which reads the interference cancellation matrix for each subcarrier from the subcarrier propagation coefficient inverse matrix computers, and multiplies it by the outputs from the fast Fourier transformers of the information signals of the respective subcarriers to thereby separate the signals of the respective subcarriers for each of the respective antenna components; and N demodulators 104-18-1 to 104-18-N.

In this OFDM signal communication system, in the OFDM signal transmitting device 103, by supplying the common local oscillator frequency to the respective transmission frequency converters 103-7-1 to 103-7-N from the transmission local oscillator 103-8, then radio signals over the same frequency are transmitted from the respective transmitting antennas 103-9-1 to 103-9-N. Consequently, on the OFDM signal receiving device 104 side, the respective receiving antennas 104-10-1 to 104-10-N receive the signals from the respective transmitting antennas at the same frequency. These signals influence as interference signals with each other in space. However with this construction, the respective signals are separated by the following method. This is an example that pilot signals of N symbols are transmitted by N transmitting antennas.

Figure 13:
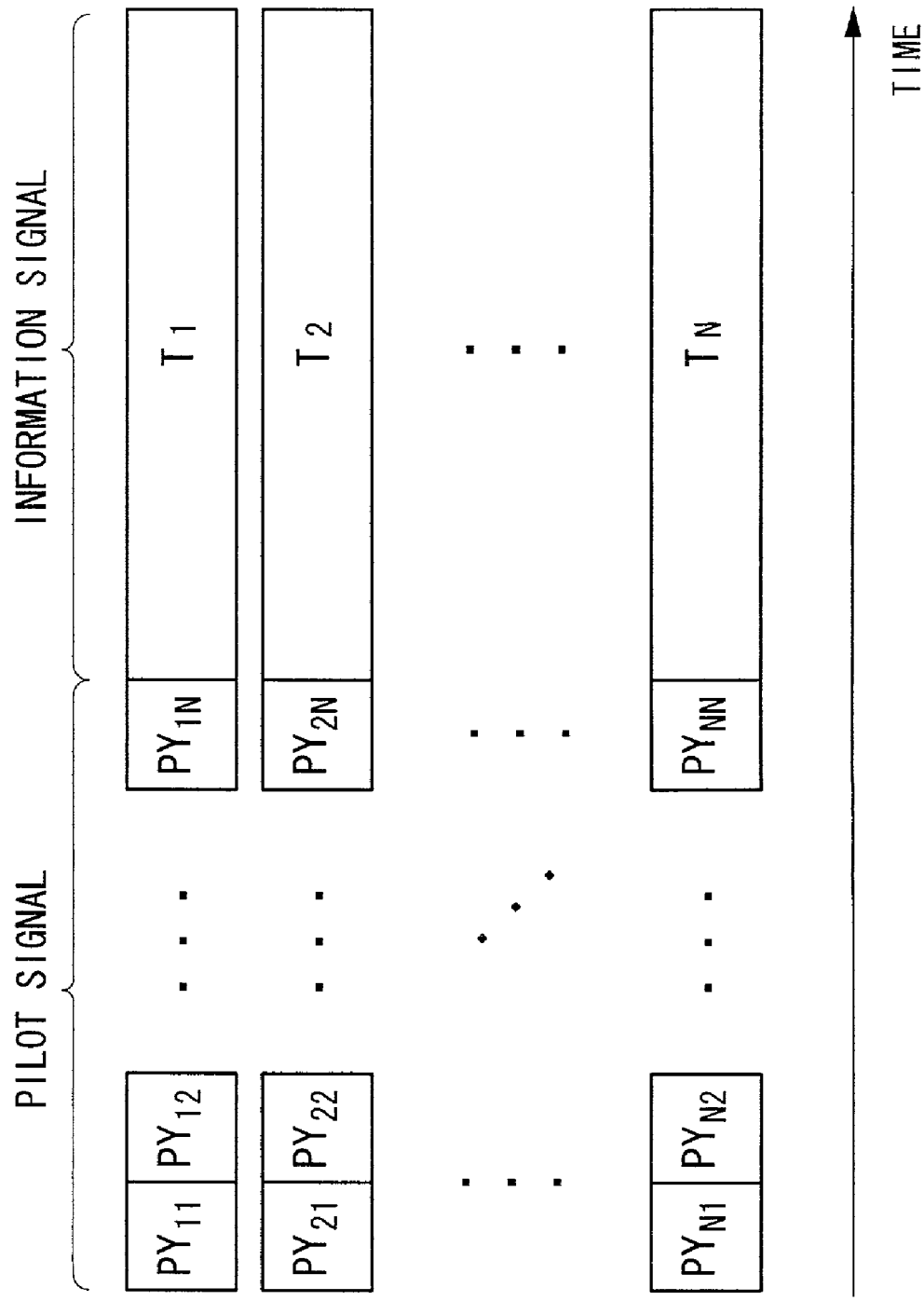
FIG. 13 is a diagram for explaining a transmission OFDM signal containing a pilot signal in the tenth embodiment.

The OFDM signal transmitted by the OFDM signal transmitting device 103 is shown in FIG. 13. In this embodiment, in the I transmission subcarrier pilot matrix generators 103-1-1 to 103-1-I in the OFDM signal transmitting device 103, of the pilot signals transmitted with N symbols by the N antennas, pilot signal components corresponding to the subcarrier i are generated. In the case where the component of the subcarrier i of the m th symbol transmitted by the n th antenna, is $p^i_{mn}$, then a transmission subcarrier pilot signal matrix $P^i$ which has the inverse matrix as shown in equation (16) and which is not the matrix obtained by multiplying a complex number by the unit matrix is generated, and transferred to the transmission pilot signal composer 103-2.

$$P^i = \begin{pmatrix} p^i_{11} & p^i_{12} & \cdots & p^i_{1N} \\ p^i_{21} & p^i_{22} & \cdots & p^i_{2N} \\ \vdots & \vdots & \ddots & \vdots \\ p^i_{N1} & p^i_{N2} & \cdots & p^i_{NN} \end{pmatrix} \quad (16)$$

Figure 14:
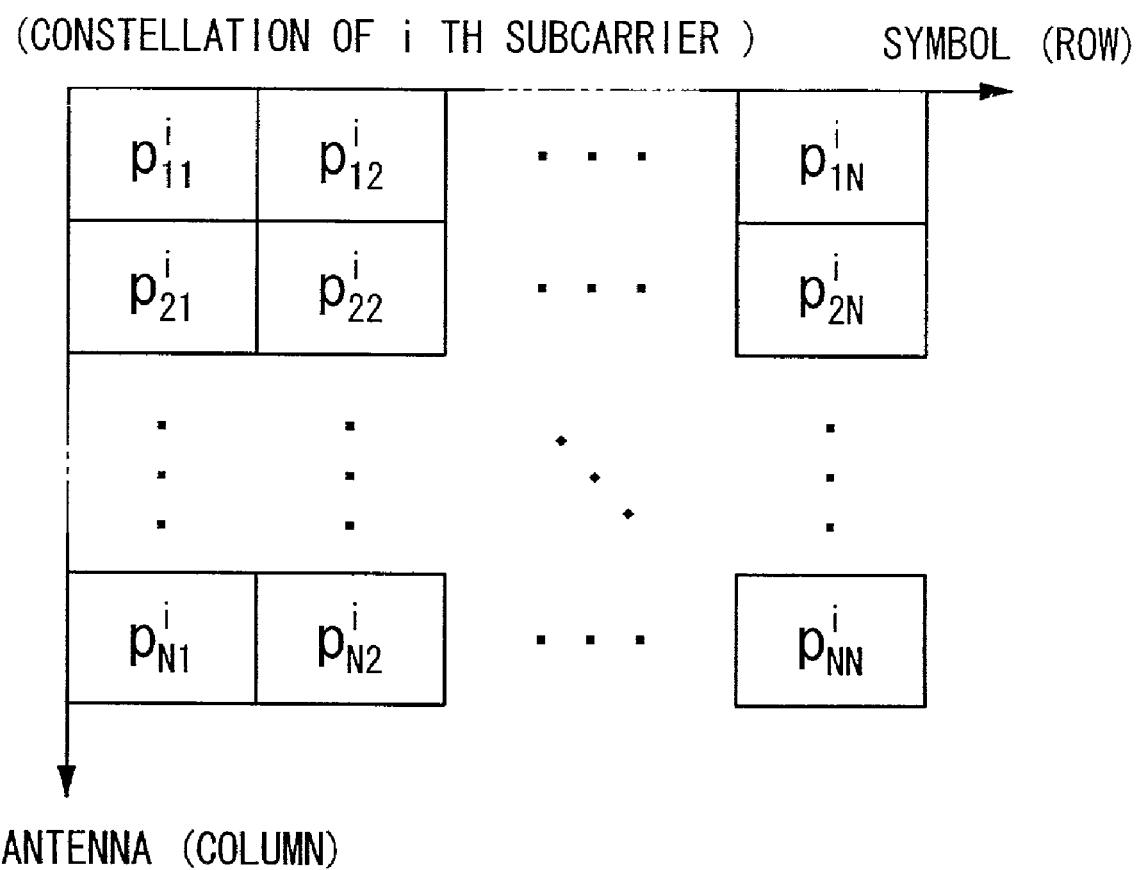
FIG. 14 is a diagram for explaining a constellation of the pilot signal in the tenth embodiment.

FIG. 14 shows the configuration of the pilot signal corresponding to the transmission subcarrier pilot signal matrix $P^i$. In this figure, the vertical-axis corresponds to the N antennas, while the horizontal-axis corresponds to the configuration of the subcarrier i.

The transmission pilot signal composer 103-2 extracts all of the subcarrier components of the transmitted pilot signals of the m th symbol of the n th antenna from the I transmission subcarrier pilot signal matrix $P^i$, and reconstructs an N×N transmission pilot symbol matrix $PY_{mn}$ as $PY_{mn} = (p^1_{mn} \, p^2_{mn} \cdots p^N_{mn})$.

The transmission pilot signal composer delivers the reconstructed transmission pilot symbol matrix $PY_{mn}$ to the respective combiners in accordance with the transmission timing. In the OFDM signal receiving device 104, the pilot signals transmitted from the N antennas are received by the N receiving antennas 104-10-1 to 104-10-N, and converted to baseband signals by the receiving frequency converters 104-11-1 to 104-11-N, and a time waveform received by the respective antennas is converted to frequency components of the respective subcarriers by the fast Fourier transformers 104-13-1 to 104-13-N.

The output of the received pilot signals from the fast Fourier transformer is output for each of the symbols, however, since the subcarrier propagation coefficient inverse matrix which is necessary for performing interference cancellation is obtained from the same subcarrier components in all of the pilot signals of all of the antennas, the set of pilot signals for each of the symbols is converted to a set of pilot signals for each of the subcarriers by the receiving subcarrier pilot matrix composer 104-15.

That is to say, if the reception component of the subcarrier i of the m th symbol which the n th antenna has received in the fast Fourier transformer output is made $pr^i_{mn}$, then all of the subcarrier components of the received pilot signals of the m th symbol received in the n th antenna are stored. The receiving subcarrier pilot matrix composer 104-15 obtains the N×N reception pilot symbol matrices for all of the symbols of all of the antennas, and then reconstructs this as a reception subcarrier pilot signal matrix $PR^i$ constructed from all of the symbol components of all of the antennas for the subcarrier i as shown in equation (17).

$$PR^i = \begin{pmatrix} pr^i_{11} & pr^i_{12} & \cdots & pr^i_{1N} \\ pr^i_{21} & pr^i_{22} & \cdots & pr^i_{2N} \\ \vdots & \vdots & \ddots & \vdots \\ pr^i_{N1} & pr^i_{N2} & \cdots & pr^i_{NN} \end{pmatrix} \quad (17)$$

The subcarrier propagation coefficient inverse matrix computers 104-16-1 to 1-04-16-I read in the receiving subcarrier pilot matrix $PR^i$ for the subcarrier i calculated in the receiving subcarrier pilot matrix composer 104-15. Since the transmitted pilot signal has passed through the communication path and been combined, when subcarrier propagation coefficient matrix is $S^i$, the matrix $PR^i$ is expressed as $P^i \times S^i = PR^i$.

The subcarrier propagation coefficient inverse matrix computers 104-16-1 to 104-16-I, multiply the matrix of the received pilot signals of the respective subcarriers by the inverse matrix of the transmitted pilot signals, and are thereby able to obtain the matrix $S^i$ being the group of propagation coefficients for the group of optional transmitting antennas and receiving antennas of the respective subcarriers, as follows.

$$S^i = (P^i)^{-1} \times PR^i$$

The inverse matrix $(S^i)^{-1}$ of the propagation coefficient matrix is obtained from the matrix $S^i$ of the obtained propagation coefficients, and stored in the subcarrier propagation coefficient inverse matrix computers 104-16-1 to 104-16-I. With respect to the information signal matrix $R^i = (r^i_1 \, r^i_2 \cdots , r^i_N)$ of one row and N columns with $r^i_n$ constituting the n th column component, and with the signal point in the subcarrier i of the information symbols in the n th antenna as $r^i_n$, the interference canceller 104-17 reads out the inverse matrix $(S^i)^{-1}$ of the propagation coefficient matrix for each of the respective subcarriers from the subcarrier propagation coefficient inverse matrix computers 104-16-1 to 104-16-I, and multiplies the information signal matrix $R^i$ from the right to thereby separate the reception signal components for each of the transmitted signal components. The signals with the interference component separated are demodulated into information by the demodulators 104-18-1 to 104-18-N.

With the present embodiment, since it is possible to transmit the pilot signals at the same time from all of the antennas, then with the pilot signal for example at the same symbol duration as for the first embodiment, and the power of all of the pilot signals at N times, estimation of the propagation coefficient matrix becomes more accurate, and an improvement in characteristics can be realized. Furthermore, this has an advantage from the viewpoint of energy compared to the first embodiment.

The I transmission subcarrier pilot matrix generators 103-1-1 to 103-1-I may assign complex numbers with absolute values the same, to all of the elements of the transmission subcarrier pilot signal matrix $P^i$. As a result, the amplitude fluctuations of the time waveform of the pilot signals decrease. The construction of the OFDM signal communication system for this case is the same as for that mentioned above.

Eleventh Embodiment

Figure 15:
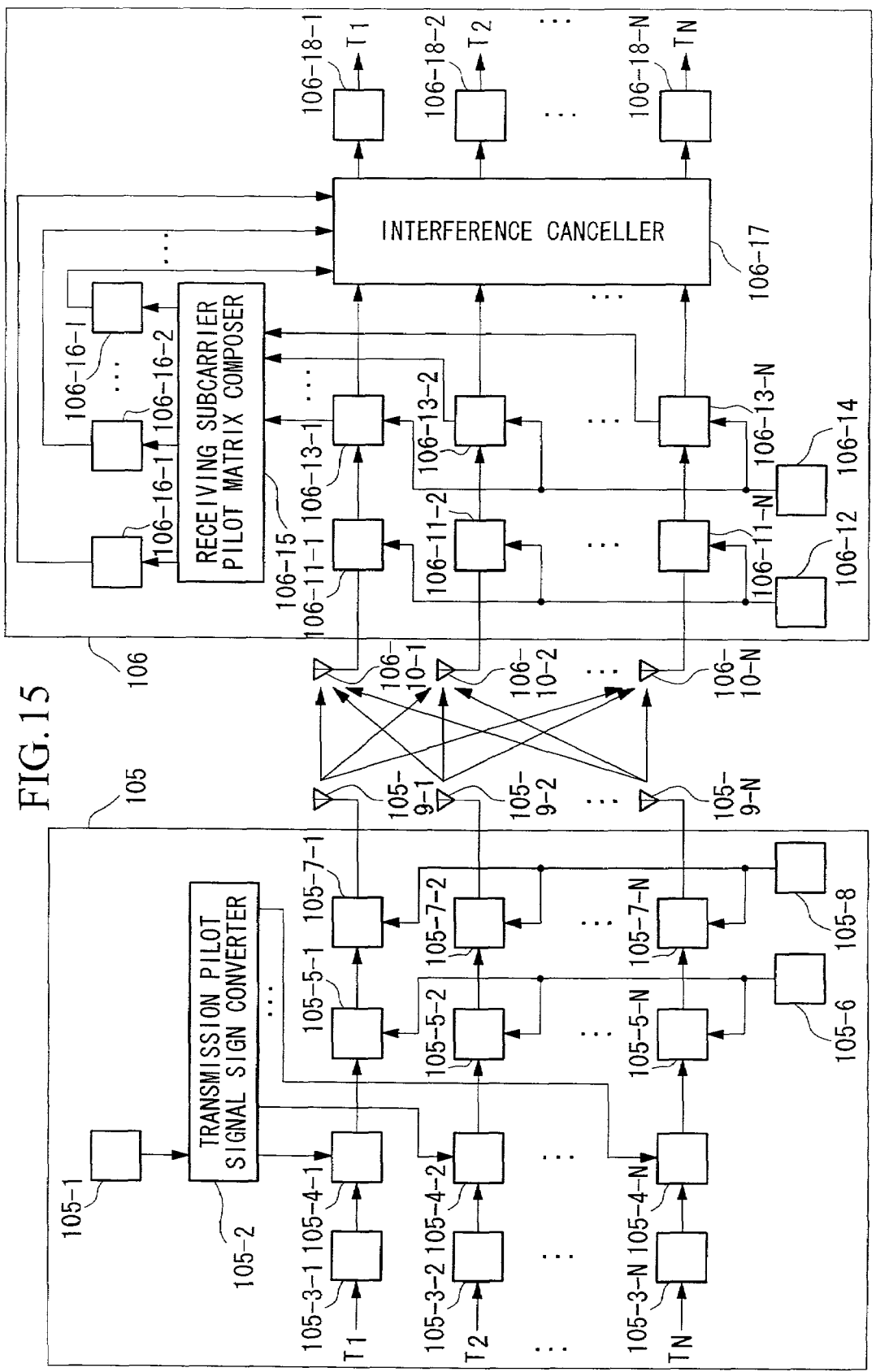
FIG. 15 is a block diagram showing a construction of an OFDM signal communication system according to an eleventh embodiment.

An eleventh embodiment of the present invention is shown in FIG. 15. The OFDM signal communication system in this embodiment comprises: an OFDM signal transmitting device 105 and an OFDM signal receiving device 106. The OFDM signal transmitting device 105 comprises: an essential transmission pilot signal generator 105-1 for generating an essential transmission pilot signal matrix; a transmission pilot signal sign converter 105-2 for code converting the essential transmission pilot signal matrix and supplying this to the respective systems;

N data converters 105-3-1 to 105-3-N; N combiners 105-4-1 to 105-4-N; N inverse fast Fourier transformers 105-5-1 to 105-N; a symbol timing generator 105-6; N transmission frequency converters 105-7-1 to 105-7-N; a transmission local oscillator 105-8; and N transmitting antennas 105-9-1 to 105-9-N.

It is assumed that the preamble for the synchronization at the receiver is added to the data signals $T_1, T_2, \ldots, T_N$ to be transmitted by the respective antennas in advance. On the other hand, the OFDM signal receiving device 106 comprises: N receiving antennas 106-10-1 to 106-10-N; N receiving frequency converters 106-11-1 to 106-11-N; a local oscillator for receiver 106-12; N fast Fourier transformers 106-13-1 to 106-13-N; a timing signal generator 106-14; a receiving subcarrier pilot matrix composer 106-15 for constructing the pilot signals output from the fast Fourier transformers 106-13-1 to 106-13-N which the N antennas output for each of the N symbols, into a receiving subcarrier pilot matrix with N rows and N columns for each of the subcarriers; I subcarrier interference cancellation matrix computers 106-16-1 to 106-16-I which read in the N×N subcarrier components constructed in the aforementioned receiving subcarrier pilot matrix composer 106-15 as a matrix with N rows and N columns and multiply this matrix by an inverse matrix of the transmission subcarrier pilot matrix for the subcarrier to thereby calculate a subcarrier propagation coefficient matrix, and which calculate and store an inverse matrix of the calculated subcarrier propagation coefficient matrix; an interference canceller 106-17 which reads out the subcarrier propagation coefficient inverse matrix from the subcarrier interference cancellation matrix computers, and multiplies this by the outputs from the fast Fourier transformers of the information signals of the respective subcarriers to thereby separate the signals of the respective subcarriers; and N demodulators 106-18-1 to 106-18-N.

Except for using the essential pilot signal generator 105-1 and the transmission pilot signal sign converter 105-2 instead of the transmission subcarrier pilot matrix generators 103-1-1 to 103-1-I, and the transmission pilot signal composer 103-2, this is the same as the tenth embodiment (FIG. 12). By the essential signal pilot signal generator 105-1 the 1 row and N columns matrix B of the transmitted essential pilot signals which becomes the reference is generated. The elements of the matrix B are constructed only from a set of real numbers for which the absolute values are the same and only the signs are different. The combination of signs is one where the amplitude variation of the time waveform which is generated after inverse fast Fourier transformation is small.

As an example, a transmission essential pilot signal $B_{ex}$ for the case of subcarrier number 52 and the number of FFT points 64 is shown hereunder. The subcarrier interval is made $\Delta f$, and the subcarrier frequency for the baseband which transmits information is made $-26\Delta f$ to $26\Delta f$. However, since the subcarrier ($0\Delta f$) which becomes a DC component is not used, the value of the elements corresponding to the DC component becomes 0. The set of pilot signals in equation (18) corresponds to the list $-26\Delta f, -25\Delta f, \ldots, -\Delta f$, DC component, $\Delta f, \ldots, 26\Delta f$, being the subcarrier baseband frequency. Furthermore, the amplitude of all of the subcarriers is normalized by 1.

$$B_{ex} = \begin{pmatrix} 1 & 1 & -1 & -1 & 1 & 1 & -1 & 1 & -1 & 1 & 1 & 1 & 1 \\ 1 & 1 & -1 & -1 & 1 & 1 & 1 & 1 & -1 & 1 & 1 & 1 & 1 & 0 \\ 1 & -1 & -1 & 1 & 1 & -1 & 1 & -1 & 1 & -1 & -1 & -1 & -1 \\ -1 & 1 & 1 & -1 & -1 & 1 & -1 & 1 & -1 & 1 & 1 & 1 & 1 \end{pmatrix} \quad (18)$$

In the transmission pilot signal sign converter 105-2, the essential pilot signal, based on the pilot symbol sign matrix BI being the information of the codes used for the respective antennas and symbols, generates either one of $B_{ex}$ or $-B_{ex}$ as the pilot symbol of the respective antennas. The pilot symbol sign matrix BI, has an inverse matrix constructed with all of the elements as "1" or "−1". An example of the pilot symbol sign matrix BI for the case where N=4 is shown in equation (19).

$$BI = \begin{pmatrix} 1 & -1 & -1 & -1 \\ 1 & 1 & 1 & -1 \\ 1 & -1 & 1 & 1 \\ 1 & 1 & -1 & 1 \end{pmatrix} \quad (19)$$

The signs of the n th row and m th column of the pilot symbol sign matrix BI represent pilot symbols which the n th antenna is to transmit at the m th symbol. If the value is "1", $B_{ex}$ is supplied to the combiners 105-4-1 to 105-4-N. If the value is "−1", $-B_{ex}$ is supplied to the combiners 105-4-1 to 105-4-N. That is to say, in the abovementioned example, in the time for the first symbol of the pilot symbols, corresponding to the component of the first column of the pilot symbol sign matrix BI, all of the $B_{ex}$ are input to the combiners 105-4-1 to 105-4-4.

In the time for the second symbol, $-B_{ex}$ is input to the combiners 105-4-1, 105-4-3, and $B_{ex}$ is input to the combiners 105-4-2, 105-4-4. In the time for the third symbol, $-B_{ex}$ is input to the combiners 105-4-1, 105-4-4, and $B_{ex}$ is input to the combiners 105-4-2, 105-4-3. In the time for the fourth symbol, $-B_{ex}$ is input to the combiners 105-4-1, 105-4-2 and $B_{ex}$ is input to the combiners 105-4-3, 105-4-4.

If the pilot signal is constructed as described above, then estimation of the propagation coefficient matrix is performed so that the subcarrier transmission pilot signal matrix for a certain subcarrier becomes either a matrix BI or a matrix −BI having an inverse matrix. Moreover, since the pilot symbols which the respective antennas transmit become either $B_{ex}$ or $-B_{ex}$, a waveform for which the amplitude fluctuations are small results.

Furthermore, by constructing as described above, computation of the subcarrier propagation coefficient inverse matrix is performed. Moreover, the subcarrier pilot signal matrix becomes one, with the pattern of the pilot symbols limited to two. Therefore with the reduction in memory circuits of the essential transmission pilot signal generator 105-1 and the transmission pilot signal sign converter 105-2 (corresponding to the "subcarrier pilot matrix generator" and the "transmission pilot signal composer" which generate the pilot signals, in the claims), a large reduction in the circuit size can be realized.

Figure 16:
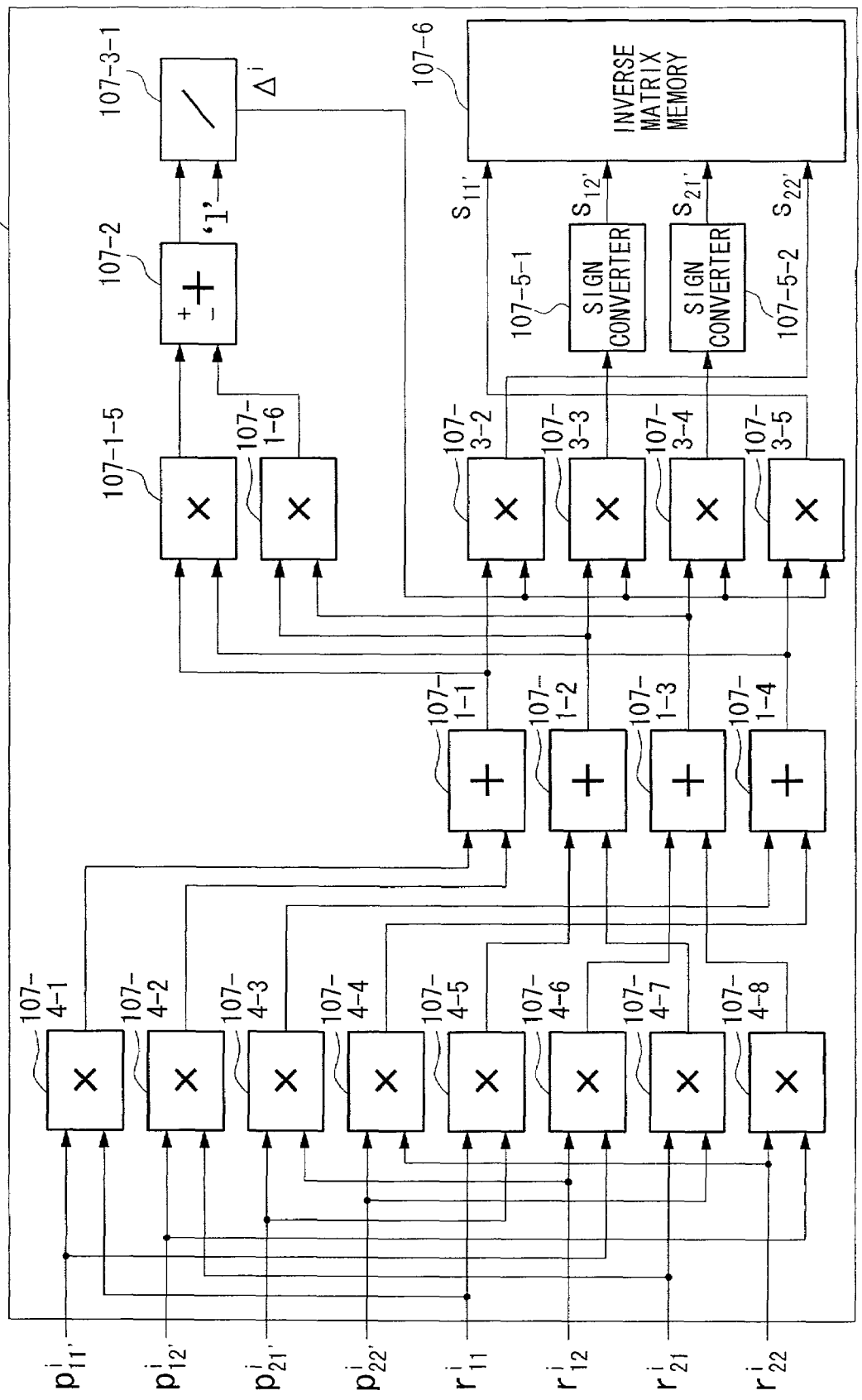
FIG. 16 is a block diagram showing an example of the construction of a propagation coefficient inverse matrix computer in the tenth and eleventh embodiments.

The internal structures of the subcarrier propagation coefficient inverse matrix computers 104-16-1 to 104-16-I in the abovementioned tenth embodiment and the subcarrier propagation coefficient inverse matrix computers 106-16-1 to 106-16-I in this embodiment are shown in FIG. 16. The number of the transmitting/receiving antennas in this example is two. The subcarrier propagation coefficient inverse matrix computer 107 comprises: complex adders 107-1-1 to 107-1-4; complex multipliers 107-1-5 and 107-1-6; a subtractor 107-2; a complex divider 107-3-1; complex multipliers 107-3-2 to 107-3-5; complex multipliers 107-4-1 to 107-4-8; sign converters 107-5-1 and 107-5-2; and an inverse matrix memory 107-6.

First of all by multiplying $r^i_{11}$, $r^i_{21}$, $r^i_{12}$, $r^i_{22}$ being the received pilot signal components in the subcarrier i by the inverse matrix of the transmission subcarrier pilot matrix, the subcarrier propagation coefficient matrix $S^i$ is obtained, and the subcarrier propagation coefficient inverse matrix $(S^i)^{-1}$ for performing interference cancellation is obtained from $S^i$. In order to obtain the subcarrier propagation coefficient matrix $S^i$, equation (20) computation is performed.

$$S^i = (P^i)^{-1} \cdot R^i \quad (20)$$

$$= \begin{pmatrix} (p^i_{11})' & (p^i_{12})' \\ (p^i_{21})' & (p^i_{22})' \end{pmatrix} \cdot \begin{pmatrix} r^i_{11} & r^i_{12} \\ r^i_{21} & r^i_{22} \end{pmatrix}$$

$$= \begin{pmatrix} (p^i_{11})' \cdot r^i_{11} + (p^i_{12})' \cdot r^i_{21} & (p^i_{11})' \cdot r^i_{12} + (p^i_{12})' \cdot r^i_{22} \\ (p^i_{21})' \cdot r^i_{11} + (p^i_{22})' \cdot r^i_{21} & (p^i_{21})' \cdot r^i_{12} + (p^i_{22})' \cdot r^i_{22} \end{pmatrix}$$

$$(P^i)^{-1} = \begin{pmatrix} (p^i_{11})' & (p^i_{12})' \\ (p^i_{21})' & (p^i_{22})' \end{pmatrix}$$

For convenience of explaining the elements $s^i_{11}$, $s^i_{21}$, $s^i_{12}$, $s^i_{22}$ of the subcarrier propagation coefficient matrix $S^i$, these are respectively denoted A, B, C, D. Therefore, the first row first column ($s^i_{11}'$, second row first column ($s^i_{21}'$), first row second column ($s^i_{12}'$) and second row second column ($S^i_{22}'$) of the subcarrier inverse propagation coefficient matrix $(S^i)^{-1}$ become the values where D, $-B$, $-C$, A are respectively divided by determinant (AD$-$BC).

At first, according to equation (20), the value of A is calculated by the complex multipliers 107-4-1, 107-4-2, and the complex adder 107-1-1. Similarly, the value of B is calculated by the complex multipliers 107-4-5, 107-4-7 and the complex adder 107-1-2, the value of C is calculated by the complex multipliers 107-4-6, 107-4-8 and the complex adder 107-1-3, and the value of D is calculated by the complex multipliers 107-4-3, 107-4-4 and the complex adder 107-1-4.

Next, the complex multipliers 107-1-5, 107-1-6 calculate the respective values of AD and BC, and based on these results, the subtractor 107-2 calculates AD$-$BC, and the complex divider 107-3-1 calculates $\Delta i=1/(AD-BC)$. Next, the complex multipliers 107-3-2 to 107-3-5 obtain a result where the respective A, B, C, D are multiplied by $\Delta i$ (=1/(AD$-$BC)). Thus, D/(AD$-$BC) is obtained as $s^i_{11}'$ and A/(AD$-$BC) is obtained as ($s^i_{22}'$). Furthermore, by inverting the sign of the output of the complex multipliers 107-3-3, 107-3-4 by the sign converters 107-5-1, 107-5-2, then $-B/$(AD$-$BC), $-C/$(AD$-$BC)' are respectively obtained as $s^i_{12}'$, $s^i_{22}'$. Then, the obtained $s^i_{11}'$ to $s^i_{22}'$ are stored in the inverse matrix memory 107-6.

Figure 17:
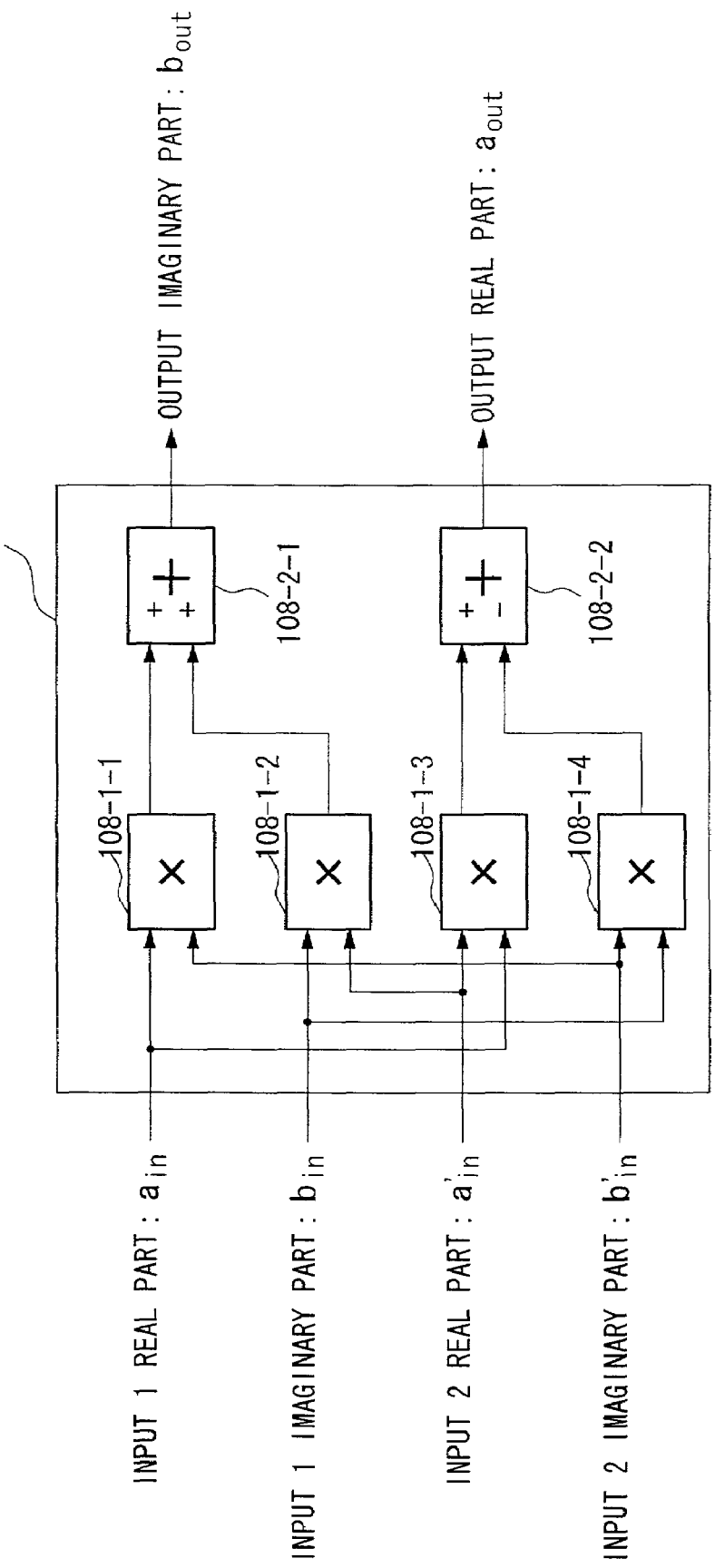
FIG. 17 is a block diagram showing an internal construction of a complex computer used in the propagation coefficient inverse matrix computer shown in FIG. 16.

As described above, in order to obtain the subcarrier propagation coefficient matrix $S^i$, which is necessary to perform thirteen types of complex multiplications, with calculation being carried out in the complex multipliers 107-4-1 to 107-4-8, 107-1-5 and 107-1-6, and 107-3-2 to 107-3-5. Furthermore, the construction of the complex multiplier in the subcarrier propagation coefficient inverse matrix computer 107 is shown in FIG. 17. The complex multiplier 108 comprises real number multipliers 108-1-1 to 108-1-4, a real adder 108-2-1 and a real subtractor 108-2-2. For example, the terms of $(p^i_{11})' \times r^i_{11}$ is expressed as the following equations if $(p^i_{11})'=a+jb$ and $r^i_{11}=c+jd$ (where j is an imaginary unit).

$$(p^i_{11})' \times r^i_{11} = (a+jb) \times (c+jd)$$
$$= (ac - bd) + j(ad + bc)$$

Therefore multiplication of real number must be performed four times. However, in the case where the respective components of the pilot signal use real numbers of two types for which the signs are different and the absolute values (the absolute value is made h) are the same, then $P^i_{mn}$ for arbitrary i, m and n becomes h or $-h$. Since $P^i$ is constructed from only real numbers, then $(p^i_{mn})'=h_{mn}$ (where $h_{mn}$ is a real number) results. Consequently, considering calculating the terms of $(p^i_{11})' \times r^i_{11}$, with the above described example, then the following results.

$$(p^i_{11})' \times r^i_{11} = h_{mn} \times (c+jd)$$
$$= h_{mn} \times c + jh_{mn} \times d$$

Figure 18:
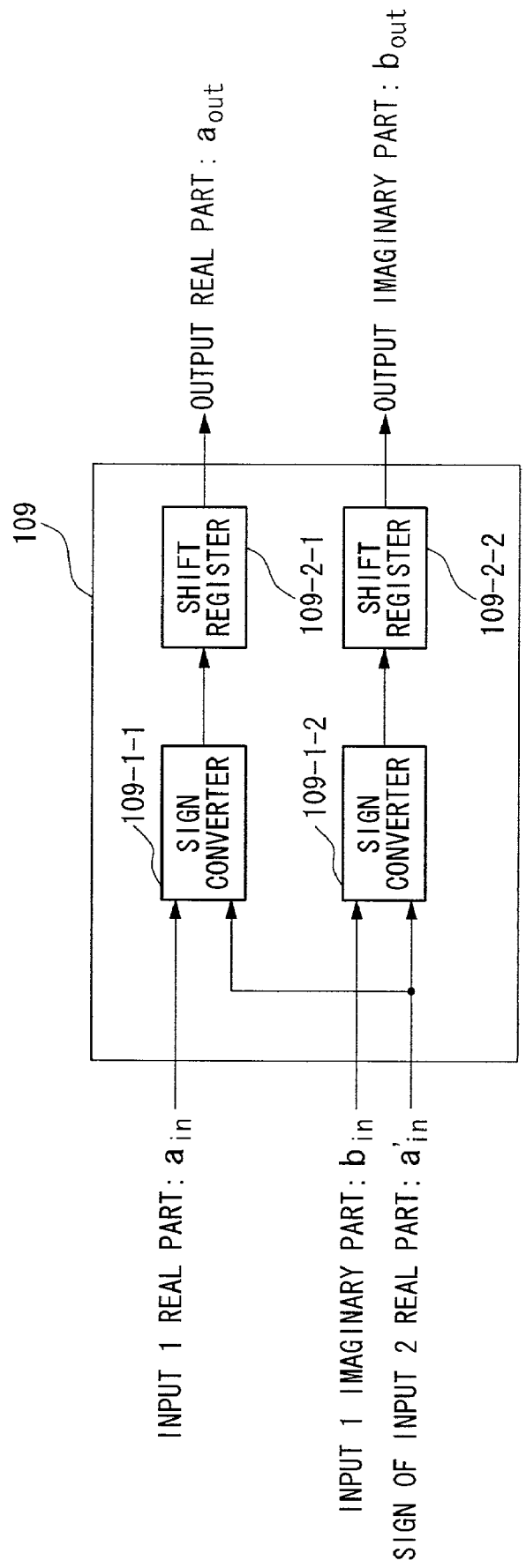
FIG. 18 is a block diagram showing an internal construction of a complex computer used in the propagation coefficient inverse matrix computer shown in FIG. 16.

Therefore the real number multipliers which are needed become two. Furthermore, by setting $h_{mn}$ to the k-th power of 2, then the multiplication of "a" and $h_{mn}$, and the multiplication of b and $h_{mn}$ can be achieved by means of a shift register for shifting "a" and b by k bits. Based on the above, the configuration example of the complex multiplier is shown in FIG. 18. The complex multiplier 109 comprises sign converters 109-1-1 and 109-1-2, and shift registers 109-2-1 and 109-2-2.

The real number component and the imaginary component of the received pilot signal are input to input 1, and the sign part of the transmitted pilot signal corresponding to the component of the received pilot signal is input to input 2. The signs of the input reception pilot signal and the transmitted pilot signal are at first input to the sign converter. If the signs of the components of the input transmitted pilot signal are positive, the components of the received pilot signal are output as is, while if the signs of the components of the transmitted pilot signal are negative, the components of the received pilot signal are sign inverted and output.

Next, the output of the sign converters 109-1-1 and 109-1-2 are input to the respective shift registers 109-2-1 and 109-2-2. Since the absolute values of all of the transmitted pilot signals are all made the same (the k th power of 2), the multiplier is not necessary, and a shift register which performs bit shift k bits to the left may be used. If the above described circuit construction is adopted, the complex multiplier can make a simple construction for the sign converter and the shift register. Since the bigger the value for the antenna number N, the number of complex multipliers necessary for inverse matrix multiplication increases, then the effect on circuit size reduction becomes significant.

As described above, since the components of the transmission subcarrier pilot matrix are groups of real numbers for which all of the absolute values are the same and only the signs are different, then at the time of multiplication in the inverse matrix calculation of the pilot signals on the receiver, it is not necessary to use a complex multiplier, this being achievable by merely using sign inversion and shift registers. Therefore the circuit size can be reduced.

Twelfth Embodiment

Figure 19:
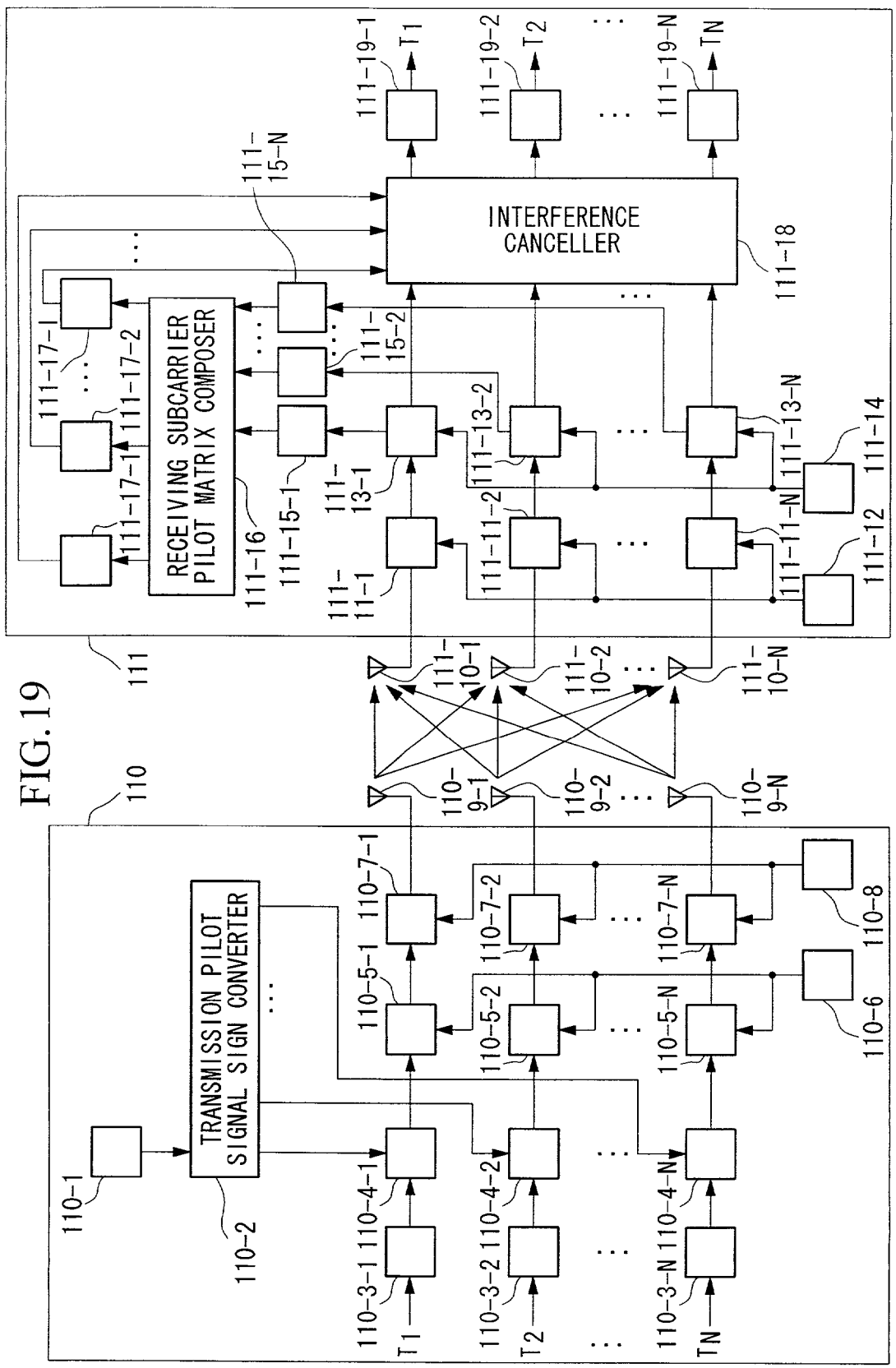
FIG. 19 is a block diagram showing the construction of an OFDM signal communication system according to a twelfth embodiment.

A twelfth embodiment of the present invention is shown in FIG. 19. It is assumed that the construction of the OFDM signal transmitting device in this embodiment is a functional modification of the aforementioned eleventh embodiment. However it will be apparent that functional modification of for example the OFDM signal transmitting device in the tenth embodiment can also be realized. The OFDM signal communication system in this embodiment comprises: an OFDM signal transmitting device 110 and an OFDM signal receiving device 111.

The OFDM signal transmitting device 110 comprises: an essential transmission pilot signal generator 110-1; a transmission pilot signal sign converter 110-2 for G times iterating and supplying the transmission pilot symbols transmitted by the respective antennas, with respect of the all of the symbols; N data converters 110-3-1 to 110-3-N; N combiners 110-4-1 to 110-4-N; N inverse fast Fourier transformers 110-5-1 to 110-5-N; a symbol timing generator 110-6; N transmission frequency converters 110-7-1 to 110-7-N; a transmission local oscillator 110-8; and N transmitting antennas 110-9-1 to 110-9-N.

It is assumed that the preamble for the synchronization at the receiver is added to the data signals $T_1, T_2, \ldots, T_N$ to be transmitted by the respective antennas in advance. On the other hand, the OFDM signal receiving device 111 comprises: N receiving antennas 111-10-1 to 111-10-N; N receiving frequency converters 111-11-1 to 111-11-N; a local oscillator for receiver 111-12; N fast Fourier transformers 111-13-1 to 111-13-N; a timing signal generator 111-14; reception pilot signal averaging circuits 111-15-1 to 11-15-N for averaging the pilot signals output from the fast Fourier transformers 111-13-1 to 111-13-N which the N antennas output for each of the N×G symbols, into the same pilot symbol which is repeatedly transmitted G times for each symbol; a receiving subcarrier pilot matrix composer 111-16 which reads in the received pilot symbols of the N×N symbols, being the output from the reception pilot symbol averaging circuit, and extracts the N×N components for each of the subcarriers, and constructs I reception subcarrier pilot matrices with N rows and N columns; I subcarrier propagation coefficient inverse matrix computers 111-17-1 to 111-17-I which read in the receiving subcarrier pilot matrix constructed in the receiving subcarrier pilot matrix composer 111-16, and multiply this matrix by the inverse matrix of the transmission pilot signal matrix corresponding to the subcarrier to calculate the subcarrier propagation coefficient matrix for the subcarrier and which calculate the inverse matrix of the calculated propagation coefficient matrix and store this as the subcarrier propagation coefficient inverse matrix; an interference canceller 111-18 which reads out the subcarrier propagation coefficient inverse matrix from the subcarrier propagation coefficient inverse matrix computers, and multiplies this by the outputs from the fast Fourier transformers of the information signals of the respective subcarriers to thereby separate the signals of the respective subcarriers; and N demodulators 111-19-1 to 111-19-N.

Figure 20:
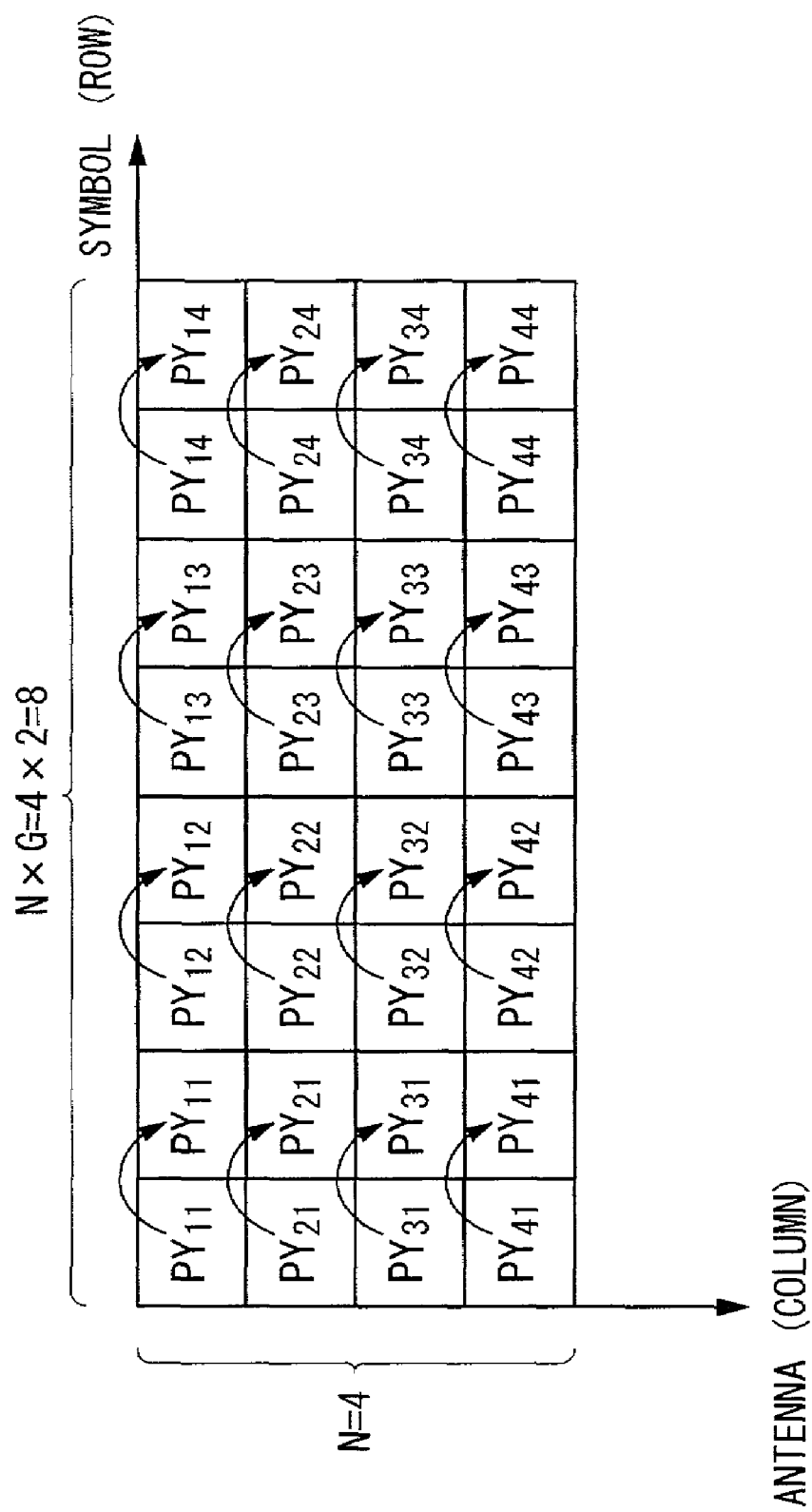
FIG. 20 is a diagram showing a configuration example of a pilot signal in the twelfth embodiment.

In the transmission pilot signal sign converter 110-2 in the OFDM signal transmitting device 110, all of the transmission pilot symbols are iterated G times. Taking as an example the case where N=4 and G=2, the configuration of the transmitted pilot signal becomes the form shown in FIG. 20. That is to say, in the eleventh embodiment, if all of the components of the pilot symbol sign matrix BI are iterated G times in the row direction, a desired pilot signal configuration is obtained. The BI ($BI_{(N,G)=(4,2)}$) for the case where N=4 and G=2 is a N row (N×2) column matrix, that is, a 4 row 8 column matrix, with a construction as shown by equation (21).

$$BI_{(N,G)=(4,2)} = \begin{pmatrix} 1 & 1 & -1 & -1 & -1 & -1 & -1 & -1 \\ 1 & 1 & 1 & 1 & 1 & 1 & -1 & -1 \\ 1 & 1 & -1 & -1 & 1 & 1 & 1 & 1 \\ 1 & 1 & 1 & 1 & -1 & -1 & 1 & 1 \end{pmatrix} \quad (21)$$

In the OFDM signal receiving device 111, based on the repeating pattern of the known transmission pilot symbols, averaging which gives the reverse operation to the repeating transmission is performed in the reception pilot signal averaging circuits 111-15-1 to 111-15-N. That is to say, with respect to the output from the fast Fourier transformers 111-13-1 to 111-13-N of the pilot signals which are received for each of the N×G symbols by the N antennas, in the respective reception pilot signal averaging circuits 111-15-1 to 111-15-N, from the first symbol to the G th symbol is combined to create a first received pilot symbol, and from the G+1 th symbol to the G×2 th symbol is combined to create a second received pilot symbol, and this operation is repeated N times, and the pilot signal which receives N×G symbols at the respective antennas, is combined with N symbols, and transferred to the receiving subcarrier pilot matrix composer 111-16.

The processing subsequent to the receiving subcarrier pilot matrix composer 111-16 is the same as that described for the tenth embodiment. By means of this operation, the power given to the respective pilot signals increases by G times as the repetition number of times G, so that the noise component of the pilot signal becomes minimal enabling accurate propagation coefficient matrix estimation to be performed.

In the above described tenth embodiment through twelfth embodiment, in order to improve the utilization efficiency of the constellation of the transmitted pilot signals used for estimating the propagation coefficient matrix, then in the OFDM signal transmitting device, the components of the pilot signals in the space formed by the respective antennas and the OFDM symbols for each of the subcarriers, that is to say, the components of the pilot signals in the two dimensional matrix corresponding to subcarrier and the time dimensions, are regarded as a matrix, and a matrix with N rows and N columns corresponding to the transmission pilot signal components for each of the subcarriers is constructed so as to have an inverse matrix, and then transmitted, and by multiplying the received pilot signal in the OFDM signal receiving device by the inverse matrix of the transmitted pilot signal, the propagation coefficient matrix is obtained.

Consequently, it is possible to transmit the pilot signals for propagation coefficient matrix estimation simultaneously on all of the antennas. As a result, the necessary time for transmitting the pilot signals is the same as for the case where the pilot signals are transmitted so as not to overlap each other on the time domain, and by combining the pilot signals the overall power can be increased by a factor of N. Therefore, compared to the case where the pilot signals are transmitted so as not to overlap each other on the time domain, the signal-to-noise power ratio of the pilot signals with respect to the system number N of the transmitting/receiving antennas can be increased by a factor of N, so that more accurate propagation coefficient matrix estimation can be performed, reliability can be increased and an improvement in error rate performance can be achieved.

In the case where the pilot signals are transmitted so as not to overlap each other on the time domain, then in order to transmit pilot signals of the same signal power as this embodiment at the same symbol duration as for the tenth through twelfth embodiments, the respective pilot symbols are transmitted N at a time, and the frequency utilization efficiency decreases compared to the tenth through twelfth embodiments. In the tenth through twelfth embodiments, an increase in the power is realized by combining the pilot signals without increasing the transmission time, and the estimation accuracy of the propagation coefficient matrix can be improved without lowering the frequency utilization efficiency.

Furthermore, by making the amplitude value of all the subcarrier components of the transmission pilot symbols for estimating the propagation coefficient matrix the same, the amplitude fluctuation value of the time waveform, being the inverse fast Fourier transform output of the pilot symbol, can be suppressed.

Moreover, instead of preparing the transmission subcarrier pilot matrix for each of the subcarriers, by changing the signs of the essential pilot signal matrix in symbol units for each of the pilot signals of the respective antennas, then an equivalent processing can be performed, and a reduction in circuit size realized.

Furthermore, the subcarrier components of the pilot signal are constructed by only sets of real numbers for which all of the absolute values are the same, and only the signs are different, and by means of the subcarrier propagation coefficient inverse matrix, the number of complex multipliers in the matrix computation in the OFDM signal receiving device side can be reduced. Moreover, the effect of reducing the circuit size is much more significant as the antenna number N increases.

Furthermore, in the OFDM signal transmitting device, all of the transmitted pilot signals of all of the antennas are repeated G times, and in the OFDM signal receiving device, the average of the G symbols of the received pilot signals which are repeated G times is calculated, and by making the signal-to-noise power ratio of the pilot symbols G times, estimation of the propagation coefficient matrix can be made even more accurate.

Thirteenth Embodiment

This embodiment and a later described fourteenth embodiment are OFDM signal communication systems which can improve the efficiency of soft decision forward error correction using the analog information obtained from the communication path as reliability.

Figure 21:
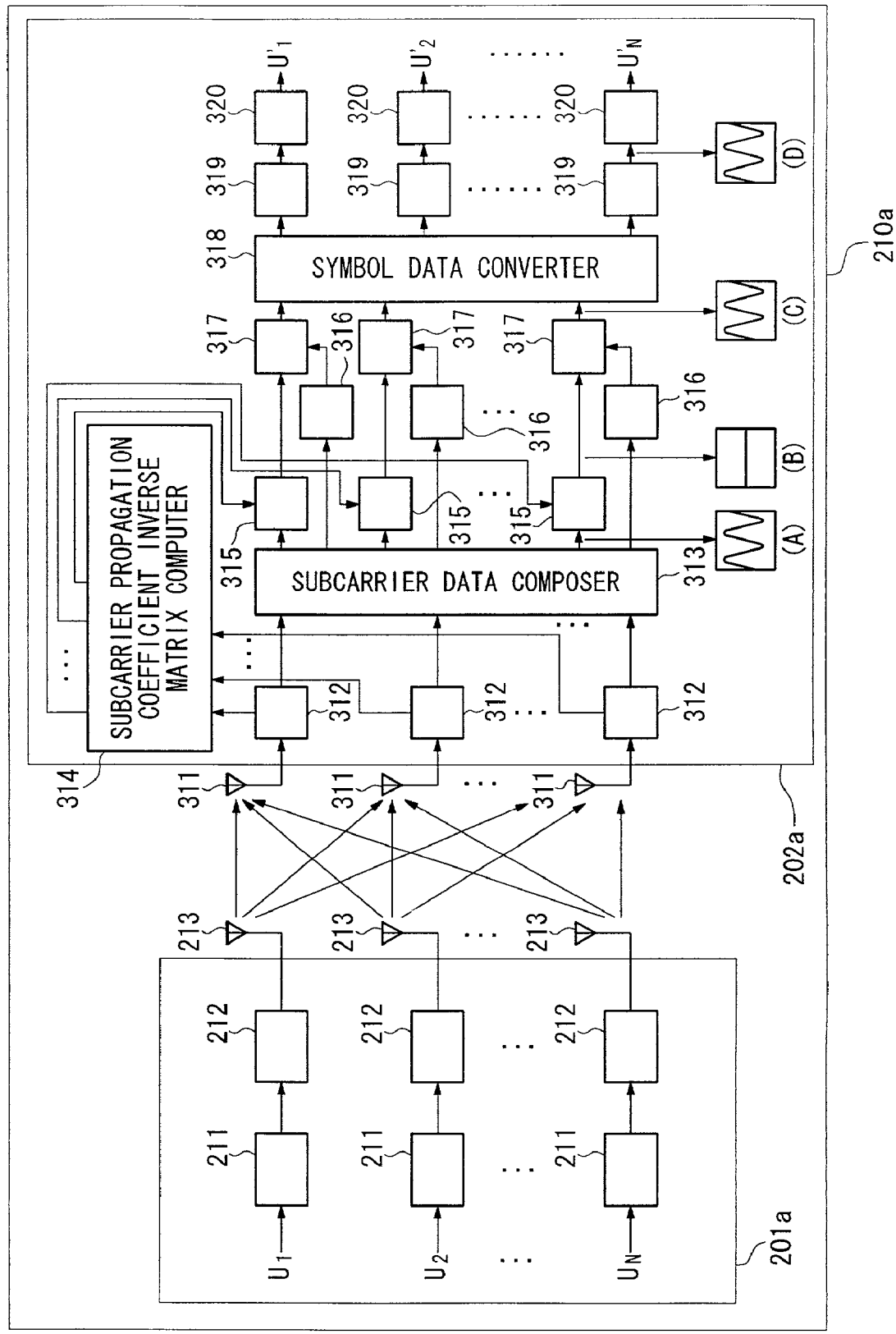
FIG. 21 is a block diagram showing a construction of an OFDM signal communication system according to a thirteenth embodiment.

FIG. 21 is a block diagram showing the construction of an OFDM signal communication system 210 of the thirteenth embodiment of the present invention. The OFDM signal communication system 210 comprises an OFDM signal transmitting device 201 and an OFDM signal receiving device 202. For convenience of description these are described as an OFDM signal communication system 210a, an OFDM signal transmitting device 201a, and an OFDM signal receiving device 202a. In the OFDM signal transmitting device 201a, as with the embodiments up till here, there is provided: a data converter; a pilot signal generator; a combiner; a symbol timing generator; a transmission frequency converter; a transmission local oscillator; and so on, while in the OFDM signal receiving device 202a there is provided: a receiving frequency converter; a local oscillator for receiver; a timing signal generator; and so on. However in FIG. 21, illustrations of these components are omitted.

In the OFDM signal transmitting device 201a, reference numeral 211 denotes a forward error correction encoder, which performs forward error correction encoding N transmission data systems. In this embodiment, for the error coding and decoding technology, the case where convolutional coding-soft decision Viterbi decoding, being strong forward error correction, is applied, is described as an example. Reference numeral 212 denotes N inverse fast Fourier transformers. Reference numeral 213 denotes N transmitting antennas. Here "N" is an integer of two or more.

In the OFDM signal receiving device 202a, reference numeral 311 denotes N receiving antennas. Reference numeral 312 denotes N fast Fourier transformers. Reference numeral 313 denotes subcarrier data composers, which convert the output from the fast Fourier transformer 312 to an I systems (I is a natural number) for each subcarrier. Reference numeral 314 denotes a subcarrier propagation coefficient inverse matrix computer which estimates a propagation matrix for each of the subcarriers between the transmitting/receiving antennas of all combinations, based on the output of the fast Fourier transformer 312, and calculates the inverse matrix thereof. Reference numeral 315 denotes I subcarrier interference cancellers which multiply the output of the I systems of the subcarrier data composer 313 by the output of the I systems of the subcarrier propagation coefficient inverse matrix computer 314.

Reference numeral 316 denotes I weighting factor computers which calculate a weighting factor from the output of the I systems of the subcarrier data composer 313. Reference numeral 317 denotes I multipliers which multiply the output of the I subcarrier interference canceller 315 by the output of the I weighting factor computer 316. Reference numeral 318 denotes a symbol data converter which converts the output of the multiplier 317 to a sequence for each of the symbols. Reference numeral 319 denotes a demodulator. Reference numeral 320 denotes a soft decision forward error correction decoder.

The subcarrier propagation coefficient inverse matrix computer 314 calculates the inverse matrix $(S^i)^{-1}$ of the propagation matrix $S^i$ for which the propagation coefficient $S^i_{mn}$ between the m th transmitting antenna (where m is an integer greater than or equal to 1 and less than or equal to N) and the n th receiving antenna (where n is an integer greater than or equal to 1 and less than or equal to N) in the i th OFDM subcarrier (where i is an integer greater than or equal to 1 and less than or equal to I) is an m row and n column component. The subcarrier interference canceller 315 multiplies the components for the subcarrier i in the data signal of the received N symbols by $(S^i)^{-1}$, to thereby cancel the mutual interference and separate the transmitted data signals.

Incidentally, the subcarrier interference canceller 315 achieves a similar effect to signal equalization by multiplying with the inverse matrix. Therefore, as shown by one example in (B) of FIG. 21, the amplitude of the output in the subcarrier interference canceller 315 is masked on the constant amplitude value of the corresponding transmitted symbol data signal, irrespective of the original amplitude of the received signal. That is, the interference cancellation reproduces the original digital signal, and hence the amplitude is always constant. Therefore, supposing that the output from the subcarrier interference canceller 315 is input unchanged to the symbol data converter 318, the likelihood of the received data calculated by the demodulator 319 is not the original value to be obtained, and becomes a value close to constant, so that the output value of the likelihood calculation no longer reflects the amplitude at the time of reception. Therefore, the information for soft decision forward error correction is not obtained, giving hard decision, and the soft decision forward error correction decoder 320 can thus not demonstrate its inherent ability sufficiently.

In this way, since the amplitude information of the data signal for receipt by the subcarrier interference canceller 315 is lost, then in the OFDM signal communication system 210a of this embodiment, a weighting factor showing the amplitude information which the received signal has, is acquired by the weighting factor computer 316 from the output of the I systems of the subcarrier data composer 313. That is to say, the OFDM signal communication system 210a of this embodiment is characterized in comprising the weighting factor computer 316 and the multiplier 317.

Many options can be considered for obtaining weighting factors $W^i_1, W^i_2, \ldots, W^i_N$ using the weighting factor computer 316. However here an example is described of where these are calculated at a signal-to-noise power ratio (SNR) for the received signal with the best noise tolerance.

If the components corresponding to the subcarrier i in the transmitted data of N systems are $U^i_1, U^i_2, \ldots, U^i_N$, and the components corresponding to the subcarrier i of the AWGN (Additive White Gaussian Noise) components contained in the received data of the N systems is $n^i_1, n^i_2, \ldots, n^i_N$, then the components $r^i_1, r^i_2, \ldots, r^i_N$ corresponding to the subcarrier i in the received data of the N systems can be expressed in vector form by the following equation.

$$r^i = U^i \cdot S^i + n^i \tag{22}$$

where $$r^i = [r^i_1, r^i_2, \cdots, r^i_N], \quad U^i = [U^i_1, U^i_2, \cdots, U^i_N], \quad n^i = [n^i_1, n^i_2, \cdots, n^i_N] \tag{23}$$

$$S^i = \begin{bmatrix} s^i_{11} & s^i_{12} & \cdots & s^i_{1N} \\ s^i_{21} & s^i_{22} & \cdots & s^i_{2N} \\ \vdots & \vdots & \ddots & \vdots \\ s^i_{N1} & s^i_{N2} & \cdots & s^i_{NN} \end{bmatrix}$$

When "m" indicates the m th ($1 \leq m \leq N$) transmitting antenna 213, and "n" indicates the n th ($1 \leq n \leq N$) receiving antenna 311, then $S^i_{mn}$ is the propagation coefficient of the propagation path via the transmitting antenna 213 and the receiving antenna 311.

Here, if both sides of the equation shown in equation (22) are multiplied by the subcarrier propagation coefficient inverse matrix $(S^i)^{-1}$, then the following equation results.

$$\tau^i = U^i + n^i \cdot (S^i)^{-1} \tag{24}$$

Here $$(S^i)^{-1} = \begin{bmatrix} s'^i_{11} & s'^i_{12} & \cdots & s'^i_{1N} \\ s'^i_{21} & s'^i_{22} & \cdots & s'^i_{2N} \\ \vdots & \vdots & \ddots & \vdots \\ s'^i_{N1} & s'^i_{N2} & \cdots & s'^i_{NN} \end{bmatrix} \tag{25}$$

Here $\tau^i$ is the vector expression of $\tau^i_1, \tau^i_2, \ldots, \tau^i_N$ being the output from the subcarrier interference canceller 315. Supposing that the amplitude of the transmitted data $U^i_1, U^i_2, \ldots, U^i_N$ are all the same for |U|, then the signal-to-noise power ratio of $\tau^i_1, T\tau^i_2, \ldots, \tau^i_N$ becomes:

$$SNR(\tau^i_j) = \frac{|U|^2}{|n^i_1 s'^i_{1j} + n^i_2 s'^i_{2j} + \ldots + n^i_N s'^i_{Nj}|^2} \tag{26}$$

where j is a natural number less than or equal to N. Since $n^i_1, n^i_2, \ldots, n^i_N$ have an independent Gaussian distribution, then equation (26) can be approximated by the following equation.

$$SNR(\tau^i_j) \approx \frac{|U|^2}{\{|s'^i_{1j}|^2 + |s'^i_{2j}|^2 + \ldots + |s'^i_{Nj}|^2\}\sigma_V^2} \tag{27}$$

where $\sigma_v^2$, is the variance of the complex number Gaussian distribution of $n^i_1, n^i_2, \ldots, n^i_N$.

Here the noise power of the received signal is equal in the respective subcarriers, and hence the ratio of the SNR of the respective subcarriers becomes equivalent to the ratio of the square of the amplitudes of the received signals in the respective subcarriers. Consequently, the weighting factors $W^i_1, W^i_2, \ldots, W^i_N$ for $\tau^i_1, \tau^i_2, \ldots, \tau^i_N$ are expressed by the following equation in view of the SNR of the respective subcarriers obtained from equation (27).

$$w^i_j = \frac{K}{\sqrt{|s'^i_{1j}|^2 + |s'^i_{2j}|^2 + \ldots + |s'^i_{Nj}|^2}} \tag{28}$$

where in equation (28) K is the common constant for all subcarriers. By multiplying the output from the subcarrier interference canceller 315 by these $W^i_1, W^i_2, W^i_N$ weighting factors, the lost amplitude information is reproduced, and the soft decision forward error correction is performed by the soft decision forward error correction decoder 320, from the likelihood output from the demodulator 319. As a result, the capability of soft decision forward error correction from the likelihood based on the amplitude information can be demonstrated to the full.

Furthermore, in FIG. 21, (A) is an example of the input amplitude of the subcarrier interference canceller. (B) is an example of the output amplitude of the subcarrier interference canceller. (C) is an example of the output amplitude of the weighting factor multiplier. (D) is an example of the output amplitude of the demodulator. The amplitude information which is lost by the multiplication by the subcarrier interference canceller 315 can be restored as shown by (C) of FIG. 21.

Fourteenth Embodiment

Figure 22:
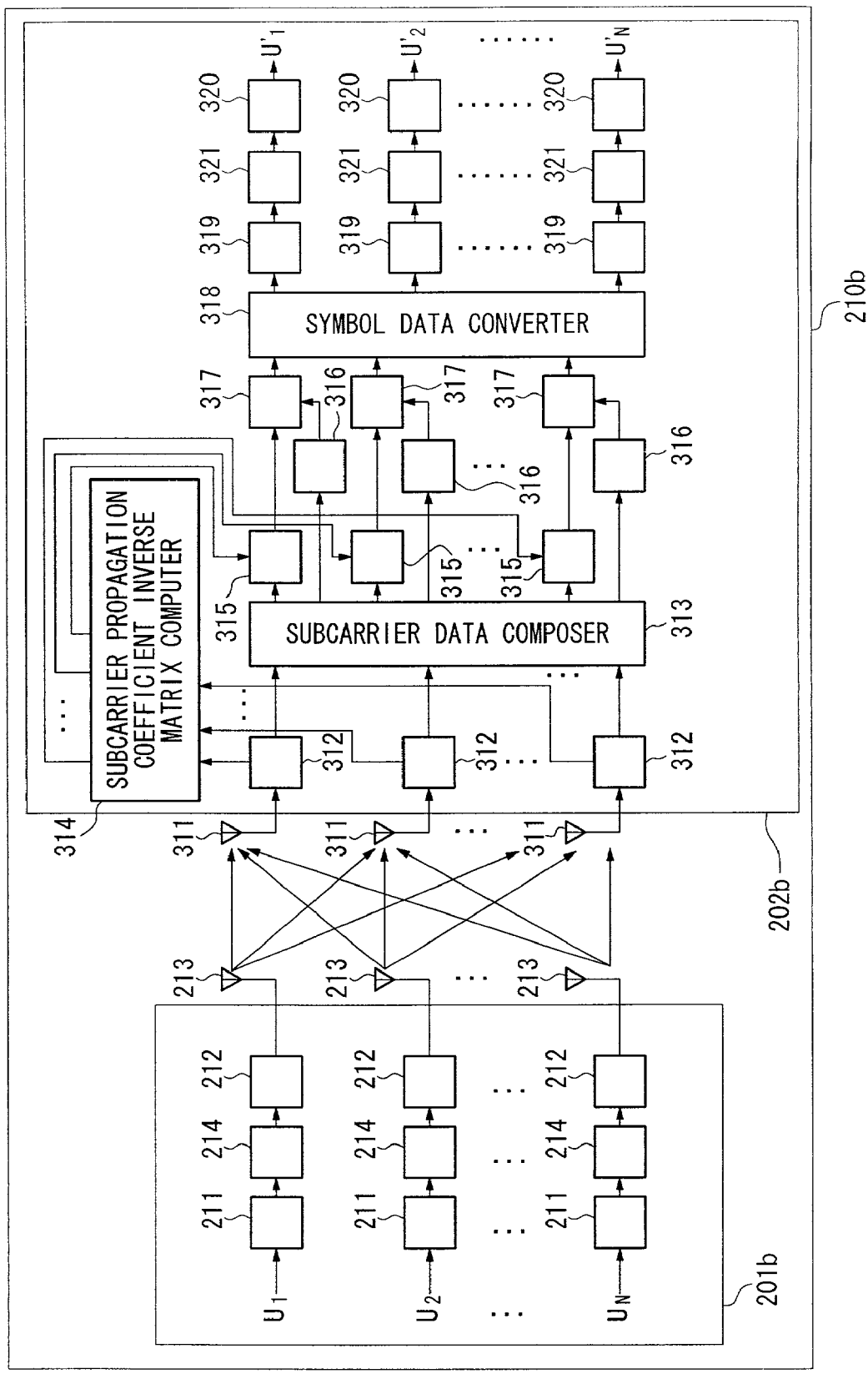
FIG. 22 is a block diagram showing a construction of an OFDM signal communication system according to a fourteenth embodiment.

The construction of an OFDM signal communication system according to a fourteenth embodiment of the present invention is shown in FIG. 22. In the figure, components corresponding to the respective parts of FIG. 21 are denoted by the same reference symbols, and description thereof is omitted. The OFDM signal communication system 210 in this embodiment comprises an OFDM signal transmitting device 201 and an OFDM signal receiving device 202. Here for convenience of description these are described as an OFDM signal communication system 210b, an OFDM signal transmitting device 201b, and an OFDM signal receiving device 202b. In the OFDM signal transmitting device 201b, as with the embodiments up till here, there is provided: a data converter; a pilot signal generator; a combiner; a symbol timing generator; a transmission frequency converter; a transmission local oscillator; and so on, while in the OFDM signal receiving device 202b there is provided: a receiving frequency converter; a local oscillator for receiver; a timing signal generator; and so on. However in FIG. 22, illustrations of these components are omitted.

The OFDM signal transmitting device 201b comprises: a forward error correction encoder 211; an interleaver 214; an inverse fast Fourier transformer 212; and a transmitting antenna 213.

The OFDM signal receiving device 202b comprises: a receiving antenna 311; a fast Fourier transformer 312; a subcarrier data composer 313; a subcarrier propagation coefficient inverse matrix computer 314; a subcarrier interference canceller 315; a weighting function computer 316; a multiplier 317; a symbol data converter 318; a demodulator 319; a deinterleaver 321; and a soft decision forward error correction decoder 320.

A description will now be given of the function of the interleaver 214 and the deinterleaver 321. The interleaver 214 has a function for exchanging the order of the codes constituting the signal, while the deinterleaver 321 has a function for restoring the order of the signals which have been exchanged by the interleaver 214.

The forward error correction by the convolutional coding and the Viterbi decoding is effective against random errors where bit errors discretely appear, but is not effective against burst errors where bit errors continuously appear. Therefore, the interleaver 214 and the deinterleaver 321 randomize the burst errors to thereby improve the effect of the soft decision forward error correction.

For instance, the following example shows where a bit stream has been input.

(1) (2) (3) (4) (5) (6) (7) (8) (9) (10) (11) (12) (13) (14) (15) (16)

Here the numbers within the bracket shows the input order of the respective bits.

The input bit stream as described above, is rearranged for example as hereunder by the interleaver 214.

(1) (5) (9) (13) (2) (6) (10) (14) (3) (7) (11) (15) (4) (8) (12) (16)

The bit stream which has been rearranged by the interleaver 214 is transmitted from the OFDM signal transmitting device 201b to the OFDM signal receiving device 202b. During this transmission, a continuous error due to fading (attenuation) or the like is produced for example as hereunder.

(1) (5) (9) <13> <2> <6> <10> (14) (3) (7) (11) (15) (4) (8) (12) (16)

The above <> shows the bit in which an error has occurred. In such a case, since the deinterleaver 321 restores the rearranged input bit stream, the continuous error is randomized as follows.

(1) <2> (3) (4) (5) <6> (7) (8) (9) <10> (11) (12) <13> (14) (15) (16)

As a result, the effect of forward error correction due to convolutional coding and Viterbi decoding is improved.

Here the experimental results for the above described construction are shown.

Figure 23:
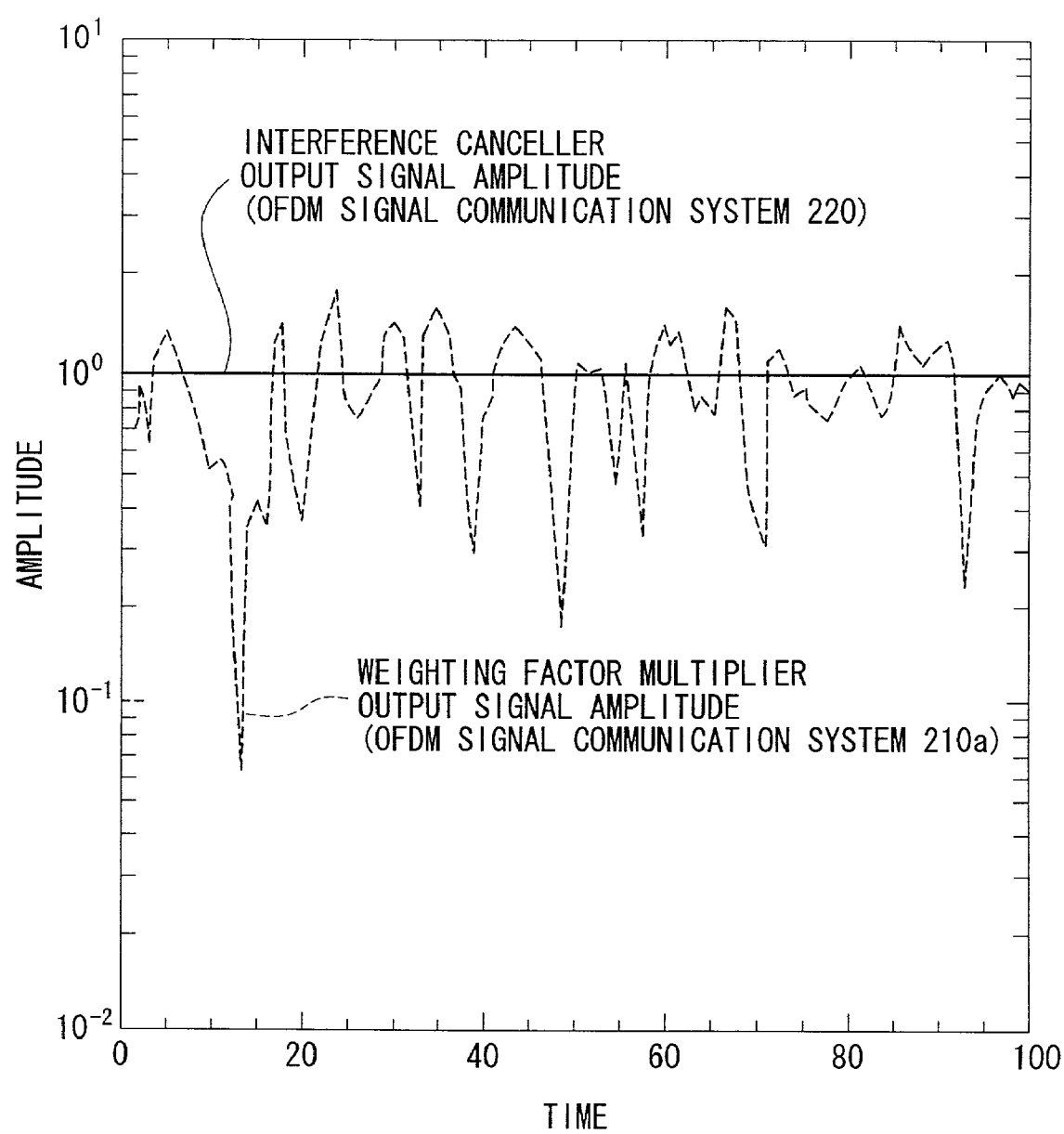
FIG. 23 is a diagram showing experimental results for explaining the effect of the thirteenth and fourteenth embodiments.

At first, referring to FIG. 23, the experimental results for the time variation of the output signal amplitude in the subcarrier interference canceller 315 of the OFDM signal receiving device 202 is explained. In FIG. 23, the time variation of the output signal amplitude in this case where the weighting factor computer 316 and the multiplier 317 in the OFDM signal communication system 210a shown in FIG. 21 are not provided (here for convenience referred to as the OFDM signal communication system 220), is compared with the time variation of the output signal amplitude in the OFDM signal communication system 210a shown the example in FIG. 21. Furthermore, in FIG. 24, the time variation of the output likelihood of the demodulator in the OFDM signal communication system 220, is compared with the time variation of the output likelihood of the demodulator in the OFDM signal communication system 210a.

In the experimental results shown in FIG. 23 and 24, the parameters of the OFDM signal communication system 220 are as follows.

Figure 24:
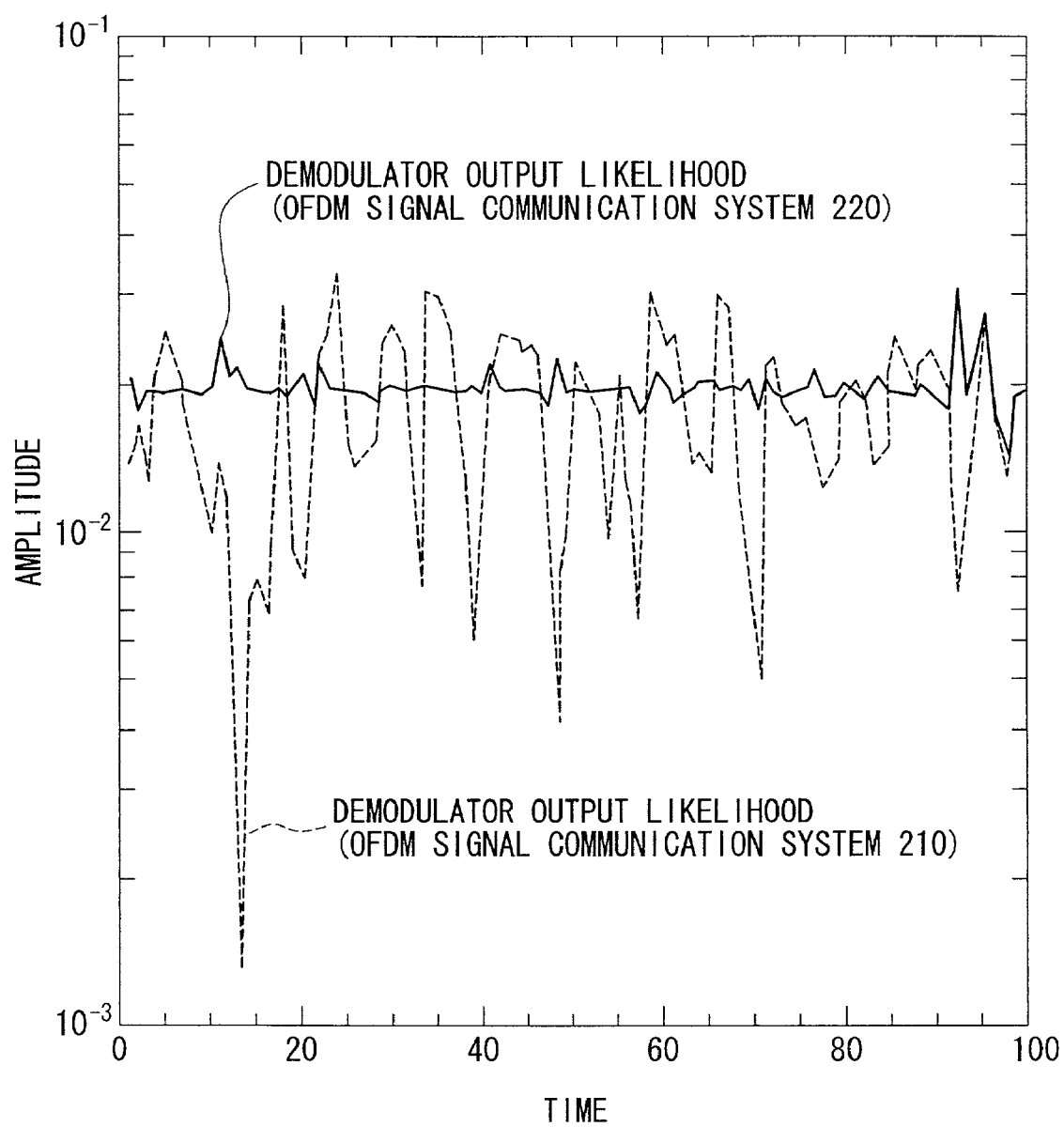
FIG. 24 is a diagram showing experimental results for explaining the effect of the thirteenth and fourteenth embodiments.

Channel multiplicity (number of antennas=N): 2 (two for both transmission and reception)
Transmission speed: 54 Mbps/channel
Number of subcarriers (=I): 48/channel
Subcarrier modulation method: 64 QAM
Forward error correction method: coding rate 3/4, convolutional coding of constraint length 7/Viterbi decoding
Fading: 18-ray Rayleigh fading (rms delay spread=50[ns], maximum Doppler frequency=50 Hz)
Interleaving: none Moreover, in the experimental results shown in FIG. 23 and 24, the parameters of the OFDM signal communication system 210a are as follows.

Channel multiplicity (number of antennas=N): 2 (two for both transmission and reception)
Transmission speed: 54 Mbps/channel
Number of subcarriers (=I): 48/channel
Subcarrier modulation method: 64 QAM
Forward error correction method: Coding rate 3/4, convolutional coding of constraint length 7/Viterbi decoding
Fading: 18-ray Rayleigh fading (rms delay spread 50[ns], maximum Doppler frequency=50 Hz)
Interleaving: none
Weighting factor: implemented with the value for K as K=1

In FIG. 23, the unit of time is the OFDM symbol duration. Furthermore, the subcarrier interference canceller input signal of the OFDM signal receiving device 202a is the same as the input signal for the subcarrier interference canceller of the OFDM signal receiving device provided in the OFDM signal communication system 220. In the OFDM signal communication system 210a, as shown in FIG. 23, the original amplitude information which the received signal has, is reproduced in the output signal amplitude.

FIG. 24 shows the time variation of the output likelihood for the demodulator 319, and the OFDM signal communication system 220. The units of time are the OFDM symbols. In FIG. 24, as mentioned above, the original amplitude information which the received signal has, is reproduced. Therefore, this is also reflected in the time fluctuations of the output likelihood of the demodulator. That is to say, as shown by the example (B) in FIG. 21, since the output signal amplitude of the subcarrier interference canceller becomes constant, then in the OFDM signal communication system 220, the fluctuation margin of the output likelihood of the demodulator becomes small.

Figure 25:
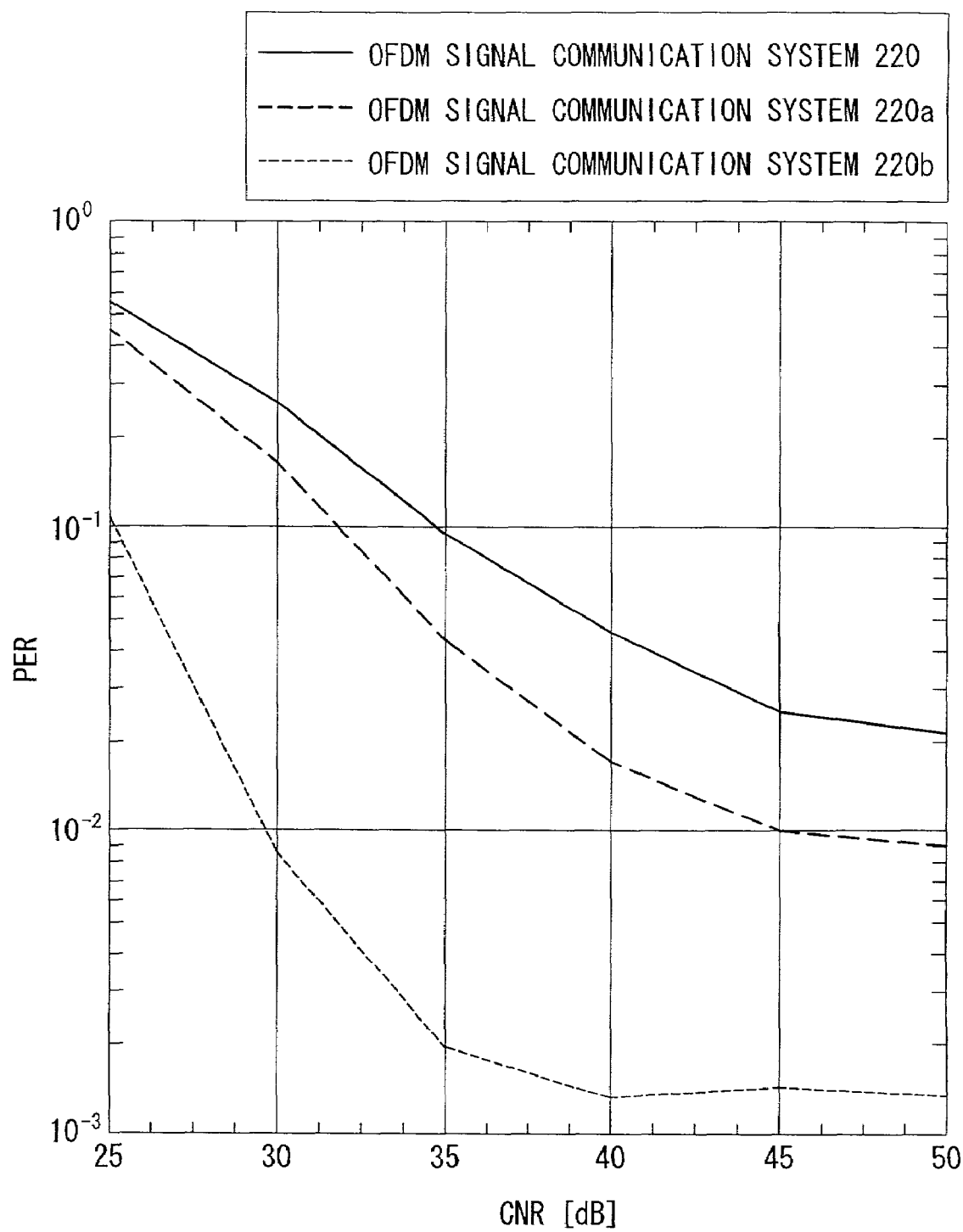
FIG. 25 is a diagram showing experimental results for explaining the effect of the thirteenth and fourteenth embodiments.

FIG. 25 shows the packet error rate performance of the OFDM signal communication system 210a, the OFDM signal communication system 210b, and the OFDM signal communication system 220 respectively shown as examples in FIG. 21 and FIG. 22. The parameters of the OFDM signal transmitting system 210a giving these experimental results are as follows.

Channel multiplicity (number of antennas=N): 2 (two for both transmission and reception)
Transmission speed: 54 Mbps/channel
Number of subcarriers (=I): 48/channel
Subcarrier modulation method: 64 QAM
Forward error correction method: Coding rate 3/4, convolutional coding of constraint length 7/Viterbi decoding
Fading: 18-ray Rayleigh fading (rms delay spread=50[ns], maximum Doppler frequency=50 Hz)
Interleaving: none
Weighting factor: implemented with the value for K as K=1

The parameters of the OFDM signal communication system 210b giving the experimental results shown in FIG. 25 are as follows.

Channel multiplicity (number of antennas ): 2 (two for both transmission and reception)
Transmission speed: 54 Mbps/channel
Number of subcarriers: 48/channel
Subcarrier modulation method: 64 QAM
Forward error correction method: Coding rate 3/4, convolutional coding of constraint length 7/Viterbi decoding
Fading: 18-ray Rayleigh fading (rms delay spread=50[ns], maximum Doppler frequency=50 Hz)
Interleaving: 16 bit depth
Weighting factor: implemented with the value for K as K=1

Furthermore, the parameters of the OFDM signal communication system 220 giving the experimental results shown in FIG. 25 are the same as the parameters giving the abovementioned experimental results shown in FIG. 23 and FIG. 24.

As shown in FIG. 25, the error floor for the present embodiment is improved from $8.8 \times 10^{-3}$ to $1.3 \times 10^{-3}$. As described above, in the OFDM signal communication system 220, the high SNR signal and the low SNR signal are both handled by the same value for the likelihood. However, in the construction of the thirteenth embodiment and of this embodiment (the OFDM signal communication system 210a and the OFDM signal communication system 210b) the signal with a high SNR receives a high weighting and hence has a high likelihood value. Conversely, the signal with a low SNR receives a low weighting and has a low likelihood value. Consequently, forward error correction with a high gain is possible with a construction where a weighting factor computer and a multiplier are not provided in the OFDM signal communication system.

As described above in the present embodiment, the amplitude of the interference canceller output becomes a constant value due to multiplication by the propagation coefficient inverse matrix, and hence the situation where the amplitude information is lost can be avoided. As a result, the capability of the soft decision forward error correction which uses the likelihood calculated from the amplitude can be demonstrated to the full.

Furthermore, by means of interleaving and deinterleaving, burst error where the errors follows in succession can be randomized, and hence the effect of the soft decision forward error correction can be further improved.

Fifteenth Embodiment

The present embodiment achieves further improvement of frequency utilization efficiency in the OFDM signal communication system of the above-described embodiments, and performs carrier frequency error correction between transmission and reception.

As described above, by combining N signals in the same frequency band, it is possible to increase the frequency utilization efficiency by a factor of N. However, the transmission quality depends largely on the accuracy of the interference canceller. Signals received by N antennas are converted into baseband signals by the frequency converters, and signals transmitted by N antennas are separated into individual signals for each of the respective communication systems by the interference canceller. Since the computation of the interference canceller is performed under an assumption that there is no carrier frequency error in any of the N antennas, it is important to accurately estimate and correct carrier frequency errors.

As follows is a description of a construction of an OFDM signal communication system according to the present embodiment with reference to the block diagram in FIG. 26.

Figure 26:
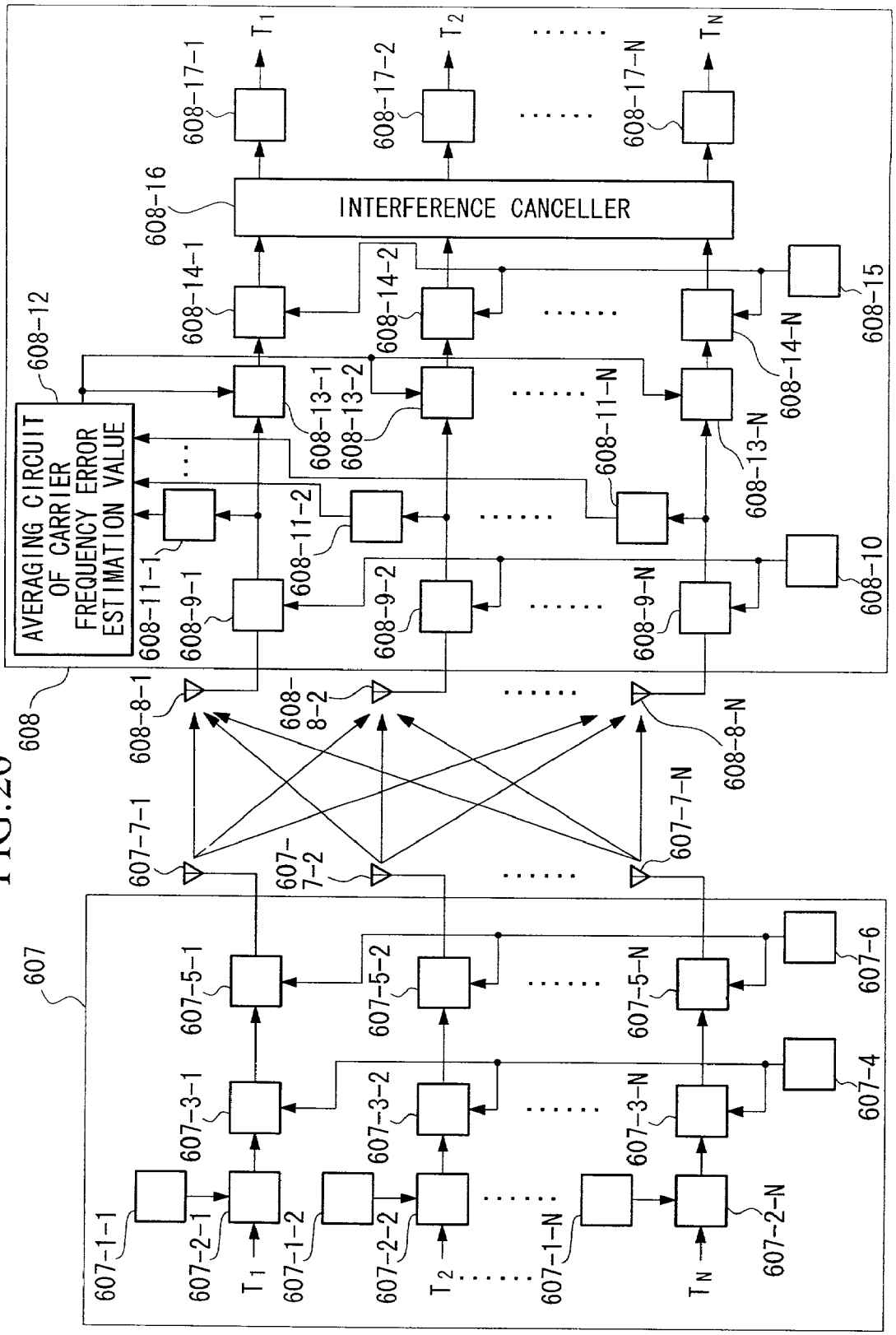
FIG. 26 is a block diagram showing a construction of an OFDM signal communication system according to a fifteenth embodiment.

The OFDM signal communication system shown in FIG. 26 comprises an OFDM signal transmitting device 607 and an OFDM signal receiving device 608. The OFDM signal transmitting device 607 comprises: two or more pilot signal generators 607-1-1 to 607-1-N for generating pilot signals; N combiners 607-2-1 to 607-1-N for combining data signals $T_1, T_2, \ldots T_N$ with respective pilot signals; N inverse fast Fourier transformers 607-3-1 to 607-3-N, a symbol timing generator 607-4 for supplying a common symbol timing to all of the N inverse fast Fourier transformers; N transmission frequency converters 607-5-1 to 607-5-N for converting the outputs of the inverse fast Fourier transformers into radio frequencies; a transmission local oscillator 607-6 for supplying a common local oscillator frequency to all of the transmission frequency converters; and N transmitting antennas 607-7-1 to 607-7-N.

In an OFDM method using SDM, since interference cancellation is performed for the signals of each respective subcarrier after Fourier transformation is performed on each received signal of the antenna systems, it is necessary to correct carrier frequency errors in the prior step with high accuracy when fast Fourier transformation is performed in the OFDM signal receiving device to assure orthogonality between subcarriers. Accordingly, the OFDM signal transmitter device transmits a propagation coefficient estimation pilot signal after transmitting a carrier frequency error estimation pilot signal, and afterwards transmits a data signal. Conversely, in the OFDM signal receiving device, prior to estimation of the propagation coefficient and reception of the data signal, carrier frequency error is estimated using the carrier frequency error estimation pilot signal. For a carrier frequency error estimation pilot signal in general, a repetitive signal is used. If the periodicity of repeated signals collapses, estimation accuracy deteriorates. Therefore, a symbol configuration is desirable in which the component transmitted before the transmission of the repeated signal does not cause interference between symbols due to multipath fading on the carrier frequency error estimation pilot signals. Since the carrier frequency error estimation pilot signals transmitted from each of the antenna systems are transmitted in synchronization by the symbol timing generator 607-4 in the OFDM signal transmitting device 607, transmitted signals transmitted from N transmitting antennas 607-7-1 to 607-7-N are input to receiving antennas with almost the same timing. The OFDM signal receiving device 608 receives waves in which carrier frequency error estimation pilot signals of all transmitting antenna systems are combined. However, if repeated signals are used in which interference between symbols does not occur, the periodicity in adjacent symbols is not destroyed. Therefore, it is possible to estimate carrier frequency errors correctly.

On the other hand, the OFDM signal receiving device 608 comprises: N receiving antennas 608-8-1 to 608-8-N; N receiving frequency converters 608-9-1 to 608-9-N, connected to each of the receiving antennas, for converting the frequency of radio frequency received signals to frequencies suitable for demodulation; a local oscillator for receiver 608-10 for supplying a common local oscillator frequency to all of the N receiving frequency converters; N carrier frequency error estimators 608-11-1 to 608-11-N for estimating the frequency error between the transmission local oscillator 607-6 and the local oscillator for receiver 608-10 from the outputs of N receiving frequency converters 608-9-1 to 608-9-N; an averaging circuit of carrier frequency error estimation value 608-12 for averaging the carrier frequency error estimation values estimated by each of the N carrier frequency error estimators 608-11-1 to 608-11-N; N carrier frequency error correctors 608-13-1 to 608-13 N for correcting carrier frequency errors based on the average carrier frequency error estimation value from the averaging circuit of carrier frequency error estimation value 608-12; N fast Fourier transformers 608-14-1 to 608-14-N; a timing signal oscillator 608-15; an interference canceller 608-16 for canceling interference between mutual channels by performing inverse matrix computation of a MIMO channel propagation coefficient matrix on the outputs of the carrier frequency error correctors 608-13-1 to 608-13-N; and N demodulators 608-17-1 to 608-17-N for demodulating the output of the interference canceller 608-16 into a bit stream.

In this manner, in the present OFDM signal communication system, by supplying a common local oscillator frequency for all of the transmission frequency converters 607-5-1 to 607-5-N by the local transmission oscillator 607-6 in the OFDM signal transmitting device 607, radio signal is transmitted from each of the transmitting antennas 607-7-1 to 607-7-N over the same frequency. Furthermore, on the OFDM signal receiving device 608 side, since a common local oscillator frequency is supplied for all of the receiving frequency converters 608-9-1 to 608-9-N by the local oscillator for receiver 608-10, it enables each of the receiving antennas 608-8-1 to 608-8-N to receive signals with almost the same frequency from transmitting antennas 607-7-1 to 607-7-N respectively.

However, in the case where there is an error in the frequency of the transmission local oscillator 607-6 and the local oscillator for receiver 608-10, it affects the received signals converted into baseband signals by receiving frequency converters 608-9-1 to 608-9-N. Therefore, in order to avoid performance deterioration caused by frequency errors in the local oscillators installed in both of the OFDM signal transmitting device 607 and the OFDM signal receiving device 608, the carrier frequency error estimators 608-11-1 to 608-11-N in the OFDM signal receiving device 608 estimate carrier frequency errors when receiving known pilot signals, and the carrier frequency error correctors 608-13-1 to 608-13-N correct carrier frequency errors contained in later data symbols using these estimated values. The above processing reduces carrier frequency errors at each antenna, and limits performance deterioration.

In addition to this, the OFDM signal receiving device 608 shown in FIG. 26 has an averaging circuit of carrier frequency error estimation value 608-12, which is connected to the carrier frequency error estimators 608-11-1 to 608-11-N, computes the average value of N system carrier frequency error estimation values, and outputs the result to all of the carrier frequency error correctors 608-13-1 to 608-13-N. In the present embodiment, it is possible to reduce errors in the carrier frequency estimation error caused by multipath fading and thermal noise by averaging the carrier frequency error estimation values computed for all of the antenna systems. Furthermore, by using the same carrier frequency error correction value in all of the antenna systems, remaining carrier frequency error becomes the same for each of the antenna systems. Therefore, the central frequency of the baseband signal for each of the antenna systems becomes the same, and hence it is possible to improve the estimation accuracy of inverse matrix of the propagation coefficient matrix.

Next is a detailed description of the operation on the OFDM signal receiving device 608 side in an OFDM signal communication system according to the construction described above. Signals received by N receiving antennas 608-8-1 to 608-8-N are firstly converted to baseband signals by the receiving frequency converters 608-9-1 to 608-9-N to which a carrier frequency is supplied from the common local oscillator for receiver 608-10. Then, for the baseband signals, using the received signals of pilot signals for carrier frequency error estimation generated by the pilot signal generators 607-1-1 to 607-1-N, carrier frequency errors are estimated by the carrier frequency error estimators 608-11-1 to 608-11-N. Regarding the estimation value, in the averaging circuit of carrier frequency error estimation value 608-12, the average value of N system estimation values is obtained, and the average value is output to all of the carrier frequency error correctors 608-13-1 to 608-13-N.

After carrier frequency errors are corrected for the baseband signals by the carrier frequency error correctors 608-13-1 to 608-13-N, they are fast Fourier transformed by the fast Fourier transformers 608-14-1 to 608-14-N, and input to the interference canceller 608-16. In the interference canceller 608-16, the inverse of a propagation coefficient matrix of a MIMO channel comprising N transmitting antennas and N receiving antennas is estimated in advance using a received baseband signal of known pilot signals generated by the pilot signal generators 607-1-1 to 607-1-N. When baseband signals of N systems containing data are input, the inverse propagation coefficient matrix is computed for the input signals, and thus transmitted signal components that are dispersed to each of the receiving antenna systems are separated. The baseband signals separated for each transmitted signal component by the interference canceller 608-16 are demodulated to data by demodulators 608-17-1 to 608-17-N.

Here, a case is considered in which estimation and correction of carrier frequency error are performed individually for each of the antenna systems. A computation to obtain the inverse of the propagation coefficient matrix obtained in the interference canceller 608-16 is performed under an assumption that received signals are all converted into baseband signals with the same carrier frequency. Since the OFDM signal transmitting device 607 and the OFDM signal receiving device 608 use the transmission local oscillator 607-6 and the local oscillator for receiver 608-10 respectively, which are common to all of the antenna systems, the carrier frequency error of each of the antenna systems should be the same value. However, through the influences of thermal noise in the OFDM signal communication system and variations of multipath fading, the carrier frequency error remaining in the received baseband signal of each antenna system varies. Although the transmission local oscillator 607-6 and the local oscillator for receiver 608-10 are common to all of the antenna systems, this is equivalent to the carrier frequencies of the systems being different, and hence the accuracy of estimation of the inverse of the propagation coefficient matrix and interference cancellation are reduced, and performance deteriorates significantly.

From the above, in the present embodiment, the common average value of the carrier frequency error estimation values obtained for all of the antenna systems is used, thereby differences between carrier frequencies of the antenna systems caused by noise and variation of fading are avoided, and at the same time, by the diversity effect of N branches, the accuracy of the estimated value of the carrier frequency error itself is improved. As a result, it is possible to compute the inverse of the propagation coefficient matrix more accurately.

Figure 27A:
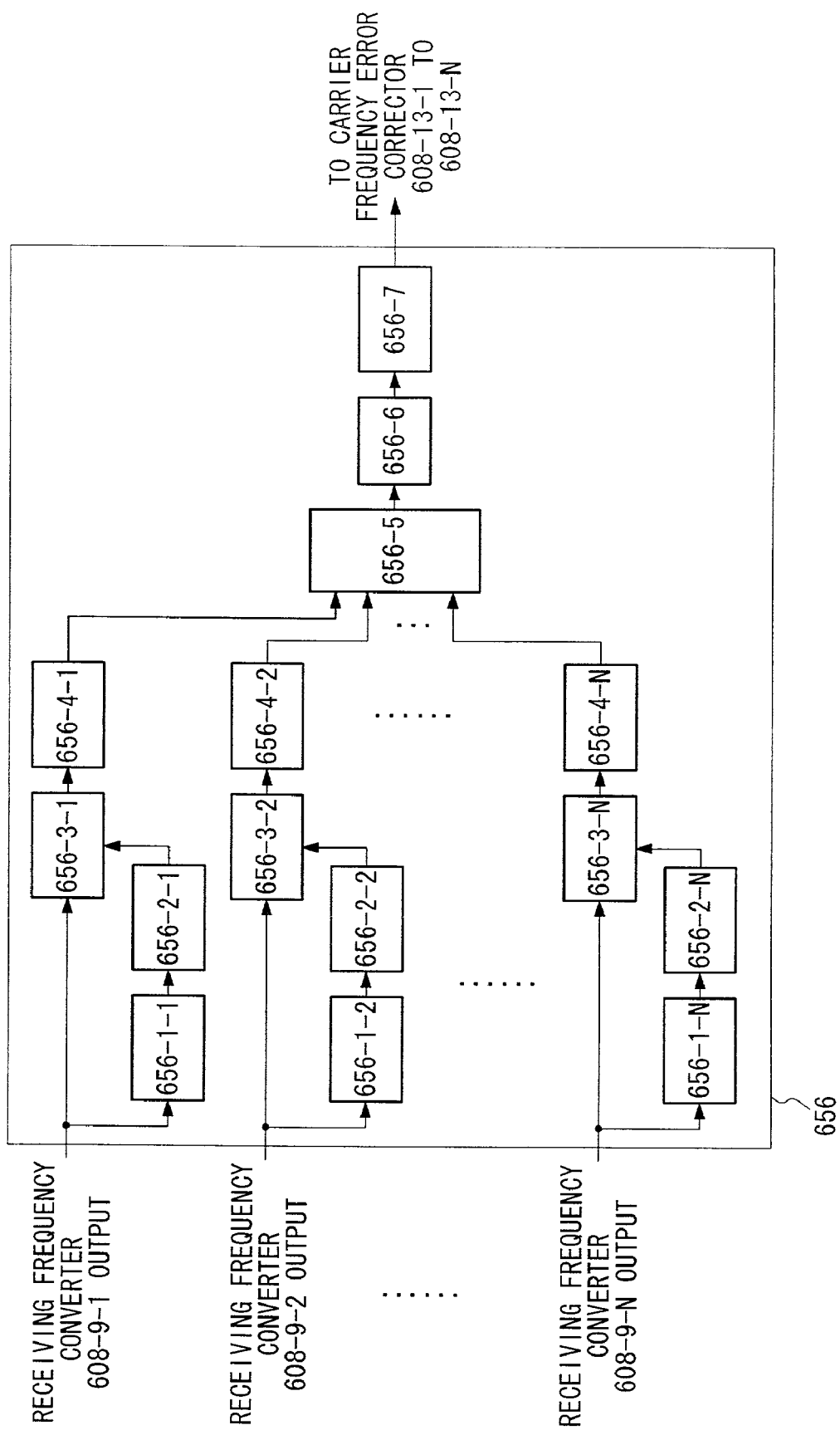
FIG. 27A is a block diagram showing a first configuration example of an averaging circuit of carrier frequency error estimation value in the fifteenth embodiment.

Next is a description of a specific construction of the carrier frequency error estimators 608-11-1 to 608-11-N and the averaging circuit of carrier frequency error estimation value 608-12 shown in FIG. 26. FIG. 27A is a block diagram showing a first configuration example of these circuits. As is clear from a comparison of FIG. 26 and FIG. 27A, the carrier frequency error estimators 608-11-1 to 608-11-N and the averaging circuit of carrier frequency error estimation value 608-12 are shown in individual blocks in FIG. 26 for simplicity. However, in fact they are integrated as shown in FIG. 27A. Hereunder, the block shown in FIG. 27A is designated an averaging circuit of carrier frequency error estimation 656.

The averaging circuit of carrier frequency error estimation 656 comprises: delay circuits 656-1-1 to 656-1-N for delaying each of the N outputs of the N receiving frequency converters 608-9-1 to 608-9-N by a number of samples corresponding to the interval of the pilot signal transmitted repeatedly; complex conjugate circuits 656-2-1 to 656-2-N for computing complex conjugates of each of the outputs of the delay circuits 656-1-1 to 656-1-N; complex multipliers 656-3-1 to 656-3-N for multiplying the outputs of the N receiving frequency converters 608-9-1 to 608-9-N by the outputs of the complex conjugate circuits 656-2-1 to 656-2-N respectively, and computing autocorrelation values; integrating circuits 656-4-1 to 656-4-N for summing the outputs from the complex multipliers for the number of samples corresponding to the interval of the pilot signal transmission; an averaging circuit 656-5 for computing the average value of the outputs from the integrating circuits 656-4-1 to 656-4-N; an arc-tangent circuit 656-6 for computing the phase of a complex number, being the output of the averaging circuit 656-5; and a divider 656-7 for dividing the phase variation, being the output of the arc-tangent circuit 656-6, by the equivalent number of samples to the interval of the pilot signal transmission, and computing the phase variation per sampling time.

In general, to estimate carrier frequency error, firstly, autocorrelation of pilot signals transmitted repeatedly is computed. The sampling interval is $T_1$ and the pilot signal received is $r_p(k)$ ($1 \leq k \leq 2K$), where K is an equivalent number of samples to the interval of a pilot signal transmitted repeatedly, and the signal cycle of K samples is transmitted continuously. Carrier frequency error is designated $\Delta f$, and is considered for one interval of sample points of the pilot signal transmitted repeatedly, that is, two sample points $r_p(k)$ and $r_p(k+K)$, which are separated by K samples. Without the influences of noise and fading, since the interval of the pilot signal transmitted repeatedly corresponds to K samples, $r_p(k+K)$ can be expressed by means of $r_p(k)$.

$$r_p(k+K) = r_p(k) \cdot \exp(2\pi \Delta f \cdot KT)$$

When the OFDM signal receiving device receives pilot signals at the time of k=K+1, K+2, ..., 2K, the complex multipliers 656-3-1 to 656-3-N compute the complex conjugate of the signal currently received and a K sample delayed signal using the following equation:

$$r_p(k+K) \cdot r_p^*(k) = [r_p(k) \cdot \exp(2\pi \Delta f \cdot KT)] \cdot [r_p^*(k)]$$
$$= R^2 \cdot \exp(2\pi \Delta f \cdot KT)$$

Here, R is the amplitude of $r_p(k)$ and $r_p(k+K)$. By computing the phase of the complex number of this computation result in the arc-tangent circuit 656-6, it is possible to estimate the phase variation $\Delta\theta_K = 2\pi \Delta f \cdot KT$ caused by a carrier frequency error of time KT. The phase variation obtained is divided by the number of sample points K, corresponding to the interval of the pilot signal transmission, in the divider 656-7, and converted into a phase variation $\Delta\theta = \Delta\theta_K/K$ per sample point interval. Using this value in the carrier frequency error correctors 608-13-1 to 608-13-N, by rotating the phase of a sample point interval, which is separated by k samples from a reference sample point, by $-k\Delta\theta$, the phase variation caused by carrier frequency error is corrected.

Next is a more detailed description of the operation of the averaging circuit of carrier frequency error estimation 656. Firstly, pilot signals input from all of the antenna systems are delayed by the interval of the pilot signal transmission in delay circuits 656-1-1 to 656-1-N. If the number of samples of the pilot signal interval is designated K, and the sampling interval is designated T, the time to be delayed becomes KT. By computing the complex conjugates of the delayed signal in complex conjugate circuits 656-2-1 to 656-2-N, and by multiplying the signals currently input by complex multipliers 656-3-1 to 656-3-N, autocorrelation values of the pilot signals are computed. The output autocorrelation values become numbers including a phase rotation amount that fluctuates due to the carrier frequency estimation error during time KT. Since the autocorrelation values can be obtained for the same number of samples as the interval of the pilot signal transmission, the sum for K samples is computed in the integrating circuits 656-4-1 to 656-4-N.

Here, differently from FIG. 27A, it can also be considered that phase variation per sample point interval is computed for each of the antenna systems from the sum of the obtained autocorrelation values, and carrier frequency error is corrected individually for each of the antenna systems. However, if this method is used, through the influence of noise which are different for each antenna system, fading on the communication paths, the influence of thermal noise on the receiver, and the like, carrier frequency error estimation values output for each antenna system have different values. In the OFDM method, signals are divided into a large number of narrow band signals called subcarriers for transmission, and the OFDM signal receiving device separates the signals for each subcarrier using fast Fourier transformation. Therefore, if the carrier frequency estimation value is different for each antenna system, it means that frequency errors of the baseband signals of each antenna after carrier frequency error estimation are different. This is equivalent to the central frequency of all subcarriers being different for each antenna system, which leads to deterioration of the accuracy of the propagation coefficient matrix estimation in later stages and interference cancellation which is performed for each subcarrier, and hence communication quality deteriorates.

Therefore, in the averaging circuit f carrier frequency error estimation 656 of the present embodiment, the sum of N autocorrelation values computed in all of the antenna systems is averaged in the averaging circuit 656-5, the phase of the averaged autocorrelation value is obtained in the arc-tangent circuit 656-6, this phase is divided by the number of samples K, being the interval of the pilot signal transmission, by the divider 656-7 to compute the phase variation by the carrier frequency error per sampling time, and this value is output to all of the N carrier frequency error correctors 608-13-1 to 608-13-N. Since the estimated carrier frequency error estimation value is an average value of the sum of N system autocorrelation values, it is possible to reduce the relative thermal noise power in the carrier frequency error estimation to 1/N. Furthermore, since the tolerance to variation of signal amplitude due to fading is also improved by the diversity effect of N branches, it is possible to keep carrier frequency error estimation value errors lower than in the abovementioned method. Moreover, it is also evidently possible to use conventional diversity of the carrier frequency error in the time domain, which averages the previously estimated carrier frequency errors and the current estimated carrier frequency error.

In the mariner described above, signals input to the fast Fourier transformation circuits 608-14-1 to 608-14-N further keep orthogonality among the subcarriers, and the signals are fast Fourier transformed more accurately. Furthermore, computation of the inverse of the propagation coefficient matrix is performed for each subcarrier of the signals after fast Fourier transformation. However, since the carrier frequency of each subcarrier is the same, the inverse of the propagation coefficient matrix can be estimated more accurately, and hence it is possible to reduce errors in the interference cancellation of each subcarrier.

As described above, in FIG. 27A, after averaging integrated values of the autocorrelation values of the pilot signals transmitted repeatedly, which are computed for each antenna system during carrier frequency error estimation, phase variation due to carrier frequency error is obtained, and by outputting it to N carrier frequency error correctors as a common estimation value, errors of the carrier frequency error estimation value caused by multipath fading and thermal noise are reduced. Furthermore, by using the same carrier frequency error correction value for all systems, the outputs after carrier frequency error correction are given a common carrier frequency, and the central frequency of the baseband signals is made to be the same for all antenna systems. Therefore, the accuracy of the inverse of the propagation coefficient matrix is improved, and performance deterioration in the case where there is a carrier frequency error is reduced.

Figure 27B:
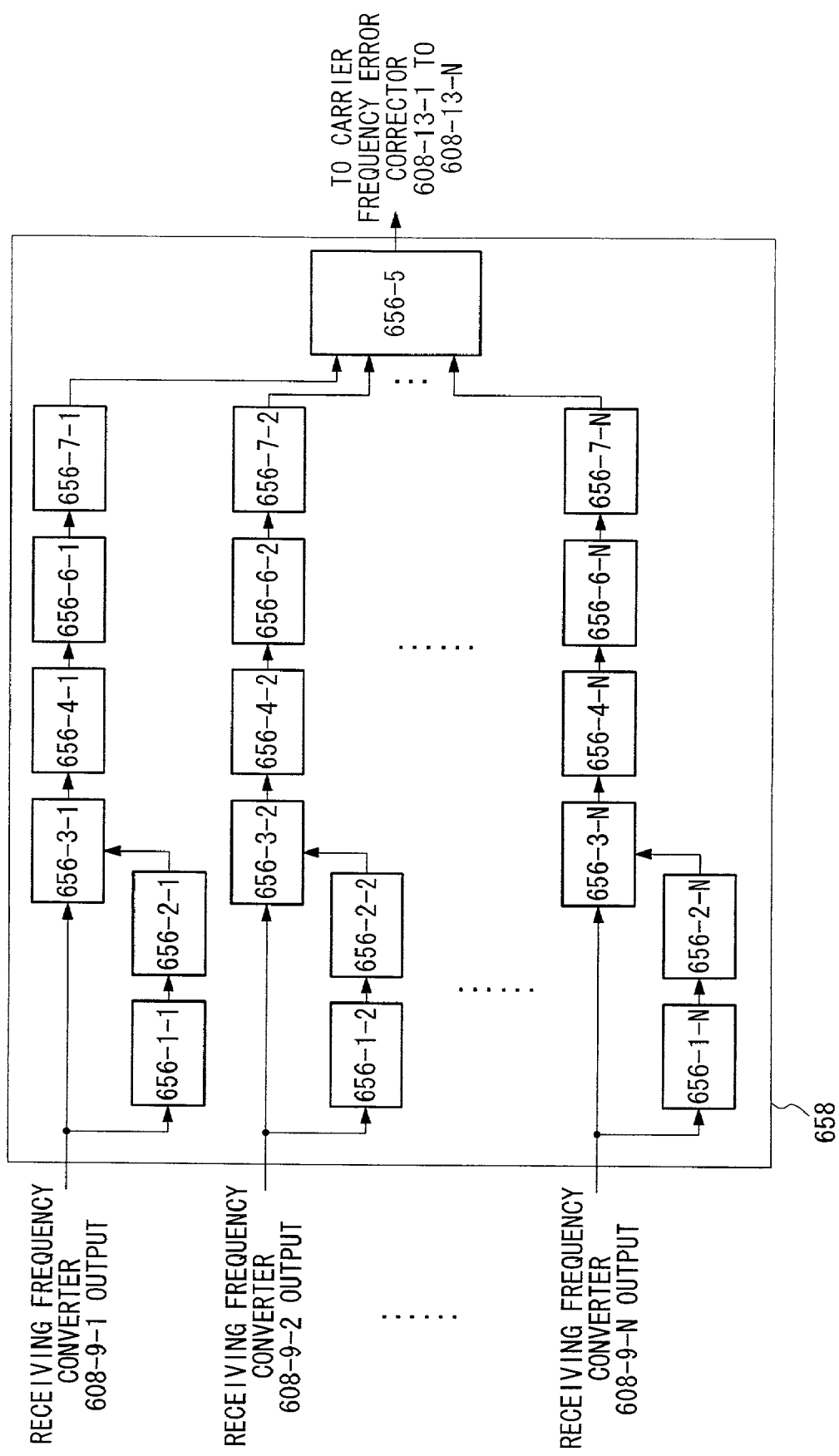
FIG. 27B is a block diagram showing a second configuration example of an averaging circuit of carrier frequency error estimation value in the fifteenth embodiment.

Next is a description of a second configuration example of the carrier frequency error estimators 608-11-1 to 608-11-N and the averaging circuit of carrier frequency error estimation value 608-12 shown in FIG. 26 with reference to FIG. 27B. The averaging circuit of carrier frequency error estimation 657 shown in FIG. 27B is a modification of FIG. 27A. In FIG. 27A, averaging is performed in a phase domain, while in FIG. 27B it is characterized in that averaging is performed in a complex number, and then converted to phase domain. To be specific, instead of the arc-tangent circuit 656-6 and the divider 656-7 as shown in FIG. 27A, arc-tangent circuits 656-6-1 to 656-6-N and dividers 656-7-1 to 656-7-N are installed for respective antenna systems. The arc-tangent circuit 656-6-1 and the divider 656-7-1 are located between the integrating circuit 656-4-1 and the averaging circuit 656-5. Similarly, the sets of arc-tangent circuits 656-6-2 to 656-6-N and dividers 656-7-2 to 656-7-N are located between the integrating circuits 656-4-2 to 656-4-N the averaging circuit 656-5. Here, the operation of an averaging circuit of carrier frequency error estimation 657 shown in FIG. 27B is the same as the operation of the averaging circuit of carrier frequency error estimation 656 shown in FIG. 27A, except that computation of the phase of complex numbers by the arc-tangent circuits and division by the number K of sample points by the dividers are performed prior to averaging by the averaging circuit 656-5.

Figure 28:
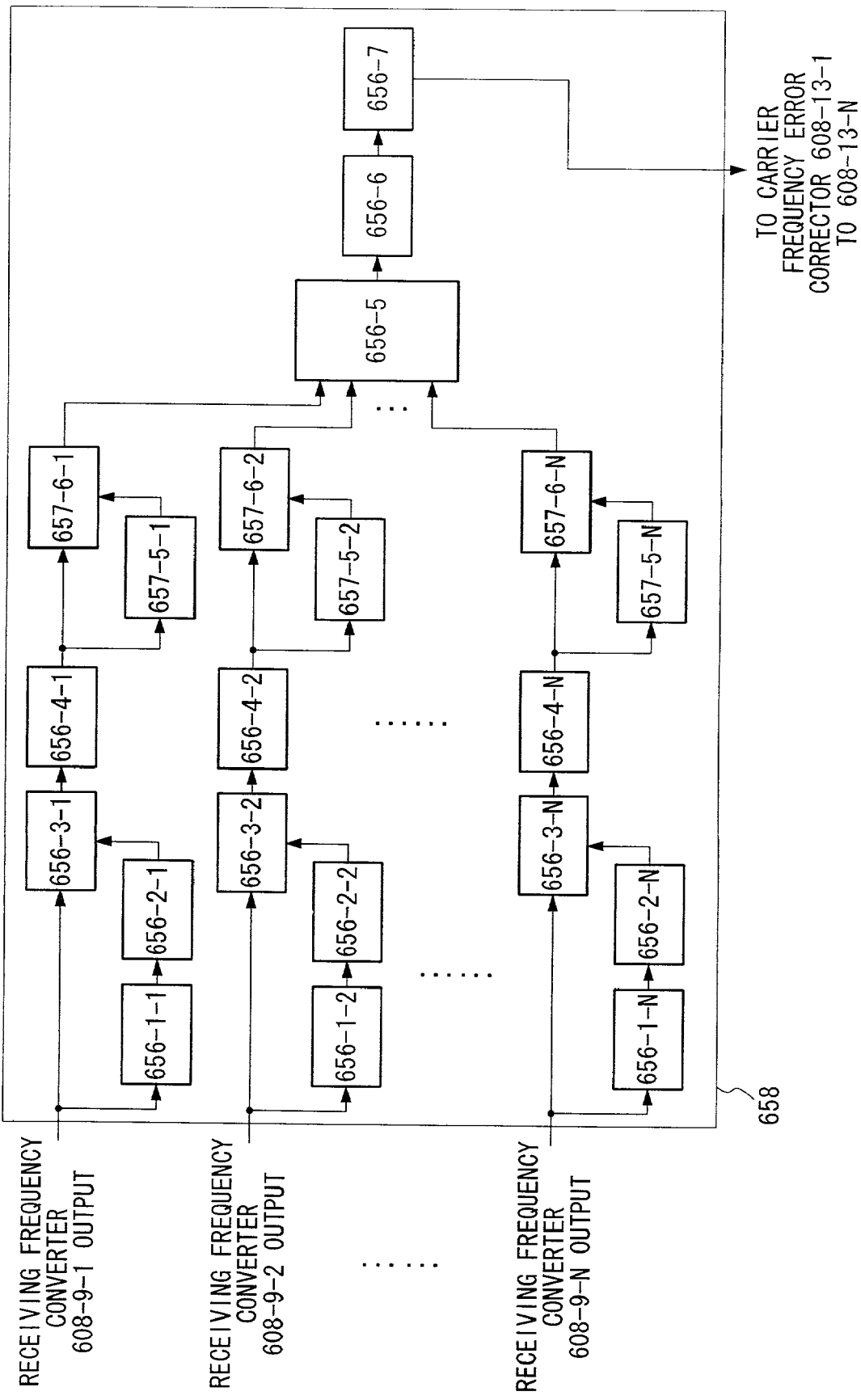
FIG. 28 is a block diagram showing a third configuration example of an averaging circuit of carrier frequency error estimation value in the fifteenth embodiment.

Next is a description of a third configuration example of the carrier frequency error estimators 608-11-1 to 608-11-N and the averaging circuit of carrier frequency error estimation value 608-12 with reference to FIG. 28. The differences between the averaging circuit of carrier frequency error estimation 658 shown in the figure and that in FIG. 27A are that amplitude computation circuits 657-5-1 to 657-5-N for computing the amplitude of the autocorrelation values of complex numbers, being outputs of the integrating circuits 656-4-1 to 656-4-N, and weighting circuits 657-6-1 to 657-6-N for weighting the out of the integrating circuits using the outputs of the amplitude computation circuits 657-5-1 to 657-5-N are further added, and that the averaging circuit 656-5 computes the average value of the outputs of the weighting circuits 657-6-1 to 657-6-N.

Next is a description of the operation of the averaging circuit of carrier frequency error estimation 658. This is completely the same as the averaging circuit of carrier frequency error estimation 656 shown in FIG. 27A until the sum of the autocorrelation values is obtained by the integrating circuits.

In the construction of FIG. 27A, the average of the outputs of the integrating circuits 656-4-1 to 656-4-N is obtained by the averaging circuit 656-5. The sum of N autocorrelation values obtained has different values due to the influences of noise and fading. In particular, in the case where the fading environments are considerably different in each antenna system, the difference is considered to become large. In the case where the sum of the autocorrelation values is small, it is considered that the sum of the autocorrelation values has a low signal-to-noise power ratio. Conversely, in the case where the sum of the autocorrelation values is large, it is considered that the sum of the autocorrelation values has a large signal-to-noise power ratio. Accordingly, if signals with different autocorrelation value are summed, the signal-to-noise power ratio of the addition result becomes smaller than the signal-to-noise power ratio of a sum of autocorrelation values with relatively large amplitudes. Therefore, in FIG. 28, a computation method is used, which is an improvement over a maximum ratio combining diversity method that is generally used in the field of mobile communications.

If the thermal noise power in each circuit connected to N antenna systems is the same for each antenna system, it is considered that the average power of thermal noise contained in the sum of N autocorrelation values is the same. Therefore, the amplitudes of each sum of N autocorrelation values are obtained in the amplitude computation circuits 657-5-1 to 657-5-N and, after weighting the N autocorrelation values, using these values, by the weighting circuits 657-6-1 to 657-6-N, they are averaged by the averaging circuit 656-5. The sum of the autocorrelation values contains noise error. However, it is generally in proportion to the signal-to-noise power ratio of the autocorrelation values. Accordingly, performing weighting based on the reliability of the sum of the autocorrelation values is almost equivalent to performing maximum ratio combining diversity containing noise error on the autocorrelation values. As a result, better optimization is achieved to noise power than the method of only averaging the sum of the autocorrelation values as shown in FIG. 27A, and hence it is possible to improve the accuracy of carrier frequency error estimation.

In this manner, in FIG. 28, before averaging the integrated values of the autocorrelation values of the pilot signals transmitted repeatedly, which are computed for each antenna system, weighting the sum of the autocorrelation values inside the carrier frequency error estimator is performed in proportion to each autocorrelation value. As a result, averaging is performed based on the reliability (reliability of the sum of autocorrelation values) of autocorrelation values whose values are different in each antenna system, and performance deterioration caused by averaging the sum of low amplitude autocorrelation values is reduced, so that it is possible to consider the degree of reliability of the autocorrelation values. Therefore, it is possible to perform carrier frequency error estimation with higher accuracy than in the case of simply averaging the autocorrelation values, and hence high quality communication can be realized.

As described in detail above, since OFDM signals are transmitted from the OFDM signal transmitting device 607 in the order of carrier frequency error estimation pilot signals, propagation coefficient estimation pilot signals, and data signals, errors of carrier frequency are firstly estimated in the OFDM signal receiving device 608 using the carrier frequency error estimation pilot signals. For example, there is a method in which, for time waveforms of pilot signals transmitted repeatedly, an operation for obtaining the phase difference of adjacent OFDM symbols is performed on all sample points of the OFDM symbols, and carrier frequency error is estimated from their average (reference: 'A High Performance Frequency and Timing Synchronization Technique for OFDM' by Mochizuki et al., Technical Report of the Institute of Electronics, Information and Communication Engineers (IEICE) (RCS98-21, 1998-04).

The obtained carrier frequency error is input to the averaging circuit of carrier frequency error estimation value 608-12, the average value of the estimation values of N systems is computed, the average value is input to all of the N carrier frequency error correctors 608-13-1 to 608-13-N, and the carrier frequency error is corrected by the same correction value. Since the averaged carrier frequency error estimation value is an average value of N systems, it is possible to reduce the influence of noise to 1/N compared with a carrier frequency error estimation value without averaging.

Furthermore, since the tolerance to reduction of signal amplitude due to fading is improved by the diversity effect of N branches in the carrier frequency error estimation, it is possible to reduce carrier frequency error estimation value lower than conventional methods. Moreover, it is possible to perform diversity in the time domain, which averages the previously estimated carrier frequency errors and the current estimated carrier frequency errors. Therefore, the orthogonality reliability of signals input to the fast Fourier transformers 608-14-1 to 608-14-N increases, and the signals are Fourier transformed more accurately. In the present embodiment, for the signals after fast Fourier transformation, computation of an inverse of the propagation coefficient matrix is performed for each subcarrier. However, since the carrier frequency of each subcarrier is the same, the inverse of the propagation coefficient matrix can be estimated more accurately, and hence it is possible to reduce errors of interference cancellation of each subcarrier.

Figure 29:
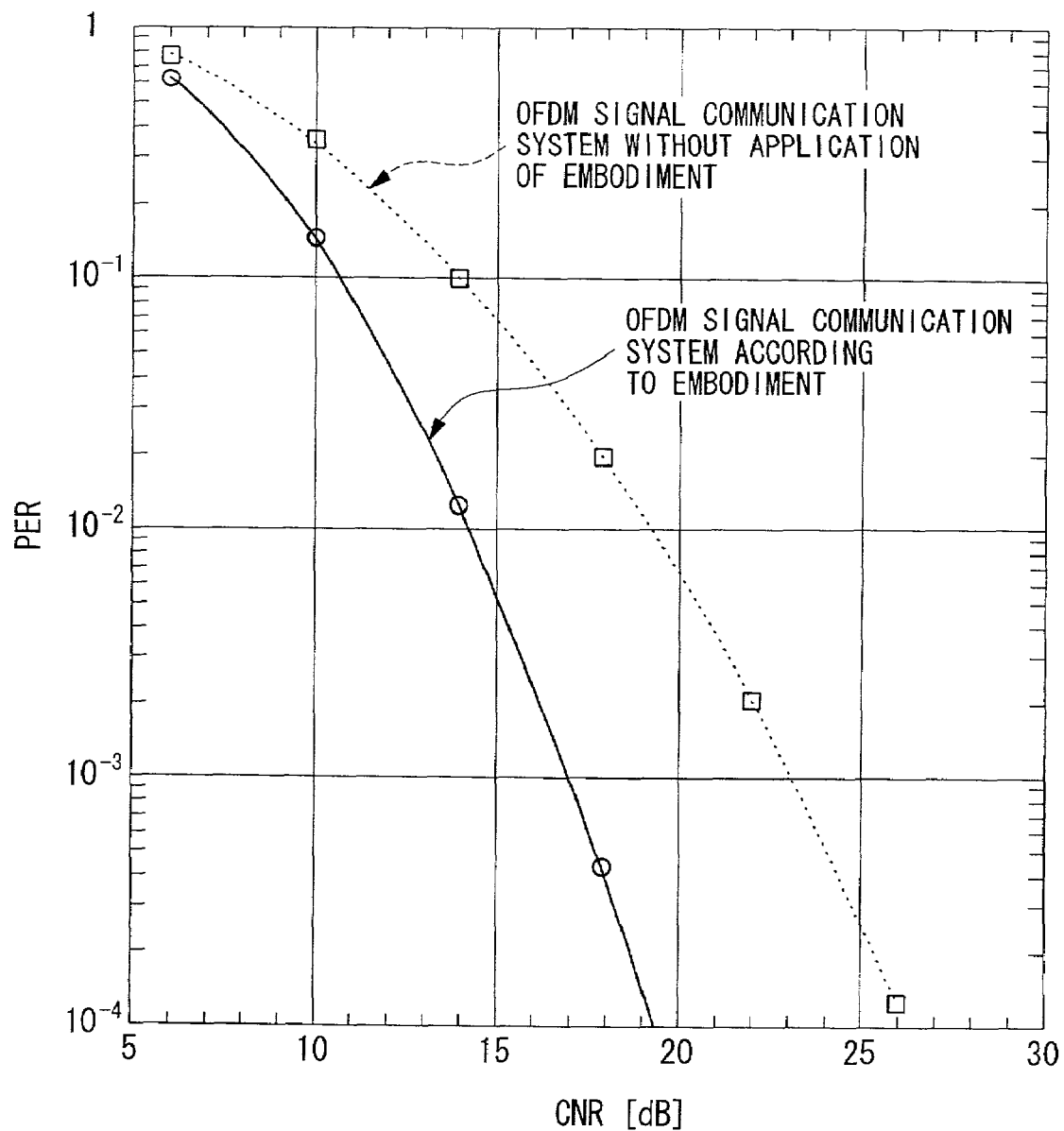
FIG. 29 is a diagram showing results from computer simulation of a packet error rate performance in the fifteenth embodiment.

FIG. 29 shows performance evaluation by computer simulation of the embodiment using the OFDM signals shown in FIG. 26. The simulation parameters are shown in FIG. 30. It is evident that the Packet Error Rate (PER) performance of the present embodiment, which averages the carrier frequency error estimation values, improves by approximately 5 dBs compared with a case where it is supposed that carrier frequency error estimation values are used individually in each antenna system.

In the present embodiment, in an OFDM signal communication system using MIMO channels, by averaging carrier frequency error estimation values obtained for each antenna system, it is possible to improve the accuracy of carrier frequency error of each antenna system, and it is possible to eliminate differences in carrier frequency between antenna systems. As a result, it is possible to improve the accuracy of estimation of the inverse of the propagation coefficient matrix, being an interference cancellation computation after carrier frequency error estimation, thus realizing high quality communication. Therefore, its effect is significant.

Sixteenth Embodiment

The present embodiment is an OFDM signal communication system that improves transmission quality by diversity combining.

In the above described thirteenth and the fourteenth embodiments, amplitude information at the time of reception is reproduced by multiplying the output value of the interference canceller by a coefficient (here, designated amplitude information coefficient) proportional to the square root of the signal-to-noise power ratio of the output value. By this operation, since the original received signal amplitude information is also maintained in interference cancelled signals, a soft decision error correction decoder in a later stage can realize maximum error correction capability, and error rate performance is improved. Furthermore, since the amplitude information coefficient can be obtained by using parameters obtained from a process of obtaining an inverse propagation matrix, which is multiplied by a signal that is not subjected to interference cancellation by the interference canceller is performed in the interference canceller, there is an advantage that it is not necessary to obtain the signal-to-noise power ratio of received signals directly.

Hereunder, a case is firstly examined wherein diversity combining is used in the OFDM signal communication system using MIMO channels in the thirteenth and fourteenth embodiments described above. In the case where diversity combining is performed in the OFDM signal transmitting device, a method disclosed in, for example, Japanese Unexamined Patent Application, First Publication No. 2000-332723 can be considered. In this publication, in an OFDM signal receiving device, the signal power-to-noise power ratio generated from the signal of each branch is measured for each subcarrier, and after each of the branches is weighted (here, the coefficient for weighting is designated a diversity coefficient) after detection, they are summed, and thus maximum ratio combining diversity is realized (that is, weighting for combining received signals such that a signal-to-noise ratio of the received signals is a maximum in order to obtain the best signal from among the signals received from a plurality of antennas).

Figure 31:
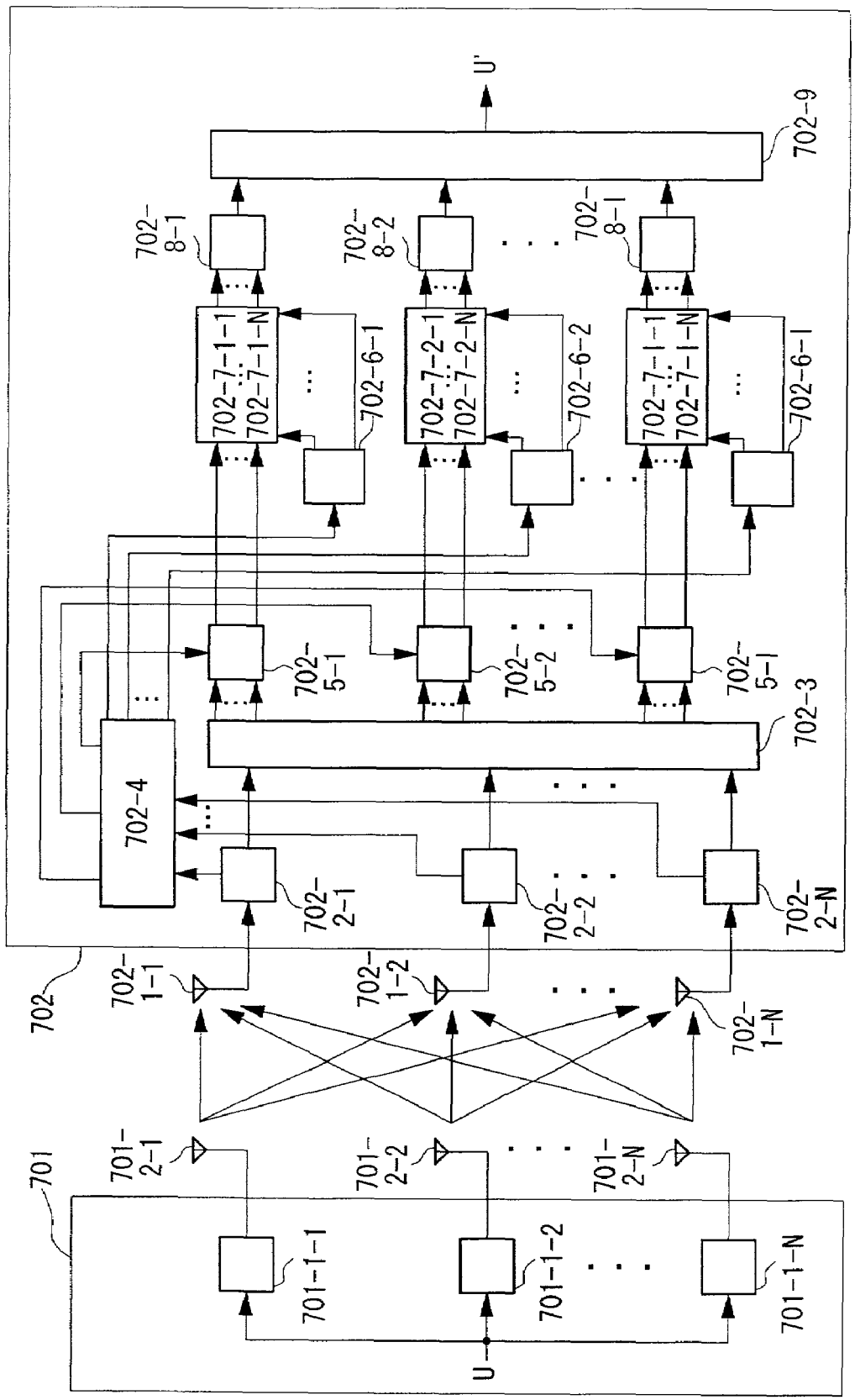
FIG. 31 is a block diagram showing the construction of an OFDM signal communication system in a case where a maximum ratio combining diversity is applied to the thirteenth embodiment or the fourteenth embodiment.

If the maximum ratio combining diversity technique shown in the above-described publication and the OFDM signal transmission method shown in the thirteenth and the fourteenth embodiments are combined, a construction of an OFDM signal communication system becomes, for example, as shown in FIG. 31.

The OFDM signal communication system shown in FIG. 31 comprises an OFDM signal transmitting device 701 and an OFDM signal receiving device 702. Here, similarly to the previous embodiments, the OFDM signal transmitting device 701 is provided with data converters, pilot signal generators, combiners, symbol timing generators, transmission frequency converters, transmission local oscillators and the like. The OFDM signal receiving device 702 is provided with receiving frequency converters, local oscillator for receivers, timing signal generators and the like. However, these system components are omitted from the diagram in FIG. 31.

The OFDM signal transmitting device 701 comprises N (N is an integer of two or more) inverse fast Fourier transformers 701-1-1 to 701-1-N, to which the same OFDM signals are input, and N transmitting antennas 701-2-1 to 701-2-N.

At the other side, the OFDM signal receiving device 702 comprises: N receiving antennas 702-1-1 to 702-1-N, N fast Fourier transformers 702-2-1 to 702-2-N, a sub data signal composer 702-3 for converting the outputs from the fast Fourier transformers 702-2-1 to 702-2-N into systems for each subcarrier, a subcarrier propagation coefficient inverse matrix computer 702-4 for computing the propagation coefficient inverse matrix for each subcarrier from the outputs of the fast Fourier transformers 702-2-1 to 702-2-N, I subcarrier interference cancellers 702-5-1 to 702-5-I for multiplying the outputs of I systems from the subcarrier data signal composer 702-3 by I propagation inverse matrices obtained by the subcarrier propagation coefficient inverse matrix computer 702-4, I amplitude information coefficient computers 702-6-1 to 702-6-I for computing N amplitude information coefficients for each of the elements of a propagation coefficient inverse matrix obtained by the subcarrier propagation coefficient inverse matrix computer 702-4, N×I amplitude information coefficient multipliers 702-7-1-1 to 702-7-1-N, 702 2-1 to 702-7-2-N, 702-7-I-1 to 702-7-I-N for multiplying the output signal systems the subcarrier interference cancellers 702-5-1 to 702-5-I by the amplitude information coefficients obtained by the amplitude information coefficient computers 702-6-1 to 702-6-I, I maximum ratio combiners 702-8-1 to 702-8-I for performing maximum ratio combining diversity for N branches from the outputs from the amplitude information coefficient multipliers 702-7-1-1 to 702-7-1-N, 702-7-2-1 to 702-7-2-N, . . . 702-7-I-1 to 702-7-I-N, and a symbol data converter 702-9 for converting the outputs from the maximum ratio combiners 702-8-1 to 702-8-I into systems for each symbol, and outputting an OFDM signal.

Figure 32:
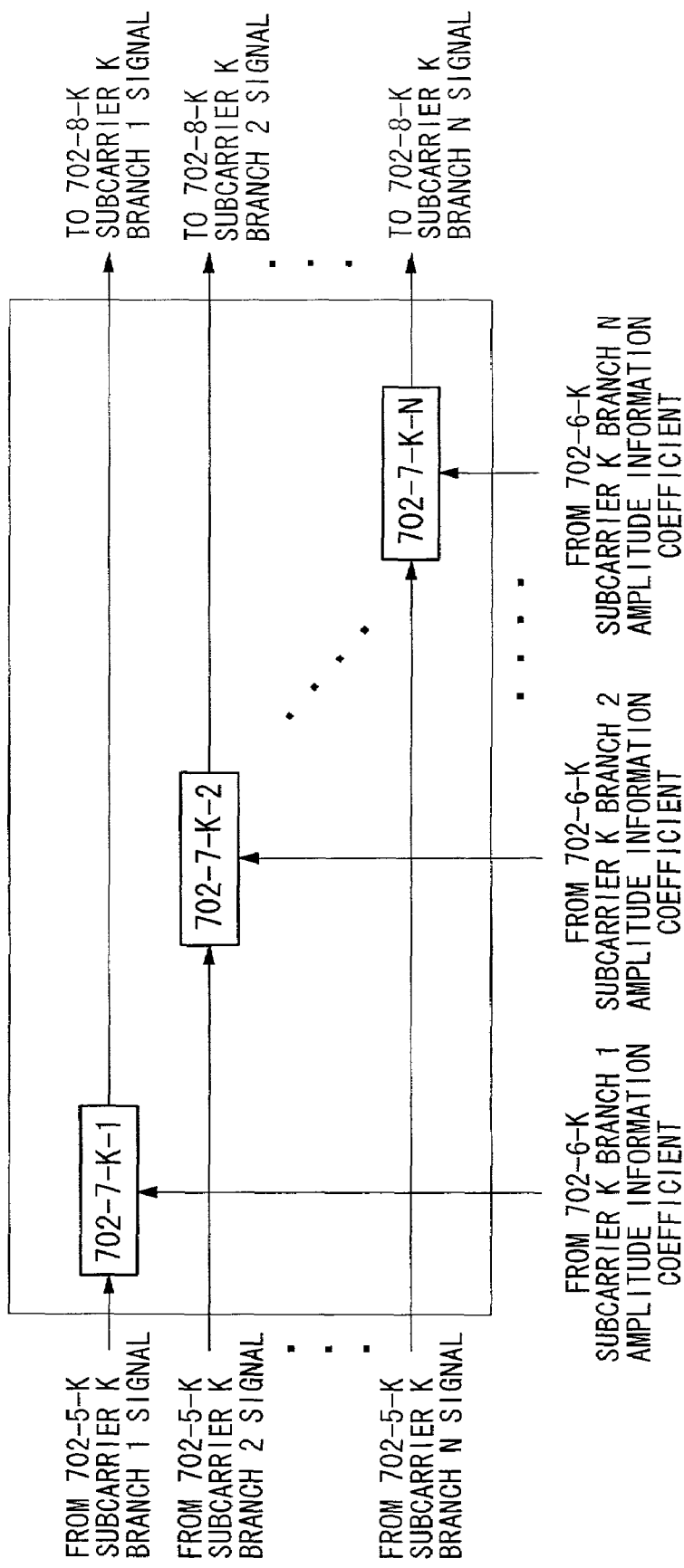
FIG. 32 is a block diagram showing a detailed construction of an amplitude information coefficient multiplier shown in FIG. 31.

FIG. 32 shows the detail of the amplitude information coefficient multipliers 702-7-1-1 to 702-7-1-N, 702-7-2-1 to 702-7-2-N, . . . 702-7-I-1 to 702-7-I-N.

Figure 33:
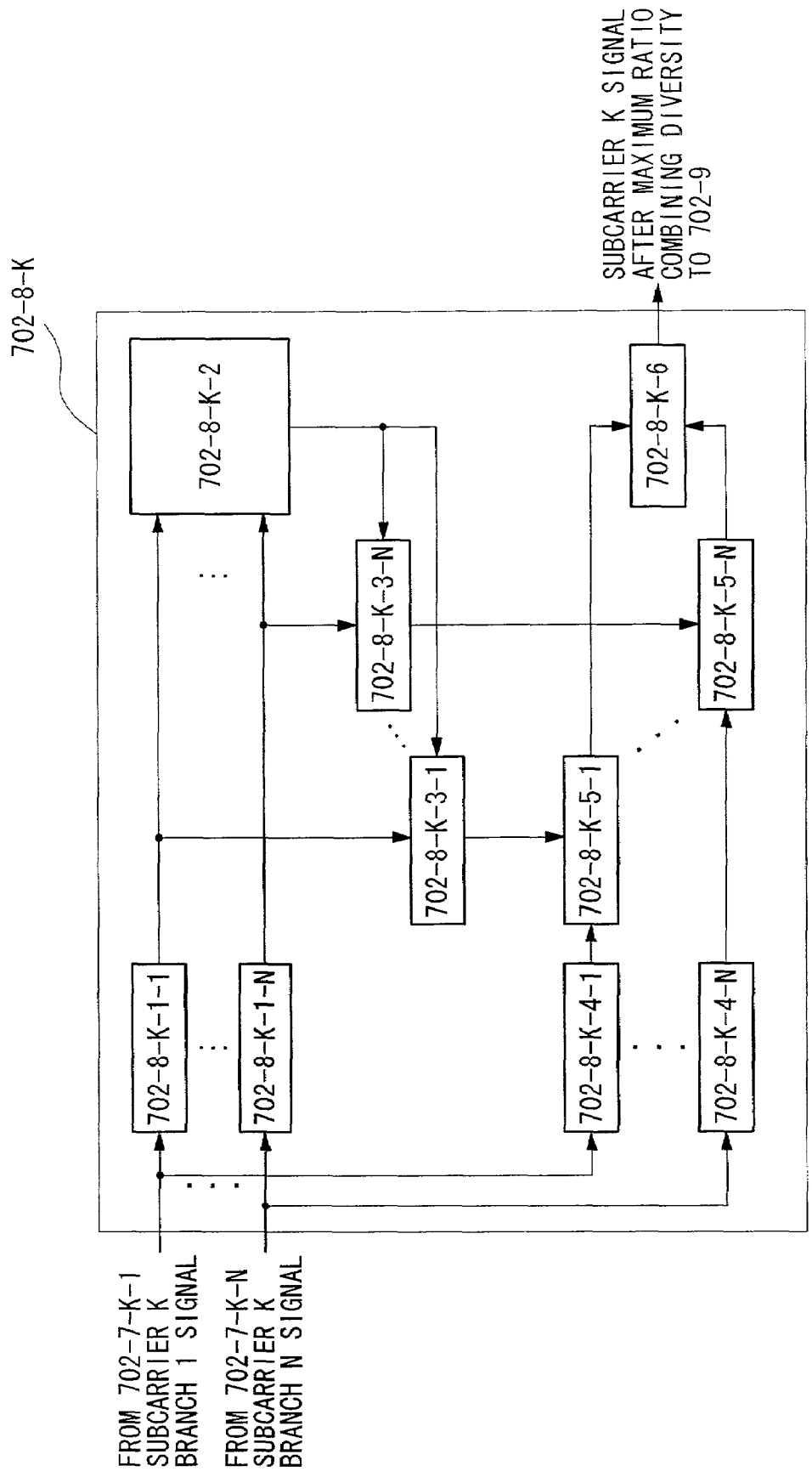
FIG. 33 is a block diagram showing a detailed construction of a maximum ratio combiner shown in FIG. 31.

A maximum ratio combiner 702-8-K ($1 \leq K \leq I$) shown in FIG. 31 comprises, as shown in FIG. 33: envelope generators 702-8-K-1-1 to 702-8-K-1-N for computing the signal-to-noise power ratio of output signals from amplitude information coefficient multipliers 702-7-K-1 to 702-7-K-N; an adder 702-8-K-2 for summing output values from the envelope generators 702-8-K-1-1 to 702-8-K-1-N; dividers 702-8-K-3-1 to 702-8-K-3-N for computing diversity coefficients using the output values from the envelope generators 702-8-K-1-1 to 702-8-K-1-N as dividends and the output value from the adder 702-8-K-2 as the divisor; detectors 702-8-K-4-1 to 702-8-K-4-N for detecting the output signals from the amplitude information coefficient multipliers 702-7-K-1 to 702-7-K-N; diversity coefficient multipliers 702-8-K-5-1 to 702-8-K-5-N for multiplying the output signals from the detectors 702-8-K-4-1 to 702-8-K-4-N by the output values from the dividers 702-8-K-3-1 to 702-8-K-3-N; and an adder 702-8-K-6 for summing the output values from the diversity coefficient multipliers 702-8-K-5-1 to 702-8-K-5-N.

In the above combination, the same data signal is transmitted in all of the N branches, an inverse matrix $(S^i)^{-1}$ (this is designated the propagation coefficient inverse matrix) of an N×N matrix (this is designated the propagation matrix) $S^i$, with propagation coefficients corresponding to the combination of transmitting and receiving antennas for each subcarrier i ($1 \leq i \leq I$) of each branch as components, is computed by a subcarrier propagation coefficient inverse matrix computer 702-4, and a subcarrier interference canceller 702-5-i cancels mutual interference by multiplying the components of the subcarrier i in the data signal of N symbols received by inverse matrix $(S^i)^{-1}$ and separates the transmitted data signal. Furthermore, an amplitude information coefficient proportional to the square root of the signal-to-noise power ratio for example, of each data signal is computed by an amplitude information coefficient computer 702-6-i, and the amplitude information coefficient is multiplied by the output from the subcarrier interference canceller 702-5-i by amplitude information coefficient multipliers 702-7-i-1 to 702-7-i-N, thus noise amplitude is equalized, so that the amplitude of the data signal is restored to the original received signal amplitude. Then, in the maximum ratio combiners 702-8-1 to 702-8-I, maximum ratio combining diversity of N branch outputs is performed for each subcarrier. After maximum ratio combining diversity, the likelihood is computed by the symbol data signal converter 702-9, and soft decision forward error correction is performed based on this likelihood information to restore the transmitted signal.

Operating in this manner, it is possible to perform maximum ratio combining diversity of N branches, and hence error rate performance can be improved compared with an OFDM signal communication system without this technique.

However, in the above-described combination, since envelope generators are installed to measure signal-to-noise power ratio in order to perform maximum ratio combining diversity, the size of the device becomes large.

Figure 34:
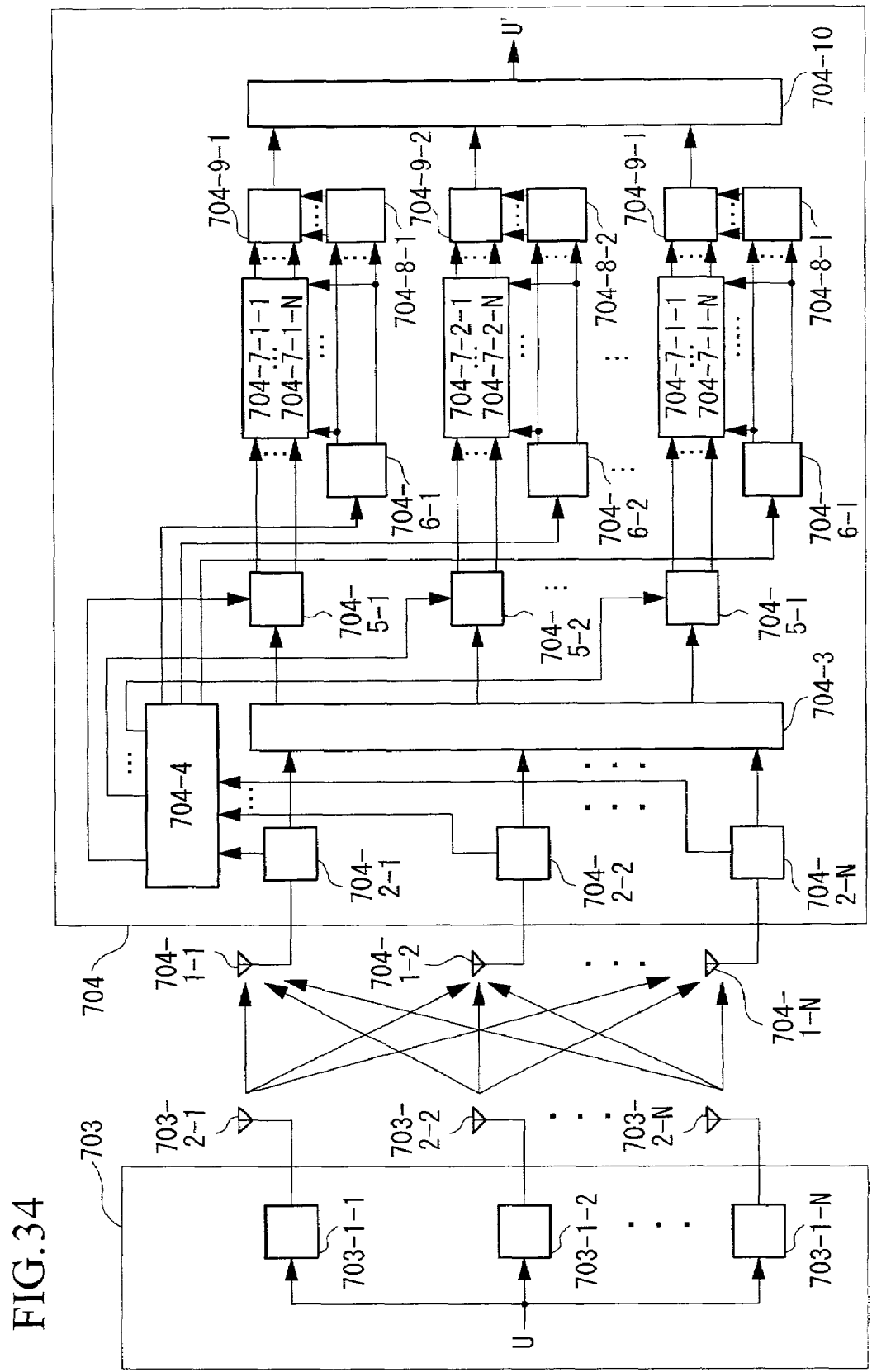
FIG. 34 is a block diagram showing the construction of an OFDM signal communication system in a sixteenth embodiment.

Therefore in the present embodiment, an OFDM signal communication system is constructed as follows. FIG. 34 shows the construction of an OFDM signal communication system according to the present embodiment. The OFDM signal communication system in the present embodiment comprises an OFDM signal transmitting device 703 and an OFDM signal receiving device 704 as shown in FIG. 34.

Similarly to the OFDM signal transmitting device 701, the OFDM signal transmitting device 703 comprises N inverse fast Fourier transformers 703-1-1 to 703-1-N and N transmitting antennas 703-2-1 to 703-2-N. Here, similarly to the previous embodiments, data converters, pilot signal generators, combiners, symbol timing generators, transmission local oscillators, transmission frequency converters, and the like are provided. However, these system components are omitted from the diagram in FIG. 34.

The OFDM signal receiving device 704 comprises: N receiving antennas 704-1-1 to 704-1-N, N fast Fourier transformers 704-2-1 to 704-2-N; a subcarrier data composer 704-3 for converting the outputs from the fast Fourier transformers 704-2-1 to 704-2-N into systems for each subcarrier; a subcarrier propagation coefficient inverse matrix computer 704-4 for estimating the propagation matrix for each subcarrier for all combinations of transmit based on the outputs from the fast Fourier transformers 704-2-1 to 704-2-N and receiving antennas and computing the inverse matrix thereof; I subcarrier interference cancellers 704-5-1 to 704-5-I for multiplying the outputs of I systems from the subcarrier data composer 704-3 by the outputs of I systems from the subcarrier propagation coefficient inverse matrix computer 704-4; I amplitude information coefficient computers 704-6-1 to 704-6-I for computing amplitude information coefficients from the output from the subcarrier propagation coefficient inverse matrix computer 704-4; N×I amplitude information coefficient multipliers 704-7-1-1 to 704-7-1-N, 704-7-2-1 to 704-7-2-N, . . . 704-7-I-1 to 704-7-I-N for multiplying the output signal systems of I subcarrier interference cancellers 704-5-1 to 704-5-I by the amplitude information coefficients computed by the amplitude information coefficient computers 704-6-1 to 704-6-I; I diversity coefficient computers 704-8-1 to 704-8-I for computing diversity coefficients for each branch from the amplitude information coefficients obtained from the amplitude information coefficient computers 704-6-1 to 704-6-I; I diversity combiners 704-9-1 to 704-9-I for detecting each of the outputs from the amplitude information coefficient multipliers 704-7-1-1 to 704-7-1-N, 704-7-2-1 to 704-7-2-N, . . . , 704-7-I-1 to 704-7-I-N, and performing weighted combining in proportion to the diversity coefficients of each branch obtained by the diversity coefficient computers 704-8-1 to 704-8-I on the signals of each branch after detecting processing; and a symbol data converter 704-10 for converting the outputs from the diversity combiners 704-9-1 to 704-9-I into systems for each symbol. Here, similarly to the previous embodiments, receiving frequency converters, receiving local oscillators, timing signal generators, and the like are provided. However, these system components are omitted from the diagram in FIG. 34.

Figure 35:
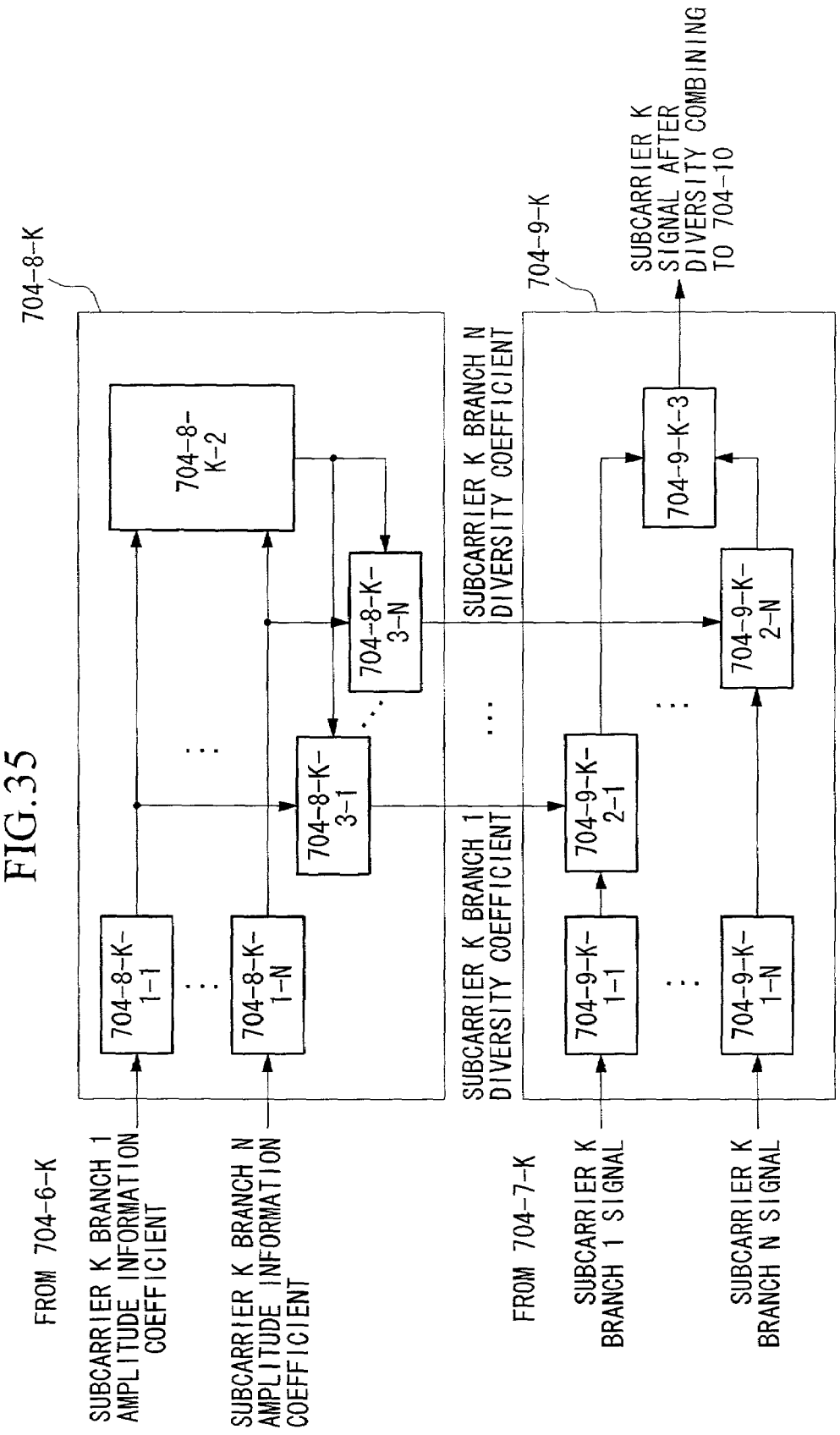
FIG. 35 is a block diagram showing the construction of a diversity coefficient computer and a diversity combiner shown in FIG. 34.

Furthermore, a diversity coefficient computer 704-8-K ($1 \leq K \leq I$) shown in FIG. 34 comprises, as shown in FIG. 35: square computers 704-8-K-1-1 to 704-8-K-1-N for squaring the output values for each branch from the amplitude information coefficient computer 704-6-K; an adder 704-8-K-2 for summing the output values from the square computers 704-8-K-1-1 to 704-8-K-1-N; and dividers 704-8-K-3-1 to 704-8-K-3-N for computing diversity coefficients using the output values from the square computers 704-8-K-1-1 to 704-8-K-1-N as the dividends, and the output values from the adder 704-8-K-2 as the divisors.

Similarly, a diversity combiner 704-9-K ($1 \leq K \leq I$) shown in FIG. 34 comprises, as shown in FIG. 35: detectors 704-9-K-1-1 to 704-9-K-1-N; diversity coefficient multipliers 704-9-K-2-1 to 704-9-K-2-N for multiplying output values from the detectors 704-9-K-1-1 to 704-9-K-1-N by output values from the diversity coefficient computer 704-8-K for each branch; and an adder 704-9-K-3 for summing the output values of the diversity coefficient multipliers 704-9-K-2-1 to 704-9-K-2-N.

The inverse matrix $(S^i)^{-1}$ of an N×N matrix $S^i$, with propagation coefficients for the combination of transmitting and receiving antennas for each subcarrier i as components, is computed by a subcarrier propagation coefficient inverse matrix computer 704-4, and subcarrier interference cancellers 704-5-1 to 704-5-I cancel mutual interference by multiplying the components of the subcarrier i in the data signal of N symbols received by inverse matrix $(S^i)^{-1}$ and separating the transmitted data signal. In the OFDM signal communication system of the present embodiment, since amplitude information of this separated data signal is lost, then amplitude information coefficients contained in the received signal are calculated by the amplitude information coefficient computers 704-6-1 to 704-6-I from the output of I systems of the subcarrier propagation coefficient inverse matrix computer 704-4. Furthermore, in order to perform diversity combining of the output value of each branch in each subcarrier, diversity coefficients proportional to the squares of the amplitude information coefficients output from the amplitude information coefficient computers 704-6-1 to 704-6-I are computed in the diversity coefficient computers 704-8-1 to 704-8-I, and combining is performed after weighting the output values of all branches in proportion to the diversity coefficients, after completing detection after amplitude information coefficient multiplication.

Here, many options can be considered for obtaining amplitude information coefficients $W^i_1, W^i_2, \ldots, W^i_N$ using the amplitude information coefficient computers 704-6-1 to 704-6-I. However, similarly to the thirteenth embodiment, the most noise tolerant and easiest to use signal-to-noise power ratio (SNR) of the received signals is used in order to compute diversity coefficients $W^i_{SD1}, W^i_{SD2}, \ldots, W^i_{SDN}$. The detail of the amplitude information coefficient computation is the same as the detail of the weighting factor computation in the thirteenth embodiment described with reference to equation (22) to equation (28), and the weighting factors $W^i_1, W^i_2, \ldots, W^i_N$ in the description may be read as amplitude information coefficients $W^i_1, W^i_2, \ldots, W^i_N$.

In the present embodiment, the diversity coefficients $W^i_{SD1}, W^i_{SD2}, \ldots, W^i_{SDN}$ to be computed by the diversity coefficient computers 704-8-i are represented by the following equation using the amplitude information coefficients $W^i_1, W^i_2, W^i_N$ represented by the equation (28) described above.

$$w^i_{SDj} = \frac{(w^i_j)^2}{\sum_{j=1}^{N} (w^i_j)^2} \tag{29}$$

Since the amplitude information coefficients $W^i_1, W^i_2, \ldots, W^1_N$ are proportional to the square root of the SNR of each subcarrier, the diversity coefficients $W^i_{SD1}, W^i_{SD2}, \ldots, W^i_{SDN}$ are proportional to the SNR of each subcarrier. Accordingly, the output from the diversity combiner 704-9-i that is weighted and combined using the diversity coefficient is considered equivalent to the case where weighted companions is performed using the signal-to-noise power ratio, so that it is possible to obtain characteristics equivalent to the output in the case where maximum ratio combining diversity is performed.

In the above description, the diversity coefficients $W^i_{SD1}$, $W^1_{SD2}$, ..., $W^i_{SDN}$ are obtained from the amplitude information coefficients $W^i_1$, $W^i_2$, ... $W^i_N$. However, since the amplitude information coefficients $W^i_1$, $W^1_2$, ... $W^1_N$ can be obtained from each element of a propagation coefficient inverse matrix computed by the subcarrier propagation coefficient inverse matrix computer 704-4, the diversity coefficients $W^i_{SD1}$, $W^i_{SD2}$, ... $W^i_{SDN}$ can also be obtained directly using the elements of the propagation coefficient inverse matrix.

An experimental example of the present embodiment is shown as follows. The parameters of the experimental example are as follows.

Channel multiplicity (number of antennas=N): 2 (two for both transmission and reception)

Transmission speed: 54 Mbps/channel

Number of subcarriers (=I): 48/channel

Subcarrier modulation method: 64 QAM

Forward error correction method: coding rate 3/4, convolutional coding of constraint length 7/Viterbi decoding Fading: 18-ray Rayleigh fading (rns delay spread 32 50[ns], maximum Doppler frequency=50 Hz)

Amplitude information coefficient: implemented with the value for K as K=1 in the equation (28)

Figure 36:
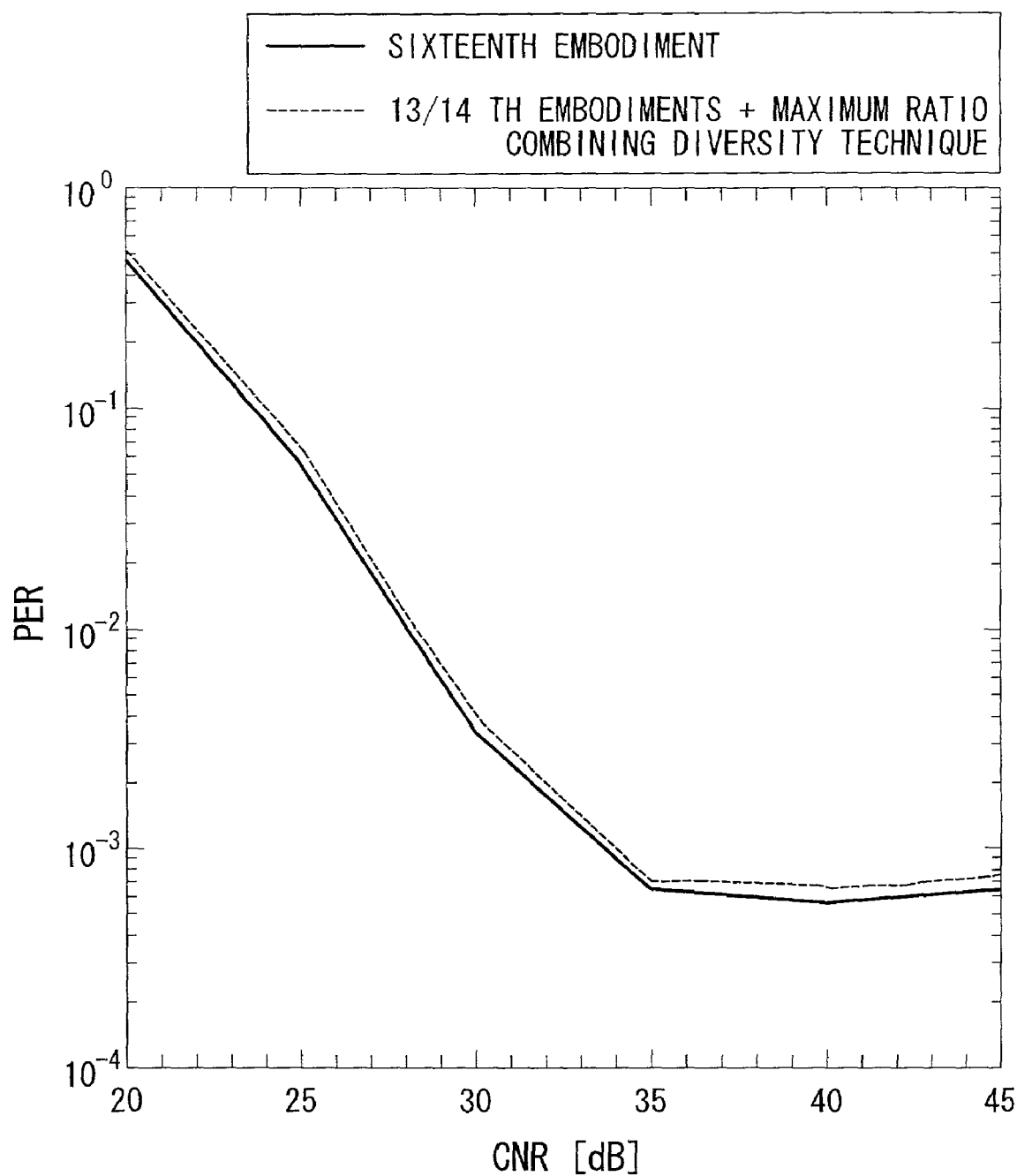
FIG. 36 is a diagram showing a test example for the sixteenth embodiment, and a test example for the construction shown in FIG. 31.
Figure 37:
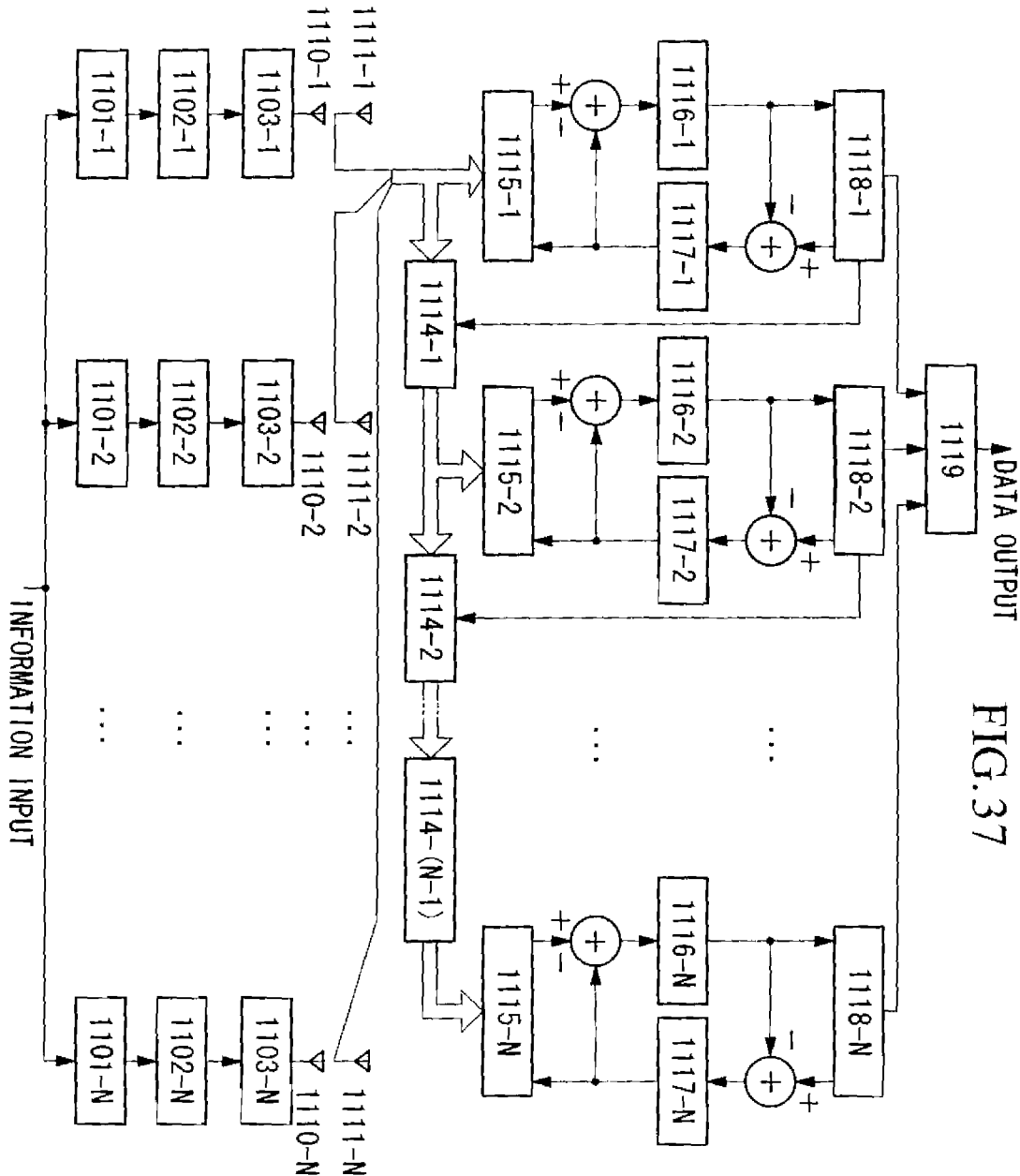
FIG. 37 is a block diagram showing a configuration example of a conventional transmitting-receiving device for a MIMO channel.

FIG. 36 shows packet error rate (PER) performance of the construction in FIG. 34 resulting from the experimental example in the present embodiment, and shows packet error rate (PER) performance of the construction in FIG. 31 in which a maximum ratio combining diversity technique is applied in the thirteenth and fourteenth embodiments as a comparison. It shows little difference between these PER performance and the PER performance in the construction shown in FIG. 31 obtained according to the present embodiment.

As described above, in the present embodiment, values proportional to the squares of the amplitude information coefficients, computed in order to reproduce the reception amplitude information of the output from the subcarrier interference canceller, are replaced with diversity coefficients obtained by computation using the amplitude information coefficients, and combining is performed after weighting the signals of each branch after amplitude information coefficient multiplication in proportion to the diversity coefficients, and thereby it is possible to obtain a diversity effect. In the case where an amplitude information coefficient proportional to the square root of signal-to-noise power ratio is used, since a value proportional to the square of the amplitude information coefficient is proportional to the signal-to-noise power ratio, it is possible to obtain an equivalent effect to maximum ratio combining diversity. Furthermore, in the present embodiment, since the amplitude information coefficients used to compute the diversity coefficients can be obtained by computation using parameters obtained in the process of computing the propagation coefficient inverse matrix, it is not necessary to measure the signal-to-noise power ratio by using envelope generators. Therefore, it is possible to avoid increasing equipment size.

What is claimed is:

1. An OFDM signal communication system comprising:
an OFDM signal transmitting device which includes a plurality of N transmitting antennas, for transmitting OFDM signals over the same radio frequency from the transmitting antennas;
an OFDM signal receiving device which includes N receiving antennas for receiving signals transmitted from the N transmitting antennas;
an inverse matrix computer for computing each of inverse matrices of N-dimensional square matrices for each subcarrier constituted by the propagation coefficients for the respective propagation paths between the respective transmitting antennas and the respective receiving antennas; and
an interference canceller for canceling interference components which occur between the OFDM signal transmitting device and the OFDM signal receiving device, based on the inverse matrix computed by the inverse matrix computer,
wherein the inverse matrix computer and the interference canceller are provided in the OFDM signal receiving device, and
the OFDM signal transmitting device further comprises:
OFDM modulators connected to the transmitting antennas, which operate based on transmission symbol timing;
an OFDM symbol timing generator for transmitter for supplying common OFDM symbol timing to all of the OFDM modulators as the transmission symbol timing;
transmission frequency converters for converting the frequency band of outputs from the OFDM modulators into radio frequency in accordance with a common local oscillator frequency, and outputting to the transmitting antennas;
a transmission local oscillator for supplying the common local oscillator frequency to all of the transmission frequency converters;
a pilot signal generator for generating N kinds of pilot signals corresponding to the respective OFDM modulators; and
a combiner for combining transmission information signals of N systems and the pilot signals, and outputting to the OFDM modulators,
and the OFDM signal receiving device farther comprises:
receiving frequency converters connected to the receiving antennas, for frequency converting radio frequency of a received signal received by the receiving antennas, in accordance with the common local oscillator frequency, into a frequency suitable for demodulation;
a local oscillator for receiver for supplying the common local oscillator frequency to all of the receiving frequency converters;
fast Fourier transformers connected to the receiving frequency converters, for performing Fourier transformation processing on the outputs of the receiving frequency converters based on reception symbol timing; and
an OFDM symbol timing generator for receiver for supplying OFDM symbol timing to the fast Fourier transformers so as to receive the pilot signals by the receiving antennas, as the reception symbol timing common to all of the fast Fourier transformers,
and the interference canceller computes the product of the inverse matrix and the received OFDM signals for subcarriers output from the fast Fourier transformers, and outputs an amplitude and phase for each of the subcarriers corresponding to the OFDM signals transmitted from the OFDM signal transmitting device, and the inverse matrix computer, for all of the combinations of the transmitting antennas and the receiving antennas, measures the propagation coefficients by normalizing the reception amplitude and phase of the pilot signals with an amplitude and phase of known pilot signals, and calculates and stores the inverse matrix with respect to a propagation coefficient matrix related to respective subcarriers.

2. The OFDM signal communication system according to claim 1, wherein the OFDM signal transmitting device generates the pilot signals by means of the pilot signal generator with a timing mutually shifted so as not to overlap each other on the time domain, and sends these pilot signals to the OFDM signal receiving device, and the OFDM signal receiving device receives the respective pilot signals which have been sent shifted on the time domain and separates these pilot signals by means of the fast Fourier transformers.

3. The OFDM signal communication system according to claim 1, wherein the pilot signal generator of the OFDM signal transmitting device comprises:

a transmission subcarrier pilot matrix generator which, when the number of subcarriers is I, generates a transmission subcarrier pilot matrix with a pilot signal $P'^i_{mn}$ of an m th symbol, m being an integer greater than or equal to 1 and less than or equal to N, transmitted by an n th, n being an integer greater than or equal to 1 and less than or equal to N, transmitting antenna in the i th, i being an integer greater than or equal to 1 and less than or equal to I, subcarrier, as a component of the m th row and n th column, and for which the determinant does not become 0 and which is a matrix other than a unit matrix and the matrix obtained by multiplying a complex number by the unit matrix; and a transmission pilot signal composer which outputs to the combiner, the components of the m th row and n th column obtained from all of the transmission subcarrier pilot matrix $P^i$ of the i th subcarrier output from the transmission subcarrier pilot matrix generator as transmitted pilot signal components $p^1_{mn}, p^2_{mn}, \ldots, p^i_{mn}$ of the m th symbol of the n th antenna, and the inverse matrix computer of the OFDM signal receiving device comprises:

a receiving subcarrier pilot matrix composer which generates a receiving subcarrier pilot matrix $PR^i$ of N rows and N columns with a received signal $r^1_{mn}$ of the m th symbol of the n th receiving antenna of the i th subcarrier output from the fast Fourier transformers as the component of the m th row and n th column, based on the pilot signals of N symbols received by the receiving antennas; and I subcarrier propagation coefficient inverse matrix computers for computing an N-dimensional square matrix for the i th subcarrier constituted by the propagation coefficients for the respective propagation paths between the respective transmitting antennas and the respective receiving antennas, by multiplying the receiving subcarrier pilot matrix $PR^1$ by the inverse matrix of the transmission subcarrier pilot matrix $P^1$, and then calculating the inverse matrix -of the N-dimensional square matrix for the i th subcarrier.

4. The OFDM signal communication system according to claim 1, wherein the OFDM signal receiving device further comprises:

N carrier frequency error estimators for estimating a frequency error between the transmission local oscillator and the local oscillator for receiver based on the outputs from the receiving frequency converters, and outputting a carrier frequency error estimation value;

an averaging circuit of carrier frequency error estimation value for calculating and outputting an average value of the carrier frequency error estimation value output from the N carrier frequency error estimators; and N carrier frequency error correctors for correcting the carrier frequency errors of the respective outputs of the receiving frequency converters, based on the average value output from the averaging circuit of carrier frequency error estimation value.

5. The OFDM signal communication system according to claim 4, wherein the pilot signal generator repetitively transmits a carrier frequency error estimation pilot signal, and each of the carrier frequency error estimators comprises:

N delay circuits for delaying the outputs of the receiving frequency converters by the same time as the repetition interval of the carrier frequency error estimation pilot signal;

N complex conjugate circuits for calculating the complex conjugates of the outputs of the N delay circuits;

N complex multipliers for multiplying the outputs from the receiving frequency converters by the outputs from the complex conjugate circuits;

N integrating circuits for computing the sum of the outputs of the complex multipliers for a number of samples corresponding to the repetition interval of the carrier frequency error estimation pilot signal;

an averaging circuit for computing the average value of the output from the N integrating circuits;

an arc-tangent circuit for computing a phase variation proportional to the carrier frequency error, using the output from the averaging circuit; and a phase converting circuit for converting the output of the arc-tangent circuit to a carrier frequency error per one sampling time.

6. The OFDM signal communication system according to claim 4, wherein the pilot signal generator repetitively transmits a carrier frequency error estimation pilot signal, and each of the carrier frequency error estimators comprises:

N delay circuits for delaying the outputs of the receiving frequency converters by the same time as the repetition interval of the carrier frequency error estimation pilot signal;

N complex conjugate circuits for calculating the complex conjugates of the outputs of the N delay circuits;

N complex multipliers for multiplying the outputs from the receiving frequency converters by the outputs from the complex conjugate circuits;

N integrating circuits for computing the sums of the outputs of the complex multipliers for a number of samples corresponding to the repetition interval of the carrier frequency error estimation pilot signal;

an arc-tangent circuit for computing phase variations proportional to the carrier frequency errors, using the output from the N integrating circuits;

N phase converting circuits for converting the outputs of the arc-tangent circuit to the carrier frequency errors per one sampling time; and an averaging circuit for computing the average value of the output from the N phase converting circuits.

7. The OFDM signal communication system according to claim 1, wherein the OFDM signal transmitting device further comprises:
a forward error correction encoder for forward error correction encoding the transmission information signals; and
an interleaver which rearranges the output from the forward error correction encoder and outputs to the combiner, and
the OFDM signal receiving device further comprises:
a deinterleaver for performing a reverse operation to the interleaver on the outputs from the interference canceller;
a forward error correction decoder for decoding the output from the deinterleaver;
a weighting factor computer for obtaining weighting factors for the outputs of the interference canceller; and
a multiplier for multiplying the outputs of the interference canceller by the weighting factors obtained by the weighting factor computer.

8. The OFDM signal communication system according to claim 1, wherein
the OFDM signal transmitting device further comprises:
a forward error correction encoder for forward error correction encoding the transmission information signals;
an interleaver which rearranges the output from the forward error correction encoder and outputs to the combiner; and
a first switch for selecting to send signals obtained by serial-parallel conversion of the transmission information signals to the combiner, or to send the same transmission information signals to the combiner, and
the OFDM signal receiving device further comprises:
a deinterleaver for performing a reverse operation to the interleaver on the outputs from the interference canceller;
a forward error correction decoder for decoding the output from the deinterleaver;
a communication quality measurer for measuring the quality of the outputs from the interference canceller related to an arbitrary subcarrier of the transmitted OFDM signal transmitted from the OFDM signal transmitting device; and
a second switch for outputting the signals output from the interference canceller directly in the case where the OFDM signal transmitting device transmits a signal for which the transmission information signals have been serial-parallel convened, and adding the outputs of the interference canceller or, outputting the one with the larger reception power of the interference canceller outputs in the case where the OFDM signal transmitting device sends the same transmission information signals, and
the first switch selects in accordance with the measurement result from the communication quality measurer.

9. The OFDM signal communication system according to claim 8 wherein
the OFDM signal receiving device further comprises:
an amplitude information coefficient computer for computing amplitude information coefficients used for reproducing the amplitudes of the received signals at the receiving antennas, from elements of the inverse matrix obtained by the inverse matrix computer;
an amplitude information coefficient multiplier for multiplying respective outputs from the interference canceller by the amplitude information coefficients obtained by the amplitude information coefficient computer;
a diversity coefficient computer for computing diversity coefficients used in weighting for diversity combining, from elements of the inverse matrix obtained by the inverse matrix computers or from the amplitude information coefficients computed by the amplitude information coefficient computer;
a diversity coefficient multiplier for multiplying the output signals of the amplitude information coefficient multiplier by the diversity coefficients computed by the diversity coefficient computer; and
an adder for adding the output signals of the diversity coefficient multiplier to output the OFDM signals.

10. An OFDM signal communication system comprising:
an OFDM signal transmitting device which includes a plurality of N transmitting antennas, for transmitting OFDM signals over the same radio frequency from the transmitting antennas;
an OFDM signal receiving device which includes N receiving antennas for receiving signals transmitted from the N transmitting antennas;
an inverse matrix computer for computing each of inverse matrices of N-dimensional square matrices for each subcarrier constituted by the propagation coefficients for the respective propagation paths between the respective transmitting antennas and the respective receiving antennas; and
an interference canceller for canceling interference components which occur between the OFDM signal transmitting device and the OFDM signal receiving device, based on the inverse matrix computed by the inverse matrix computer,
wherein the interference canceller is provided in the OFDM signal transmitting device, and
the OFDM signal transmitting device comprises:
a data converter for converting each of the transmission information signals of N systems into OFDM symbols;
the interference canceller for multiplying respective subcarriers of respective OFDM symbols generated by the data converter, by the inverse matrix obtained by the inverse matrix computer;
an inverse fast Fourier transformer for performing inverse Fourier transformation on the outputs from the interference canceller; and
transmission frequency converters for converting the frequency band of the output from the inverse fast Fourier transformer to radio frequency, and
the OFDM signal receiving device further comprises:
receiving frequency converters for converting radio frequency of received signals received by the receiving antennas, into a frequency suitable for demodulation;
N fast Fourier transformers for performing Fourier transformation on respective received signals of N systems output from the receiving frequency converters; and
a demodulator for converting the OFDM symbols for each of the receiving antennas, output from the fast Fourier transformers into bit stream.

11. The OFDM signal communication system according to claim 10, wherein
the inverse matrix computer is provided on the OFDM signal receiving device, and
the OFDM signal receiving device further comprises an inverse matrix information transmitter for transmitting the inverse matrix obtained by the inverse matrix computer to the OFDM signal transmitting device, and the OFDM signal transmitting device further comprises an inverse matrix information receiver for receiving the inverse matrix sent from the OFDM signal receiving device, and the interference canceller multiplies respective subcarriers of the respective OFDM symbols generated by the data converter, by the inverse matrix received by the inverse matrix information receiver.

12. The OFDM signal communication system according to claim 10, wherein the inverse matrix computer is provided on the OFDM signal transmitting device, and the OFDM signal transmitting device further comprises:

a pilot signal generator for generating N kinds of pilot signals respectively corresponding to the transmitting antennas;

a combiner for combining the N kinds of pilot signals respectively with the N systems outputs from the interference canceller, and outputting to the inverse fast Fourier transformer; and a pilot information receiver for receiving reception information of the pilot signals sent from the OFDM signal receiving device, and the inverse matrix computer computes the inverse matrix based on reception information of the pilot signals received by the pilot information receiver, and the OFDM signal receiving device further comprises:

a pilot information transmitter for detecting the amplitude and phase of the received N pilot signals from the outputs of the fast Fourier transformers for each of the subcarriers, and transmitting the reception information of the pilot signals to the OFDM signal transmitting device.

13. An OFDM signal communication system comprising:

an OFDM signal transmitting device which includes a plurality of N transmitting antennas, for transmitting OFDM signals over the same radio frequency from the transmitting antennas;

an OFDM signal receiving device which includes N receiving antennas for receiving signals transmitted from the N transmitting antennas;

an inverse matrix computer for computing each of inverse matrices of N-dimensional square matrices for each subcarrier constituted by the propagation coefficients for the respective propagation paths between the respective transmitting antennas and the respective receiving antennas; and an interference canceller for canceling interference components which occur between the OFDM signal transmitting device and the OFDM signal receiving device based on the inverse matrix computed by the inverse matrix computer, wherein the receiving antennas are a first group of antennas further provided with a transmit function, the transmitting antennas are a second group of antennas further provided with a receive function, and the inverse matrix computer and the interference canceller are provided on the OFDM signal transmitting device, and the OFDM signal receiving device further comprises:

a pilot signal generator for generating N kinds of pilot signals respectively corresponding to the second group of antennas; a first group of inverse fast Fourier transformers for performing inverse fast Fourier transformation on the N kinds of pilot signals output from the pilot signal generator;

a first group of transmission frequency converters for conveying signals output from the first group of inverse fast Fourier transformers into radio frequency suitable for transmission;

a first group of receiving frequency converters for converting received signals of radio frequency received by the first group of antennas, into a frequency suitable for demodulation;

a first group of fast Fourier transformers for performing Fourier transformation on respective received signals of N systems output from the first group of receiving frequency converters;

N demodulators for converting OFDM symbols for each of the receiving antennas output from the first group of fast Fourier transformers, into a bit stream; and a first group of transmission/reception switches for switching the transmission of signals output from the first group of transmission frequency converters, and the reception of the received signals supplied to the first group of receiving frequency converters, for the first group of antennas, and the OFDM signal transmitting device comprises:

a second group of receiving frequency converters for converting radio frequency of the pilot signals sent from the OFDM signal receiving device and received by the second group of antennas, into a frequency suitable for demodulation;

a second group of fast Fourier transformers for performing Fourier transformation on the signals output from the second group of receiving frequency converters;

the inverse matrix computer for computing the inverse matrix based on signals extracted from the output of the second group of fast Fourier transformers;

N data converters for respectively converting the input transmission information signals of N systems into OFDM symbols;

the interference canceller for multiplying the respective subcarriers of the respective OFDM symbols generated by the data converters, by the inverse matrix obtained by the inverse matrix computer;

a second group of inverse fast Fourier transformers for performing inverse Fourier transformation on outputs from the interference canceller;

a second group of transmission frequency converters for converting the frequency band of signals output from the second group of inverse fast Fourier transformers, into radio frequency; and a second group of transmission/reception switches for switching the transmission of signals output from the second group of transmission frequency converters, and the reception of the received signals supplied to the second group of receiving frequency converters, for the second group of antennas.

14. An OFDM signal transmitting device used in an OFDM signal communication system for transmitting OFDM signals over the same radio frequency from the OFDM signal transmitting device comprising a plurality of N transmitting antennas to an OFDM signal receiving device comprising N receiving antennas, the OFDM signal transmitting device comprises at least a pilot signal generator among an interference canceller and the pilot signal generator, wherein the interference canceller cancels interference components which occur between the OFDM signal transmitting device and the OFDM signal receiving device, based on each of inverse matrices of N-dimensional square matrices which are computed for each subcarrier by an inverse matrix computer provided in the OFDM signal receiving device and which are constituted by the propagation coefficients for the respective propagation paths between the respective transmitting antennas and the respective receiving antennas, and the pilot signal generator generates N kinds of pilot signals for use by the inverse matrix computer to compute the inverse matrix, and wherein the OFDM signal transmitting device further comprises:

a combiner for combining transmission information signals of N systems and the pilot signals;

OFDM modulators connected to the combiner, which operate based on transmission symbol timing;

an OFDM symbol timing generator for transmitter for supplying common OFDM symbol timing to all of the OFDM modulators as the transmission symbol timing; and transmission frequency converters for converting the outputs of the OFDM modulators into radio frequency in accordance with a common local oscillator frequency and outputting to the transmitting antennas;

a transmission local oscillator for supplying the common local oscillator frequency to all of the transmission frequency converters, and the pilot signal generator generates corresponding to the respective OFDM modulators, pilot signals of the N kinds used by the inverse matrix computer for computing the inverse matrix related to respective subcarriers, by normalizing the reception amplitude and phase of the N kinds of pilot signals with the amplitude and phase of known pilot signals.

15. The OFDM signal transmitting device according to claim 14, wherein the pilot signal generator generates the pilot signals with a timing mutually shifted so as not to overlap each other on the time domain.

16. The OFDM signal transmitting device according to claim 14, wherein the pilot signal generator comprises:

a transmission subcarrier pilot matrix generator which, when the number of subcarriers is I, generates a transmission subcarrier pilot matrix with a pilot signal $P^i_{mn}$ of an m th symbol, m being an integer greater than or equal to 1 and less than or equal to N, transmitted by an n th, n being an integer greater than or equal to 1 and less than or equal to N, transmitting antenna in the i th, i being an integer greater than or equal to 1 and less than or equal to I, subcarrier, as a component of the m th row and n th column, and for which the determinant does not become 0 and which is a matrix other than a unit matrix and the matrix obtained by multiplying a complex number by the unit matrix; and a transmission pilot signal composer which outputs to the combiner, the components of the m th row and n th column obtained from all of the transmission subcarrier pilot matrix $P^i$ of the i th subcarrier output from the transmission subcarrier pilot matrix generator as transmission pilot signal components ($P^1_{mn}$, $P^2_{mn}$, ..., $P^I_{mn}$) of the m th symbol of the n th antenna.

17. The OFDM signal transmitting device according to claim 14, further comprising:

a forward error correction encoder for forward error correction encoding the transmission information signals;

an interleaver for rearranging output from the forward error correction encoder and outputting to the combiner; and a first switch for selecting to send a signal for where the transmission information signals have been serial-parallel converted to the combiner, or to send the same transmission information signals to the combiner, in accordance with quality measured by the OFDM signal receiving device for an arbitrary subcarrier of the OFDM signals transmitted towards the OFDM signal receiving device.

18. An OFDM signal transmitting device used in an OFDM signal communication system for transmitting OFDM signals over the same radio frequency from the OFDM signal transmitting device comprising a plurality of N transmitting antennas to an OFDM signal receiving device comprising N receiving antennas, the OFDM signal transmitting device comprises at least an interference canceller among an inverse matrix computer, the interference canceller, and a pilot signal generator, wherein the inverse matrix computer computes each of inverse matrices of N-dimensional square matrices for each subcarrier constituted by the propagation coefficients for the respective propagation paths between the respective transmitting antennas and the respective receiving antennas, and the interference canceller cancels interference components which occur between the OFDM signal transmitting device and the OFDM signal receiving device, based on the inverse matrix computed by the inverse matrix computer, and the pilot signal generator generates N kinds of pilot signals for use by the inverse matrix computer to compute the inverse matrix, and wherein the OFDM signal transmitting device further comprises:

a data converter for respectively converting the transmission information signals of N systems into OFDM symbols;

the interference canceller for multiplying the respective subcarriers of the respective OFDM symbols generated by the data converter, by the inverse matrix obtained by the inverse matrix computer;

inverse fast Fourier transformers for performing inverse Fourier transformation on the outputs from the interference canceller; and transmission frequency converters for converting the frequency band of the output from the inverse fast Fourier transformers, into radio frequency.

19. The OFDM signal transmitting device according to claim 18, further comprising an inverse matrix information receiver for receiving the inverse matrix output from the inverse matrix computer provided in the OFDM signal receiving device, and the interference canceller multiplies the respective subcarriers of the respective OFDM symbols generated by the data converter, by the inverse matrix received by the inverse matrix information receiver.

20. The OFDM signal transmitting device according to claim 18, comprising:

the inverse matrix computer;

the pilot signal generator;

a combiner for combining the N kinds of pilot signals respectively with N signals sequences output from the interference canceller, and outputting to the inverse fast Fourier transformers; and a pilot information receiver for receiving reception information of the pilot signals sent from the OFDM signal receiving device corresponding to the pilot signals sent to the OFDM signal receiving device, and the inverse matrix computer computes the inverse matrix based on reception information of the pilot signals received by the pilot information receiver.

21. An OFDM signal transmitting device used in an OFDM signal communication system for transmitting OFDM signals over the same radio frequency from the OFDM signal transmitting device comprising a plurality of N transmitting antennas to an OFDM signal receiving device comprising N receiving antennas, the OFDM signal transmitting device comprises at least an inverse matrix computer and an interference canceller among the inverse matrix computer, the interference canceller and a pilot signal generator, wherein the inverse matrix computer computes each of inverse matrices of N-dimensional square matrices for each subcarrier constituted by the propagation coefficients for the respective propagation paths between the respective transmitting antennas and the respective receiving antennas, and the interference canceller cancels interference components which occur between the OFDM signal transmitting device and the OFDM signal receiving device, based on the inverse matrix computed by the inverse matrix computer, and the pilot signal generator generates N kinds of pilot signals for use by the inverse matrix computer to compute the inverse matrix, and wherein the transmitting antennas are transmitting/receiving antennas further provided with a reception function, the OFDM signal transmitting device further comprises:

receiving frequency converters for converting the N kinds of pilot signals received by the transmitting/receiving antennas sent from the OFDM signal receiving device respectively corresponding to the transmitting/receiving antennas, to a frequency suitable for demodulation;

fast Fourier transformers for performing Fourier transformation on signals output from the receiving frequency converters;

the inverse matrix computer for computing the inverse matrix based on signals extracted from the output of the fast Fourier transformers;

N data converters for converting input transmission information signals of N systems into OFDM symbols;

the interference canceller for multiplying respective subcarriers of respective OFDM symbols which are generated by the data converter, by the inverse matrix which is obtained by the inverse matrix computer;

an inverse fast Fourier transformer for performing inverse Fourier transformation on signals outputs from the interference canceller;

transmission frequency converters for converting the frequency band of signals output from the inverse fast Fourier transformer in radio frequency; and a transmission/reception switch for selecting the transmitting/receiving antennas to transmit signals output from the transmission frequency converters, or to receive the pilot signals supplied to the receiving frequency converters.

22. An OFDM signal receiving device used in an OFDM signal communication system for transmitting OFDM signals over the same radio frequency from an OFDM signal transmitting device comprising a plurality of N transmitting antennas to the OFDM signal receiving device comprising N receiving antennas, the OFDM signal receiving device comprises at least an inverse matrix computer and an interference canceller among the inverse matrix computer, the interference canceller and a pilot signal generator, wherein the inverse matrix computer computes each of inverse matrices of N-dimensional square matrices for each subcarrier constituted by the propagation coefficients for the respective propagation paths between the respective transmitting antennas and the respective receiving antennas, and the interference canceller cancels interference components which occur between the OFDM signal transmitting device and the OFDM signal receiving device, based on the inverse matrix computed by the inverse matrix computer, and the pilot signal generator generates a pilot signal of N kinds for use by the inverse matrix computer to compute the inverse matrix, and wherein the OFDM signal receiving deice further comprises:

receiving frequency converters connected to each of the receiving antennas for frequency converting radio frequency of a received signal received by the receiving antennas, in accordance with a common local oscillator frequency, into a frequency suitable for demodulation;

a local oscillator for receiver for supplying the common local oscillator frequency to all of the receiving frequency converters;

fast Fourier transformers respectively connected to the receiving frequency converters, for performing Fourier transformation processing on the output of the receiving frequency converters based on reception symbol timing; and OFDM symbol timing generator for receiver for supplying common OFDM symbol timing to all of the fast Fourier transformers so as to receive the pilot signals of N kinds generated by the OFDM signal transmitting device corresponding to the respective transmitting antennas by the receiving antennas, as the reception symbol timing, wherein the interference canceller computes the product of the inverse matrix and the received OFDM signals for the subcarriers output from the fast Fourier transformers and output signals having an amplitude and phase for each of the subcarriers corresponding to the OFDM signals transmitted from the OFDM signal transmitting device, and the inverse matrix computer, for all of the combinations of the transmitting antennas and the receiving antennas, measures the propagation coefficient by normalizing the reception amplitude and phase of the pilot signals with an amplitude and phase of known pilot signals, and calculates and stores the inverse matrix with respect to a propagation coefficient matrix related to respective subcarriers.

23. The OFDM signal receiving device according to claim 22, wherein the receiving antennas receive pilot signals transmitted with timing mutually shifted so as to not overlap on the time domain, from the OFDM signal transmitting device, and outputs to the receiving frequency converters, and the fast Fourier transformers separate pilot signals frequency converted by the receiving frequency converters for each subcarrier and output these pilot signals.

24. The OFDM signal receiving device according to claim 22, wherein
the inverse matrix computer comprises:
a receiving subcarrier pilot matrix composer which, when the number of subcarriers is I, generates a receiving subcarrier pilot matrix $PR^i$ of N rows and N columns with a received signal $r^i_{mn}$ of the m th symbol of the n th receiving antenna of the i th, i being an integer greater than or equal to 1 and less than or equal to I, subcarrier output from the fast Fourier transformers as the component of the m th row and the n th column, based on the N symbol pilot signals received by the receiving antennas, and
I subcarrier propagation coefficient inverse matrix computers for computing the inverse matrix an N-dimensional square matrix for the i th subcarrier constituted by the propagation coefficients for the respective propagation paths between the respective transmitting antennas and the respective receiving antennas, by multiplying the inverse matrix of a transmission subcarrier pilot matrix $P^i$ transmitted from the OFDM signal transmitting device being a matrix other than the unit matrix and the matrix obtained by multiplying a complex number by the unit matrix for which the determinant is not zero and with the pilot signal $P^i_{mn}$ of the m th symbol, m being an integer greater than or equal to 1 and less than or equal to N, transmitted by the n th n being an integer greater than or equal to 1 and less than or equal to N, transmitting antenna in the i th subcarrier, as the component of the m th row and n th column, by the receiving subcarrier pilot matrix $PR^i$.

25. The OFDM signal receiving device according to claim 22, further comprising:
N carrier frequency error estimators for estimating a frequency error between a carrier wave in the OFDM signal transmitting device and the local oscillator for receiver, based on the output from the receiving frequency converters, and outputting a carrier frequency error estimation value;
an averaging circuit of carrier frequency error estimation value for calculating and outputting an average value of the carrier frequency error estimation values output from the N carrier frequency error estimators; and
N carrier frequency error correctors for correcting the carrier frequency errors of the respective outputs of the receiving frequency converters, based on the average value output from the averaging circuit of carrier frequency error estimation value.

26. The OFDM signal receiving device according to claim 25, wherein
each of the carrier frequency error estimators comprises:
N delay circuits for delaying the outputs of the receiving frequency converters by the same time as the repetition interval of carrier frequency error estimation pilot signal repetitively transmitted from the OFDM signal transmitting device;
N complex conjugate circuits for calculating the complex conjugates of the outputs of the N delay circuits;
N complex multipliers for multiplying the outputs from the receiving frequency converters by the outputs from the complex conjugate circuits;
N integrating circuits for computing the sum of the outputs of the complex multipliers for a number of samples corresponding to the repetition interval of the carrier frequency error estimation pilot signal;
an averaging circuit for computing the average value of the outputs from the N integrating circuits;
an arc-tangent circuit for computing a phase variant proportional to the carrier frequency error, using the output from the averaging circuit; and
a phase converting circuit for converting the output of the arc-tangent circuit to a carrier frequency error per one sampling time.

27. The OFDM signal receiving device according to claim 25, wherein
each of the carrier frequency error estimators comprises:
N delay circuits for delaying the output of the receiving frequency converters by the same time as the repetition interval of carrier frequency error estimation pilot signal repetitively transmitted from the OFDM signal transmitting device;
N complex conjugate circuits for calculating the complex conjugates of the outputs of the N delay circuits;
N complex multipliers for multiplying the outputs from the receiving frequency converters by the outputs from the complex conjugate circuits;
N integrating circuits for computing the sum of the outputs of the complex multipliers for a number of samples corresponding to the repetition interval of the carrier frequency error estimation pilot signal;
an arc-tangent circuit for computing a phase variant proportional to the carrier frequency error, using the outputs from the N integrating circuits;
a N phase converting circuits for converting the output of the arc-tangent circuit to a carrier frequency error per one sampling time; and
an averaging circuit for computing the average value of the output from the N phase convening circuits.

28. The OFDM signal receiving device according to claim 22, further comprising:
a deinterleaver for performing an operation to restore the order of the codes of transmission information signals which have been rearranged in the OFDM signal transmitting device, on the outputs from the interference canceller;
a forward error correction decoder for decoding the output from the deinterleaver, corresponding to the forward error correction coding for the transmission information signals performed in the OFDM signal transmitting device;
a weighting factor computer for obtaining weighting factors for the outputs of the interference canceller; and
a multiplier for multiplying the outputs of the interference canceller by the weighting factors obtained by the weighting factor computer.

29. The OFDM signal receiving device according to claim 22, further comprising:
a deinterleaver for performing an operation to restore the order of the codes of transmission information signals which have been rearranged in the OFDM signal transmitting device on the outputs from the interference canceller;
a forward error correction decoder for decoding the output from the deinterleaver, corresponding to the forward error correction coding for the transmission information signals performed in the OFDM signal transmitting device;
a communication quality measurer for measuring the quality of the outputs from the interference canceller related to an arbitrary subcarrier of the transmitted OFDM signal transmitted from the OFDM signal transmitting device; and
a switch for outputting the signal outputs from the interference canceller directly in the case where the OFDM signal transmitting device transmits a signal for which the transmission information signals have been serial-parallel converted, and adding the outputs of the interference canceller or, outputting the one with the larger reception power of the interference canceller outputs, in the case where the OFDM signal transmitting device sends the same transmission information signals, and the communication quality measurer outputs the quality to the OFDM signal transmitting device for switching to output the signal for which the transmission information signals have been serial-parallel converted, or to output the same transmission information signals.

30. The OFDM signal receiving device according to claim 29, further comprising:

an amplitude information coefficient computer for computing amplitude information coefficients used for reproducing the amplitude of the received signals at the receiving antennas, from elements of the inverse matrix obtained by the inverse matrix computer;

an amplitude information coefficient multiplier for multiplying respective outputs from the interference canceller by the amplitude information coefficients obtained by the amplitude information coefficient computer;

a diversity coefficient computer for computing diversity coefficients used in weighting for diversity combining, from elements of the inverse matrix obtained by the inverse matrix computer or from the amplitude information coefficients computed by the amplitude information coefficient computer;

a diversity coefficient multiplier for multiplying the output signals of the amplitude information coefficient multiplier by the diversity coefficients computed by the diversity coefficient computer; and an adder for adding the outputs signal of the diversity coefficient multiplier to output the OFDM signals.

31. An OFDM signal receiving device used in an OFDM signal communication system for transmitting OFDM signals over the same radio frequency from an OFDM signal transmitting device comprising a plurality of N transmitting antennas to the OFDM signal receiving device comprising N receiving antennas, the OFDM signal receiving device comprises at least an inverse matrix computer among the inverse matrix computer and a pilot signal generator, wherein the inverse matrix computer computes each of inverse matrices of N-dimensional square matrices for each subcarrier constituted by the propagation coefficients for the respective propagation paths between the respective transmitting antennas and the respective receiving antennas, and the pilot signal generator generates a pilot signal of N kinds for use by the inverse matrix computer to compute the inverse matrix, and wherein the OFDM signal receiving device further comprises:

receiving frequency converters for converting radio frequency of received signals received by the receiving antennas, into a frequency suitable for demodulation;

N fast Fourier transformers for performing Fourier transformation on respective received signals of N systems output from the receiving frequency converters;

a demodulator for converting the OFDM symbols for each of the receiving antennas, output from the fast Fourier transformers into a bit stream; and an inverse matrix information transmitter for transmitting the inverse matrix obtained by the inverse matrix computer to the OFDM signal transmitting device, as an inverse matrix for an interference canceller provided in the OFDM signal transmitting device so that the interface canceller multiplies the respective subcarriers of the respective OFDM symbols to cancel interference components which occur between the OFDM signal transmitting device and the OFDM signal receiving device.

32. An OFDM signal receiving device used in an OFDM signal communication system for transmitting OFDM signals over the same radio frequency from an OFDM signal transmitting device comprising a plurality of N transmitting antennas to the OFDM signal receiving device comprising N receiving antennas, the OFDM signal receiving device further comprises:

receiving frequency converters for converting radio frequency of received signals received by the receiving antennas, into a frequency suitable for demodulation;

N fast Fourier transformers for performing Fourier transformation on respective received signals of N systems output from the receiving frequency converters;

a demodulator for converting OFDM symbols for each of the receiving antennas, output from the fast Fourier transformers into a bit stream; and a pilot information transmitter for detecting the amplitude and phase of N kinds of pilot signals output from the fast Fourier transformers for each subcarrier corresponding to N kinds of pilot signals generated by a pilot signal generator provided in the OFDM signal transmitting device, and generating reception information for the pilot signals, and transmitting the reception information to the OFDM signal transmitting device for use by an inverse matrix computer provided in the OFDM signal transmitting device in order that the inverse matrix computer computes each of inverse matrices of N-dimensional square matrices for each subcarrier constituted by the propagation coefficients for the respective propagation paths between the respective transmitting antennas and the respective receiving antennas, and that an interference canceller cancels interference components which occur between the OFDM signal transmitting device and the OFDM signal receiving device based on the inverse matrix.

33. An OFDM signal receiving device used in an OFDM signal communication system for transmitting OFDM signals over the same radio frequency from an OFDM signal transmitting device comprising a plurality of N transmitting antennas to the OFDM signal receiving device comprising N receiving antennas, the receiving antennas are transmitting/receiving antennas further provided with a transmission function, and the OFDM signal receiving device further comprises:

a pilot signal generator for generating pilot signals of N kinds for use in corn win an inverse matrix in order that an inverse matrix computer provided in the OFDM signal transmission device compute each of inverse matrices of N-dimensional square matrices for each subcarrier constituted by the propagation coefficients for the respective propagation paths between the respective transmitting antennas and the respective receiving antennas, and that an interference canceller provided in the OFDM signal transmitting device cancel interference components which occur between the OFDM signal transmitting device and the OFDM signal receiving device;

an inverse fast Fourier transformer for performing inverse fast Fourier transformation on the N kinds of pilot signals output from the pilot signal generator;

transmission frequency converters for converting signals output from the inverse fast Fourier transformer into radio frequency suitable for transmission;

receiving frequency converters for converting radio frequency of received signals received by the receiving antennas, into a frequency suitable for demodulation;

fast Fourier transformers for performing Fourier transformation processing on respective N systems of received signals output from the receiving frequency converters;

N demodulators for converting OFDM symbols for each of the receiving antennas, output from the fast Fourier transformers, to a bit stream; and a transmission/reception switch for selecting the transmitting/receiving antennas to transmit signals output from the transmission frequency converters, or to receive signals supplied to the receiving frequency converters.

* * * * *